US010693669B2

United States Patent
Dave et al.

(10) Patent No.: US 10,693,669 B2
(45) Date of Patent: Jun. 23, 2020

(54) SYSTEMS AND METHODS FOR AN ADVANCED MODERATED ONLINE EVENT

(71) Applicant: SYNGRAFII INC., Toronto (CA)

(72) Inventors: Ravi Dave, Toronto (CA); Matthew Gibson, Toronto (CA)

(73) Assignee: SYNGRAFII INC., Toronto (CA)

( * ) Notice: Subject to any disclaimer, the term of this patent is extended or adjusted under 35 U.S.C. 154(b) by 0 days.

(21) Appl. No.: 15/780,159

(22) PCT Filed: Dec. 6, 2016

(86) PCT No.: PCT/CA2016/051430
§ 371 (c)(1),
(2) Date: May 30, 2018

(87) PCT Pub. No.: WO2017/096473
PCT Pub. Date: Jun. 15, 2017

(65) Prior Publication Data
US 2018/0351756 A1  Dec. 6, 2018

Related U.S. Application Data

(60) Provisional application No. 62/264,063, filed on Dec. 7, 2015.

(51) Int. Cl.
*G06F 15/16* (2006.01)
*H04L 12/18* (2006.01)
(Continued)

(52) U.S. Cl.
CPC ...... *H04L 12/1818* (2013.01); *H04L 12/1822* (2013.01); *H04L 12/1831* (2013.01);
(Continued)

(58) Field of Classification Search
CPC ............. H04L 12/1818; H04L 12/1831; H04L 12/1822; H04L 63/08; H04L 63/0876;
(Continued)

(56) References Cited

U.S. PATENT DOCUMENTS

2008/0016156 A1* 1/2008 Miceli .................... G06Q 10/10
709/204
2013/0117665 A1 5/2013 Tagliaferri et al.
(Continued)

FOREIGN PATENT DOCUMENTS

EP 2852092 A1 3/2015

OTHER PUBLICATIONS

EPO, Search Report for EP Application No. 16871862.5 dated Apr. 11, 2019.
(Continued)

*Primary Examiner* — Liang Che A Wang
*Assistant Examiner* — Johnny B Aguiar
(74) *Attorney, Agent, or Firm* — Norton Rose Fulbright Canada LLP

(57) ABSTRACT

A computer network implemented system for providing an interactive online event is disclosed, the system comprising an online chat manager to provide an attendee interface for one or more attendees to participate in the interactive online event, and a leader interface for one or more leaders to participate in the interactive online event, a video stream subsystem to record at least a portion of a video stream of the one or more attendees or one or more leaders, an authentication subsystem to authenticate the identity of the one or more attendees or one or more leaders, wherein the system is operable to enable the one or more leaders to sign/dedicate an artifact for the one or more attendees.

10 Claims, 20 Drawing Sheets

(51) Int. Cl.
*H04N 7/15* (2006.01)
*H04N 21/4223* (2011.01)
*H04N 21/234* (2011.01)
*H04N 21/258* (2011.01)
*H04N 21/4788* (2011.01)
*H04L 29/06* (2006.01)
*H04L 29/08* (2006.01)

(52) U.S. Cl.
CPC ............. *H04N 7/15* (2013.01); *H04N 7/155* (2013.01); *H04N 7/157* (2013.01); *H04N 21/23418* (2013.01); *H04N 21/25875* (2013.01); *H04N 21/4223* (2013.01); *H04N 21/4788* (2013.01); *H04L 63/08* (2013.01); *H04L 63/0876* (2013.01); *H04L 67/306* (2013.01)

(58) Field of Classification Search
CPC ...... H04L 67/306; H04N 7/157; H04N 7/155; H04N 21/4788; H04N 21/4223; H04N 21/25875; H04N 21/23418; H04N 7/15
USPC ......................... 709/204, 205, 206
See application file for complete search history.

(56) References Cited

U.S. PATENT DOCUMENTS

| | | | |
|---|---|---|---|
| 2013/0132230 A1* | 5/2013 | Gibson | G06Q 30/0627 705/26.8 |
| 2013/0305337 A1* | 11/2013 | Newman | H04L 12/1818 726/7 |
| 2013/0325981 A1* | 12/2013 | Hauke | H04L 51/04 709/206 |
| 2013/0332296 A1 | 12/2013 | Murray | |
| 2014/0108557 A1 | 4/2014 | Calman et al. | |
| 2014/0111597 A1* | 4/2014 | Anderson | H04L 12/1827 348/14.03 |
| 2014/0150071 A1 | 5/2014 | Castro et al. | |
| 2014/0258912 A1 | 9/2014 | Patterson et al. | |
| 2014/0310017 A1 | 10/2014 | Palter | |
| 2015/0193651 A1* | 7/2015 | Gleim | G06K 9/00295 382/118 |
| 2016/0127360 A1* | 5/2016 | Ball | H04L 63/0861 726/7 |

OTHER PUBLICATIONS

Canadian Intellectual Property Office (CIPO), International Search Report and Written Opinion dated Feb. 14, 2017 in respect of PCT Application No. PCT/CA2016/051430.

* cited by examiner

FIG. 17

SYSTEMS AND METHODS FOR AN ADVANCED MODERATED ONLINE EVENT

CROSS REFERENCE TO RELATED APPLICATIONS

This application claims priority to U.S. Provisional Patent Application No. 62/264,063, filed on Dec. 7, 2015, the contents of which are hereby incorporated by reference in their entirety.

FIELD

The embodiments disclosed herein generally relate to technologies about remote communication, and more particularly to systems and methods for providing an advanced moderated online event incorporating text and video capabilities where attendees may interact with other attendees or with a leader.

INTRODUCTION

An individual may wish to communicate to another person or a group of people. For example, a celebrity, leader, or other individual with a following may want to meet their fans or followers at a marketing event, an author may want to perform a public reading of a new book to interested readers, or a CEO of a company may want to deliver a message to the employees of the company. However, coordinating a physical meeting between one individual to a group of people may be undesirable. First, it may be difficult to gather at one specified location. For example, a celebrity may have fans worldwide. A marketing event at a certain geographical location may exclude a majority of a celebrity's fans from attending. Second, certain logistical concerns may arise, such as safety, if an individual such as a celebrity gathers with other individuals such as their fans. These logistical concerns may take away from the experience that the fan may have when meeting the celebrity.

One possible solution may be online meetings. With an online meeting, it may be possible to share documents and videos, view the participants of the online meeting, and communicate by text or voice. However, with some conventional online meetings, this may create an artificial experience between a leader and the attendees of an online meeting. In the case of a celebrity and his or her fans, an online meeting may be impersonal, and may create distance between the celebrity and fan such that the experience is forgettable. However, a personal interaction provides a higher level of engagement of the attendee, humanizes the leader, creates a sense of immediacy and connection in the attendee toward the leader, which in turn inspires loyalty in the attendee, makes the attendee invested in the success of the leader and his/her products or services. Yet, a personal interaction between the leader and the attendees shares the disadvantages of a physical meeting as described above.

There is a need for a system, computer program and method that provides a simple, memorable, and innovative online experience between one or more attendees and a leader.

SUMMARY

A computer network implemented system for providing an interactive online event is disclosed, the system comprising an online chat manager to provide an attendee interface for one or more attendees to participate in the interactive online event, and a leader interface for one or more leaders to participate in the interactive online event, a video stream subsystem to record at least a portion of a video stream of the one or more attendees or one or more leaders, and an authentication subsystem to authenticate the identity of the one or more attendees or one or more leaders.

In some embodiments, the system is operable to enable the one or more leaders to sign/dedicate an artifact for the one or more attendees.

In some embodiments, the online chat manager provides a moderator interface for one or more moderators to moderate the interactive online event.

In some embodiments, the authentication subsystem authenticates the identity of one or more attendees or one or more leaders using at least a portion of the video stream of the one or more attendees or one or more leaders recorded by the video stream subsystem.

In some embodiments, the one or more leaders and the one or more attendees engage in a direct interaction with text, audio, video, or any combination thereof.

In some embodiments, the one or more leaders are enabled to sign/dedicate an artifact that is digital or physical for the one or more attendees.

In some embodiments, the online chat manager evaluates a profile containing profile data for the attendee to determine if the attendee and the leader should have a direct interaction.

In another embodiment, a computer network implemented system for providing an interactive online event is disclosed, the system comprising an online chat manager to provide an attendee interface for one or more attendees to participate in the interactive online event, a leader interface for one or more leaders to participate in the interactive online event, and a moderator interface for one or more moderators to moderate the interactive online event, a video stream subsystem to record at least a portion of a video stream of the one or more attendees or one or more leaders or one or more moderators, and an authentication subsystem to authenticate the identity of the one or more leaders to the one or more moderators or to one or more attendees, and to authenticate the identity of one or more attendees to the system or to the one or more moderators or to the other attendees.

In some embodiments, the system is operable to enable the one or more leaders to sign/dedicate an artifact for the one or more attendees, the artifact being a digital or physical artifact.

In some embodiments, the authentication subsystem authenticates the identity of one or more attendees or one or more leaders using at least a portion of the video stream of the one or more attendees or one or more leaders recorded by the video stream subsystem.

BRIEF DESCRIPTION OF THE FIGURES

In the drawings, embodiments of the present disclosure are illustrated by way of example. It is to be expressly understood that the description and drawings are only for the purpose of illustration and as an aid to understanding, and are not intended as a definition of the limits of the present disclosure.

Embodiments will now be described, by way of example only, with reference to the attached figures, wherein:

FIG. 17 is an example illustration of a moderator interface, according to some embodiments;

DETAILED DESCRIPTION

Figure 1:
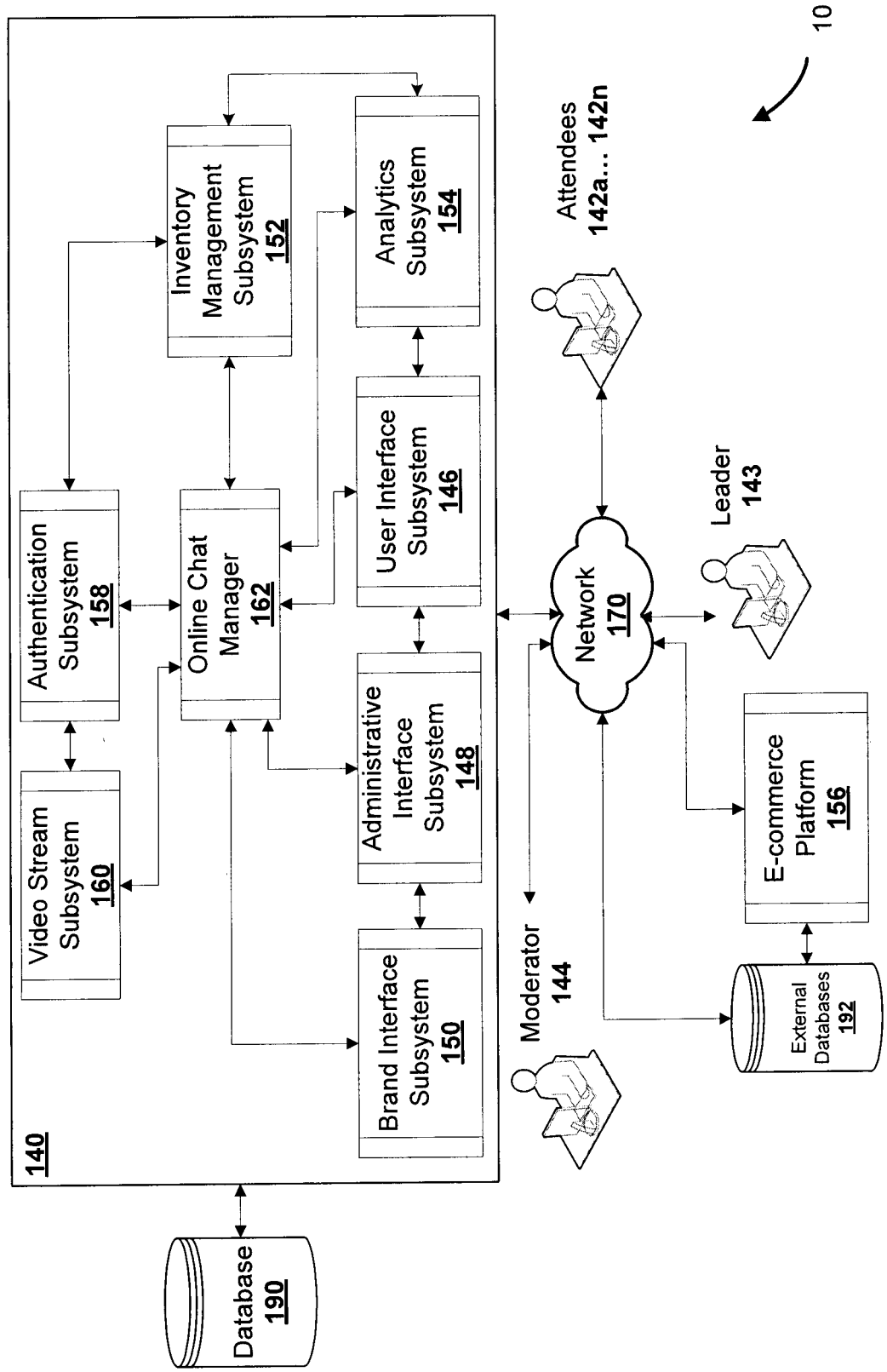
FIG. 1 to FIG. 3 provide a high-level block schematic of a system of the present invention, according to some embodiments.

A system, computer program, and method for an advanced moderated online event incorporating video capabilities where attendees may interact with each other and a leader in real time through advanced interactive digital features are disclosed. The online event may include an aspect where one or more attendees may receive an authenticated artifact, such as an autographed and/or personalized book or e-book, or digital recording of an interaction with the leader. The invention may have a video authentication component, where a video stream of the attendees and/or leader may be recorded, and may be used to authenticate the identity of the leader, confirm the eligibility of attendees to attend and/or participate in the online event, and manage access to authenticated artifacts or digital recording of the interaction. The advanced moderated online event may be configured for one or more attendees receiving an authenticated artifact or digital recording of the interaction with the leader to share the authenticated artifact or digital recording on one or more social media platforms. The artifact may be a physical artifact, such as a book, or a digital artifact, such as an e-book. The artifact may be shared by an attendee on a social media platform associated with the attendee. The attendance and/or participation of one or more leaders and one or more attendees in the online event may increase the profile of the one or more leaders.

A leader may be an individual with a following, such as a celebrity, musician, athlete, politician, academic, or author. An attendee may be a follower of a leader, such as a fan, enthusiast, or supporter.

An online event may be created by a moderator or a designate of a moderator or an administrator. The moderator may define the parameters of the online event through a moderator interface or moderator dashboard. For example, the online event may be defined to have one or more events that may involve an interaction with the leader, such as an interview with the leader hosted by a host, mass communication from the leader to all the attendees such as a live reading of a passage, or one on one interactions between one or more attendees and the leader. The moderator may configure the online event such that attendees may have to satisfy certain eligibility criteria to attend the online event and/or participate in the events that may involve an interaction with the leader. The moderator may moderate the online event during the course of the online event through the moderator interface or moderator dashboard.

It is understood that as used in this description, the terms moderator interface and moderator dashboard are used interchangeably.

The moderator may have experience or ability to moderate an online event. The moderator may have one or more followers or may be publicly recognized. The moderator may perform one or more tasks when moderating the online event, such as reviewing the schedule of the online event to evaluate the pace of the online event, change the amount of time allocated to an event to maintain the schedule of the online event, communicating with the leader, engaging with the leader to assist with the leader interface or dashboard, or selecting an appropriate attendee to interact with the leader. During the online event, such as a question and answer period, the moderator may function as an interviewer for the leader. In some embodiments, one or more designates of the moderator may perform one or more tasks associated with moderating the online event. The moderator may allocate one or more moderator functions to one or more designates of the moderator.

It is understood that as used in this description, the terms the leader interface and leader dashboard are used interchangeably.

One or more individuals may moderate the online event, such as one or more moderators, one or more designates of the moderator, one or more administrators, or any combination thereof.

An attendee may acquire a digital ticket or token to attend the online event. The attendee may attend the event by signing into the online event and may interact with other attendees, the moderator, and/or the leader through an attendee interface or dashboard. The attendee may have a one on one interaction with the leader if the attendee meets certain eligibility criteria. The leader may interact with the attendees through a leader interface. Upon conclusion of the online event, the attendee may receive an authenticated artifact, such as an autographed and/or personally dedicated book or e-book, from the leader or a digital recording of an interaction with the leader. The authenticated artifact, for example the e-book autographed by the leader during a one on one interaction or a digital recording of an interaction with the leader, may be shared on a social media platform associated with the attendee receiving the authenticated artifact.

It is understood that as used in this description, the terms attendee interface and attendee dashboard are used interchangeably.

In some embodiments, the system of the present invention may provide an advanced moderated online event that may create a memorable connection between a leader and one or more attendees, who may be in one or more geographical locations. The advanced moderated online event may be associated with reduced or no production costs. The system of the present invention may be configured for one or more artifacts, such as an e-book, to be signed and/or personalized by a leader and the system of the present invention may be configured for the signed and/or personalized artifact to be authenticated and optionally sold. The system of the present invention may be configured to provide a wet ink autograph and/or personal dedication to a physical artifact. The advanced moderated online event provided by the system may provide an engaging and memorable experience for the one or more attendees and may cause the one or more attendees to attend another advanced moderated online event. The system of the present invention may be configured to provide one or more online events at any time.

The attendance and/or participation in an online event may be encouraged and promoted in a variety of ways. The system of the present invention may be configured for one or more attendees to invite others to attend and/or participate in the online event. The one or more attendees may invite others before the online event commences, or during the online event in real time. For example, an attendee may post an invitation to the online event on a social media platform associated with the attendee before the online event begins or during the online event. Individuals on that social media platform may view the invitation to the online event and may attend and/or participate in the online event. The individual or individuals that received the invitation for the online event through the social media platform may further share the invitation with other individuals in the same social network to attend the event. In some instances, the system of the present invention may recognize that a particular attendee has attended multiple events and has a large social network, demonstrated enthusiasm, active participation, appropriate behaviour, and otherwise is associated with positive attributes and characteristics. This particular attendee may invite additional friends from their social media connections via the system of the present invention to attend and/or participate in the online event. The system of the present invention may record the friends of the particular attendee that were invited to the online event, and may reward these additional friends of the particular attendee with advanced line placement, reduced fees, special deals or other benefits from being invited by the particular attendee with positive attributes and characteristics. The benefits may arise from being invited by someone "in the know".

An individual may be invited, incentivized, or encouraged to attend and/or participate in the online event based on physical product purchases, digital product purchases, or both. The individual may gain one or more variations of a privilege relating to the online event when purchasing the physical or digital product. For example, an individual may purchase and download an iTunes™ album (or an eBook, movie, another physical or digital product, etc.) for a particular artist. An individual's purchase of the artist's album and may automatically transmit an invitation to attend an online or physical event by the artist to the individual. The invitation may be for a particular event scheduled for a particular date and time, or may be for any future event to be scheduled. As another example, the purchase by the individual of the album of the particular artist may provide a discounted price to purchase a ticket to attend and/or participate in the online event.

An individual may receive an invitation to attend and/or participate in the online event from the leader or host of the online event. For example, the leader of a future online event, such as one or more artists or celebrities, may be participating in a physical event or conducting a physical or digital signing of artifacts for charity. As another example, a political party may be engaging in a fundraising campaign to seek funding support. The leader may input the amount of donation by all individuals into the system of the present invention. The system of the present invention may be configured to determine that an individual has donated a certain amount of money beyond a pre-determined threshold and may, for example, send an invitation for an online event to the individual, or may place the individual ahead in or at the front of a queue for an online meet and greet session, or may transmit an authenticated and signed limited edition of an artifact to the individual. The system of the present invention may identify to the leader or to other attendees that the individual has donated beyond the pre-determined threshold. This may facilitate a natural and memorable interaction between the leader and the individual, and may bring prestige and recognition to the individual.

An individual that attends and/or participates in one or more online events may be offered incentives to attend and/or participate in future online events. The system of the present invention may monitor and record data related to the frequency with which an attendee attends an online event, and may process this data to determine that an attendee is a "frequent participant". By attending an online event, the system may offer incentives to the "frequent participant" to participate at future online events. For example, for a future online event, the "frequent participant" may receive a fee discount, a waiver of the fee, or advancement in a queue to interact with the leader. The "frequent participant" may also receive benefits for inviting others to attend the future online event. The recipients of the invitation to attend future online events may also receive benefits. The system of the present invention may identify to the leader or to other attendees that the individual is a "frequent participant" to facilitate engaging and memorable interactions and to recognize the individual.

An individual attending a live event related to a particular leader may be provided discounts or benefits to attend one or more online events hosted by the leader or hosted by another leader associated with the leader. For example, the system of the present invention may record that an attendee may be attending an artist's concert or a celebrity's movie, for example, based on a post of an attendee on a social media platform. The system of the present invention may be configured to transmit to the attendee an invitation to an online event or a discount to an online event for the same artist or celebrity, or different artists or celebrities under management by a common record label, movie studio, etc.

The contact information of associates, customers, or patrons of a leader, such as publishers, businesses, record labels, eBook firms, charities artists, athletes, celebrities, or politicians, may be used to invite attendees and supporters to one or more online events. The system of the present invention may review and store the contact information and may communicate an advertisement or invitation to the attendees and supporters using any appropriate communication means, such as email, traditional mail, messages sent on a social media platform, and text messages.

An individual that actively invites others to an online event may receive a benefit relating to the online event or a future online event. The system of the present invention may record the number of times that an attendee invites others to an online event. Inviting others to attend the online event may be associated with a benefit. For example, the system may track if an attendee has invited a certain number of individuals to an online event, and whether those invited individuals actually attended the online event. Depending on a pre-determined number of invites sent by the attendee and a pre-determined level of attendance by the individuals, both of which may be set by the leader or a host of the online event, the system may be configured to provide a benefit to the attendee, such as waiving the attendee's entry fee. The system of the present invention may identify to the leader or to other attendees that the individual has actively invited others to attend the online event to facilitate engaging and memorable interactions and to recognize the individual.

An online event may be hosted by a branding firm. The branding firm may promote the online event for the leader, such as an artist, celebrity, or athlete, by configuring the system of the present invention to, for example, send out free VIP coupons and invitations to all individuals who registered for the online event or to all winners of a special contest. The branding firm may also send coupons or free invitations to those on their internal customers lists.

The online event may be promoted by other service providers. The system of the present invention may be configured to be aligned with other service providers so that the online events may be promoted by other service providers, such as AMX™ Head of the Line, and MasterCard™ Music Series. The online events may also be promoted by traditional media. For example, the online event provided by the system of the present invention may be promoted by a sports radio station if the online event is associated with an athlete or with a sporting event. As another example, targeted music stations may promote online events associated with certain musical acts. As yet another example, an online event may be promoted by specialty television channels, for example, by an entertainment television channel for an online event related to a celebrity leader.

In some embodiments, the system of the present invention may be configured to promote one or more online events. The system may promote one or more online events to, for example, one or more attendees of a previous online event, to customers of an e-commerce platform associated with the system of the present invention, or other digital platforms, such as social media platforms. The system may promote the one or more online events automatically and intelligently, for example, at a certain time before the one or more online events to individuals who are interested in the leader or subject matter associated with the online event.

In some embodiments, the advanced moderated online events provided by the system of the present invention may allow one or more attendees to interact with the leader or another attendee in real time. The advanced moderated online events may facilitate a leader to interact with more attendees than at a physical event. The interaction between the leader and the one or more attendees in the advanced moderated online event may be safe and may be conducted while the leader is located in a private location, such as the home of the leader.

The advanced moderated online events provided by the system of the present invention may present an advantage by allowing the one or more leaders to attend the advanced moderated online event without having to spend time to travel to a physical location. The advanced moderated online event may be convenient, and sought after leaders may be more willing to attend and/or participate in the advanced moderated online event. The advanced moderated online events may be intelligently moderated by the system of the present invention and may allow for a higher level of engagement and memorable interactions between the leader and the one or more attendees.

FIG. 1 provides a high-level block schematic of a system 10 of the present invention, according to some embodiments. Embodiments disclosed herein provide a system 10 that may provide an advanced moderated online event where one or more attendees 142 may interact with each other and with one or more leaders 143. The advanced moderated online event may convey the excitement and anticipation of a live event, and may give attendees of the online event the feeling that they have a unique access to the leader associated with the event. System 10 may include a server 140, e-commerce platform 156, network 170, and database 190.

In some embodiments, server 140 may include user interface subsystem 146, administrative interface subsystem 148, brand interface subsystem 150, inventory management subsystem 152, analytics subsystem 154, authentication subsystem 158, video stream subsystem 160, and online chat manager 162. Server 140 may provide a web platform for enabling an advanced moderated online event, which may include text communications, audio communications, video communications, or any combination thereof, between one or more attendees with another attendee or with a leader.

User interface subsystem 146 may receive one or more inputs from a user, for example attendees 142 or leader 143, and administrative interface subsystem 148 may receive one or more inputs from an administrator, for example moderator 144, and translate the input into instructions for online chat manager 162 to perform one or more commands. Online chat manager 162 may be configured to include a processor that may communicate signals representative of the command to administrative interface subsystem 148 and/or user interface subsystem 146 to render the one or more commands viewable on the moderator interface 4100, the attendee interface 500, and/or the leader interface 3000.

Server 140 may be configured to have one or more processors, operating in conjunction with one or more computer-readable storage media, configured to provide backend services, such as data processing, data storage, data backup, data hosting, among others. Each of these subsystems may be implemented using one or more modules comprising instruction sets executed on one or more processors.

Figure 2:
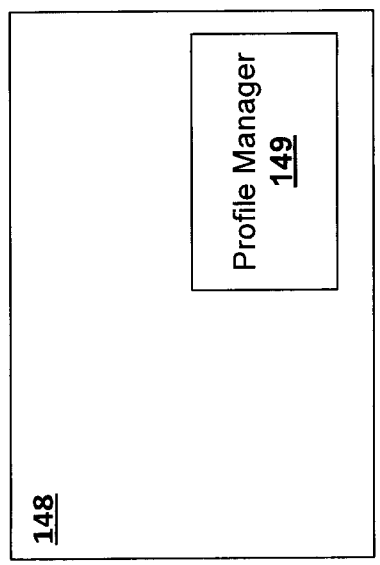

As shown in FIG. 2, administrative interface subsystem 148 may include profile manager 149. Profile manager 149 may compile profile data of each attendee 142, leader 143, and/or moderator 144 in a profile and may store the profile on database 190. Profile data of each attendee 142, leader 143, and/or moderator 144 may include the information of the attendee 142, leader 143, and/or moderator 144, such as their age, gender, address, email address, occupation, location, interests, other demographic information, social media information, and IP address associated with a device used to sign onto the online event. For example, the attendee 142 may provide this data when signing onto the online event or may be compiled by server 140. The profile data may include the type of digital ticket or token acquired to attend the online event, their behaviour at previous online events, experiences from previous online events, or external data. For example, an attendee's profile may include data that may indicate that the attendee acquired a token to have a one on one interaction with leader 143 during the online event. For example, a profile for an attendee 142 at an online event may include the number of times the attendee has attended past online events. The number of times that an attendee 142 has been marked for follow-up conversation by leader 143 or has been blocked for poor behaviour by leader 143 may be recorded by profile manager 149 and stored in the attendee's profile in database 190. As another example, an attendee 142 may have had a conversation with another attendee during the online event or while attending a previous online event relating to the leader 143, and the conversation may be analyzed by profile manager 149 and translated into profile data reflective of the attendee's interest in the leader 143. As yet another example, during an interaction between the leader 143 and the attendee or a different attendee, the attendee may provide input to server 140 via the attendee interface 500 reflective of the attendee's interest in the subject matter being discussed. Data from sources external to server 140 may be included in the profile of an attendee 142. For example, the comments, posts, messages, shared content, or interactions made by the attendee 142 external to one or more previous online events, such as on one or more websites, online forums, or social media platforms, may be associated with the profile of the attendee 142 and may be translated into profile data reflective of the attendee's interest in the leader 143. The profile manager 149 may review external data to compile profile data, for example, for an attendee that does not have an existing profile created by profile manager 149 and stored in database 190. The profile manager 149 may compile profile data of one or more attendees over time or in real time. In some embodiments, online chat manager 162 may review profile data of an attendee 142 to control access to a leader 143. For example, online chat manager 162 may recognize that a certain attendee 142 has a token to have a one on one interaction with leader 143, has positive interest in a particular subject matter relating to the leader 143 and has expressed positive behaviour in prior online events. As another example, online chat manager 162 may be configured to automatically analyze an interaction between one attendee and another, such as the text, audio, and/or video of a conversation between two attendees during an online event, to determine if an attendee should engage in a one or one interaction with leader 143, or assess their placement on a queue to interact with the leader 143. Online chat manager 162 may mark that certain attendee 142 as a possible candidate for an interaction with leader 143 and transfer signals to administrative interface subsystem 148 representative of a communication for administrative interface subsystem 148 to display on moderator interface 4100 a recommendation to moderator 144 to consider the certain attendee 142 for a one on one interaction with leader 143 when a particular subject matter is being discussed. Profile manager 149 and online chat manager 162 may provide an advanced moderated online event that may present a memorable interaction between attendee 142 and leader 143. Online chat manager 162 may be operable to compile profile data for each attendee 142, and may be further operable to access the profile data in order to personalize interactions between the one or more attendees 142, and the one or more leaders 143. This may include adjusting the attendee interface 500 and associated features presented by server 140 of the present invention based on the preferences of the particular attendee 142 recorded on their profile.

In some embodiments, the leader 143 may also use the profile data generated by profile manager 149 of an attendee 142. Online chat manager 162 may cause user interface subsystem 146 to display profile information of an attendee 142 on the leader interface 3000 while the leader 143 is interacting with attendee 142. For example, the attendee's interests, the attendee's comments about the leader 143 may be displayed on the leader interface 3000. The leader 143 may use such information as an "ice breaker", thereby facilitating smooth interactions, and may assist in the leader 143 and attendee 142 establishing a relatively natural, positive connection. Server 140 of the present invention may enable automated and dynamic preparation of leader 143 in connection with interactions with attendees 142. For example, by displaying profile data of an attendee 142, the leader 143 may be reminded of a previous interaction with the attendee 142, and may greet the attendee 142 with reference to the previous interaction. The leader 143 may also be informed that a particular attendee 142 has attended online events related to a number of other leaders, including for example, leaders that the participating leader 143 knows, which may create the basis for discussion and connection between the attendee 142 and the leader 143.

Figure 3:
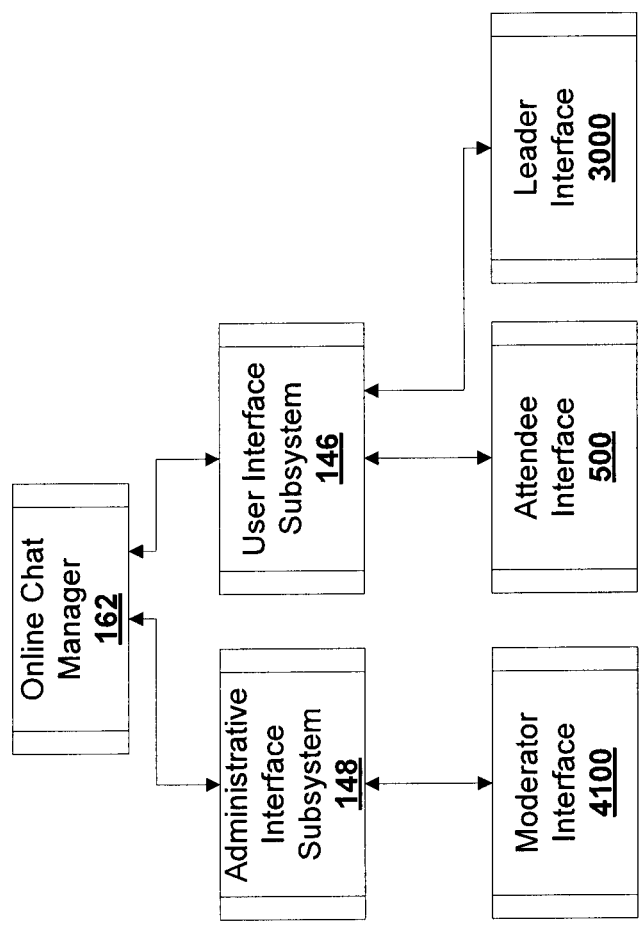

FIG. 3 illustrates an example organizational chart of how the attendee 142, leader 143, and moderator 144 may communicate with server 140. For example, attendee 142 may sign onto the online event and may provide an input through their computer device that may be displayed on the attendee interface 500. For example, the attendee 142 may have clicked a button as displayed on the attendee interface 500. User interface subsystem 146 may receive the input from attendee 142 and translate the input into signals representative of the input and communicate the signals to online chat manger 162. Online chat manager 162 may be configured to include a processor to communicate with user interface subsystem 146 to perform the command representative of the input from the attendee 142. The command may be rendered by user interface subsystem 146 to be displayed on attendee interface 500. Leader 143 and moderator 144 may similarly interact with server 140 via the user interface subsystem 146 or administrative interface subsystem 148.

In some embodiments, there may be more than one interface subsystem to manage communication between the attendees 142, leader 143, and moderator 144 and server 140, or there may be only one interface subsystem to manage said communication.

Referring back to FIG. 1, server 140 may include brand interface subsystem 150. An online event may relate to a certain leader 143, for example an artist, musician, or athlete. This leader 143 may be associated with a brand that may feature particular characteristics such as fonts, colours, logos, and images. Brand interface subsystem 150 may create one or more brand files for one or more leaders 143, which may contain the characteristics of the brand, and may store brand files in database 190. When an online event relating to a leader 143 associated with a brand is created, online chat manager 162 may be configured to communicate with brand interface subsystem 150 to review if a brand file may exist for the leader 143, and may apply the brand characteristics to the attendee interface 500, leader interface 3000, and/or moderator interface 4100 generated by administrative interface subsystem 148 and user interface subsystem 146. For example, if an online event is created for a musician promoting an upcoming album, the album art and key colours of the album art may be stored in database 190, for example, by moderator 144. The brand interface subsystem 150 may display the album art on attendee interface 500 and may apply the key colours of the album art onto the background of the attendee interface 500. In some embodiments, when creating the online event, moderator 144 may choose a brand file stored in database 190 to apply the brand characteristics associated with the brand file to the attendee interface 500, leader interface 300, and/or moderator interface 4100. This may create an immersive and memorable experience for attendees 142 attending and/or participating in the event.

In some embodiments, an online event may be configured to reflect a brand such that the online event is a "stage" to conduct online events. Brand interface subsystem 150 may be caused by online chat manager 162 to apply brand characteristics to the attendee interface 500, leader interface 3000, and/or moderator interface 4100 to reflect that the online event is related to a brand. For example, prior to the launch of a movie, the advanced moderated online event provided by system 10 may be used to host promotional events to augment publicity of the movie. One or more attendees 142 may attend the online event related to the movie.

Server 140 may include inventory management subsystem 152. One or more attendees 142 may receive an authenticated artifact, such as an autographed and/or personally dedicated book or e-book, or digital recording of an interaction with the leader 143. Inventory management subsystem 152 may record and inventory the authenticated artifact or digital recording of an interaction. For example, the inventory management subsystem 152 may record the number of times a certain artifact has been authenticated. As another example, inventory management subsystem 152 may track the location of the authenticated artifact. Online chat manager 162 may recognize that an artifact has been authenticated and may be stored at a certain location, and may notify e-commerce platform 156 that it may have to send the authenticated artifact to attendee 142. As yet another example, the inventory management subsystem 152 may record that the attendee shared the authenticated artifact on a social media platform associated with the attendee. In some embodiments, inventory management subsystem 152 may review via network 170 confirmation orders stored on external databases 192 by e-commerce platform 156 of artifacts to be authenticated by leader 143. The confirmation orders may be associated with attendees 142 of the online event. Inventory management subsystem 152 may be able to determine the number of expected artifacts to be authenticated by the leader 143, and the number of artifacts that were actually authenticated by the leader 143. It may be possible that the number of artifacts that were actually authenticated is lower than the number of expected artifacts to be authenticated. Online chat manager 162 may trigger actions representative of a remedy for attendees who did not receive an authenticated artifact. For example, online chat manager 162 may notify the attendees 142 that did not receive an authenticated artifact about a future online event with the same leader 143, may transmit an authenticated digital artifact to the attendee 142, or may process a refund for the attendee 142. In some embodiments, the authenticated artifact and/or digital recording of the interaction between the leader 143 and the one or more attendees 142 may be shared on a social media platform.

Server 140 may include analytics subsystem 154. Analytics subsystem 154 may generate reports based on data stored on database 190 relating to the online events. For example, analytics subsystem 154 may generate reports based on usage statistics, revenue monitoring, matrix/relational statistics such as the relationship between the time of an online event and the number of attendees to determine a premium event time, data trends, and the ripple effect of the online event, which may report on the behaviour of the attendees 142 after an event, which may include going to a host site to purchase a product or uploading media or posting messages on social media platforms. Analytics subsystem 154 may also generate reports relating to the inventory data generated by inventory management subsystem 152. Analytics subsystem 154 may also report on the usage of interface features for a particular event or over a span of events. Analytics subsystem 154 may also report on attendance data of an online event, such as the number of attendees 142 and the demographics of the attendees. Analytics subsystem 154 may also report on the engagement levels of one or more attendees attending an online event. For example, the analytics subsystem 154 may analyze the amount of interactions between attendees, the text, audio, and/or video content of the interactions between attendees, the number of attendees who ask to engage in a one on one interaction with leader 143, and/or the content shared on social media platforms during or after the online event to assess the engagement levels of one or more attendees. The engagement levels of one or more attendees may be of interest to certain parties, such as organizers of the online event, vendors and sponsors of the online event, companies interested in organizing a future online event, the leader 143, parties associated with the leader such as the leader's agent. Analytics subsystem 154 may also report on the effectiveness of the advertisements or promotions transmitted to the attendee 142, leader 143, and/or moderator 144. For example, if a coupon for a local store was transmitted to an attendee 142, the analytics subsystem may record if the attendee 142 saved the coupon to be used or clicked a link associated with the coupon. Based on the reports generated by analytics subsystem 154, system 10 may be configured to optimize the online events, such as the particular group of people that an online event should be marketed to, and the time that such an online event should be held. This may allow for continuous improvement of system 10. In some embodiments, moderator 144 may print the reports generated by analytics subsystem 154 to optimize system 10.

Server 140 may include authentication subsystem 158. The authentication subsystem 158 may verify the identity of a leader 143, attendees 142 and/or moderator 144 using at least a portion of at least one recorded video stream of the leader 143, attendee 142, and/or moderator 144, and may verify the authenticity of an artifact or digital recording of an interaction between the leader 143 and an attendee 142. The authentication subsystem 158 may create an authentication file stored on database 190 to authenticate and provide audit capabilities. The authentication file may contain references encrypted with "hash" codes and other encryption that may refer to a (1) a unique identifier for a leader 143, attendee 142, moderator 144, or an artifact or digital recording, such as a unique tag; (2) an audio/visual transaction record, for example, one recorded by video stream subsystem 160, to identify the leader, attendee, or the event of authenticating the authenticated artifact or the digital recording of the interaction between the leader 143 and attendee 142; (3) biometric confirmation for authentic identification of participant(s); (4) date and time stamps; and/or (5) serial numbers and/or IP addresses of the hardware used for the purpose of the signing/dedication (e.g. IP address for the computer device associated with the leader 143, that was used for the authentication, and optionally the authentication subsystem 158).

The authentication file may also include: (A) identification data for the leader 143 such as their username/password data, or the fact that a successful login using this data was processed; (B) one or more audio or video streams related to the online event for authentication purposes (video images of the leader 143, attendee 142, or moderator 144 for example, may be compared to images on file to establish identity); or (C) be linked to a digital signature verification system to which the leader 143 has been registered. In one particular implementation of the present invention, the authentication file may be a coded file that when opened will retrieve files associated with the authentication file and optionally will execute a program to extract the information that serves to authenticate the transaction. In one particular aspect of the present invention, the authentication file may verify the identity of the leader 143, the attendee 142, moderator 144 or verify that the leader 143 provided the authenticated artifact or digital recording of the interaction between the leader and the attendee. The authentication file may be stored in database 190 and used to validate the identity of the leader 143, the attendee 142, moderator 144 or the authenticity of the artifact or digital recording of the interaction between the leader 143 and attendee 142 if there is a request for validation.

In one particular embodiment of the present invention, the authentication subsystem 158 may incorporate one or more handwriting analysis routines for analyzing the digital pen path recorded for a particular instance of handwriting associated with the handwriting or signature captured in accordance with the invention. The characteristics of the digital pen path to be analyzed may include the pressure, velocity, acceleration, and cadence of the digital pen path. This digital pen path may be compared against previous digital pen paths for other instances of handwriting or signature stored to a memory associated with authentication subsystem 158, such as database 190, and made accessible to the authentication subsystem 158 for authentication purposes.

In one particular implementation of the present invention, upon confirmation of the identity of the leader 143 associated with the authenticated artifact or digital recording of the interaction between the leader 143 and an attendee 142, the authentication subsystem 158 may be operable to issue a certificate that confirms the identity of the leader 143, and this certificate may be linked to the authenticated artifact or digital recording of the interaction between the leader 143 and attendee 142, for example, by affixing a digital seal to the artifact or digital recording of the interaction hat confirms authentication.

Similar resources or techniques may be used to personalize the artwork associated with an electronic musical file, or a movie, or digital objects associated with a video game or social networking virtual world, by means of signature and/or dedication as described.

Server 140 may include a video stream subsystem 160, which may record video streams of all individuals attending the online event. For example, the video stream of an attendee 142, leader 143, and/or moderator 144 may be recorded, the video stream of an interaction between an attendee 142 and moderator 144 may be recorded, and the video stream of an interaction between attendee 142 and leader 143 may be recorded. Authentication subsystem 158 may use at least a portion of the recorded video stream by video stream subsystem 160 to authenticate the attendees 142 and/or the leader 143. Authentication subsystem 158 may control when the video stream subsystem 160 records video streams for the purposes of authentication. For example, the video stream of leader 143 may be recorded when the leader 143 first signs onto the live event to confirm the identity of the leader 143. This may be particularly important to the attendees 142 of the event. For example, the attendees 142 may be attending a fan meet and greet session for a celebrity, and the attendees 142 may seek confirmation that the leader 143 is a particular celebrity. As another example, the video stream of attendee 142 may be recorded before the attendee participates in a one on one interaction with leader 143. The identity of the attendee may be confirmed by authentication subsystem 158 as part of the eligibility criteria to participate in the one on one interaction. Online chat manager 162 may associate the identity of an attendee with the attendee's profile generated by profile manager 149. Online chat manager 162 may review the attendee's profile to evaluate whether the attendee 142 may be an appropriate candidate for a one on one interaction with the leader 143. For example, the attendee 142 may have attended prior online events relating to the leader 143 and may have demonstrated positive behaviour. Online chat manager 162 may evaluate this attendee 142 as a possible candidate for a one on one interaction with the leader. In contrast, the attendee 142 may not have attended prior online events relating to the leader 143, or may have demonstrated negative behaviour and compelled the leader 143 to block the attendee. Online chat manager 162 may evaluate this attendee 142 as a poor candidate for a one on one interaction with the leader. Online chat manager 162 may cause administrative interface subsystem 148 to display relevant elements of the attendee's profile or evaluations of the online chat manager 162 on moderator interface 4100 to inform moderator 144 as to whether the attendee 142 should participate in the one on one interaction with the leader 143. Online chat manager 162 may prevent one or more attendees 142 that demonstrated one or more instances of inappropriate behaviour from attending and/or participating in the online event.

An engaging and memorable moment between an attendee 142 and leader 143 may be created when the attendee 142 and leader 143 may be able to engage in a conversation, or when the attendee 142 and leader 143 have different opinions. Online chat manager 162 may evaluate the profile data of one or more attendees 142, such as the demographic of the attendee, the political affiliation of the attendee, the personality of the attendee, the engagement level of the attendee at the current online event, the interest level of the attendee relating to the leader 143, their social media interactions relating to the leader 143, interactions in previous online events, and their interactions with other attendees during an online event, and may assess whether the one or more attendees 142 may have an acceptable quality of interaction with leader 143 and/or a risk of inappropriate behaviour when engaging with the leader 143. Online chat manager 162 may compare the profile data of one or more attendees 142 and the profile data of the leader 143 to assess whether the one or more attendees 142 may have an acceptable quality of interaction with leader 143 and/or a risk of inappropriate behaviour when engaging with the leader 143. For example, the online chat manager 162 may associate the one or more attendees 142 with a "trust score". Online chat manager 162 may associate a general "trust score" to the attendee 142 which may reflect the general quality of interaction between the attendee 142 and any leader. Online chat manager 162 may associate a specific "trust score" to the attendee 142 which may reflect the quality of interaction between the attendee 142 and a specific leader. Based on the "trust score" of the attendee 142, online chat manager 162 may be configured to cause administrative interface subsystem 148 and user interface 146 to display on the moderator interface 4100 and leader interface 3000 a notification in advance of an interaction between the attendee 142 and leader 143 regarding the particular quality of interaction between the attendee 142 and/or the risk of inappropriate behaviour by the attendee 142. Based on the "trust score" of the attendee 142, system 10 may be configured to automatically delay the broadcast of the video streams of the attendee 142 and leader 143 during their interaction. In some examples, the leader 143 and/or moderator 144 may choose to delay the broadcast. The amount of time to delay the broadcast may be pre-determined by online chat manager 162 or may be defined by leader 143 and/or moderator 144. For example, if the attendee 142 has been assessed by online chat manager 162 to have a risk of demonstrating inappropriate behaviour, the video streams of the attendee 142 and leader 143 may be delayed by a pre-determined time, for example ten seconds, so leader 143 and/or moderator 144 may have time to terminate the video stream of attendee 142 before the other attendees view the inappropriate behaviour.

System 10 may be configured such that the delayed broadcast may not interfere with the experience of the attendees. For example, the attendee 142 and leader 143 may be interacting in real time and may be observed by moderator 144 in real time, but the other attendees may be viewing the delayed broadcast of both the attendee 142 and leader 143.

Online chat manager 162 may provide a digital recording of the interaction between the leader 143 and an attendee 142. Video stream subsystem 160 may record the entire interaction between the leader 143 and the attendee 142, which may include video streams from both the leader 143 and the attendee 142, which may be sent in its entirety to the attendee 142. In some embodiments, online chat manager 162 may control when video stream subsystem 160 may record the interaction between the leader 143 and the attendee 142. For example, video stream subsystem 160 may record the video stream of the active participant in the interaction between the leader 143 and the attendee 142, for example the participant that is talking or making a facial expression, such that the digital recording of the interaction between the leader 143 and the attendee 142 may contain only recordings that may be of interest to the attendee 142.

One or more attendees 142 may receive an authenticated artifact, such as an autographed and/or personally dedicated book or e-book, or digital recording of an interaction with the leader 143. Server 140 may be configured to allow the one or more attendees 142 to edit or modify the experience of receiving the authenticated artifact or digital recording of the interaction. For example, online chat manager 162 may cause user interface subsystem 146 to change the attendee interface 500 based on the attendee's input when the leader 143 is authenticating the artifact. While the leader 143 is signing an e-book, for example, the attendee 142 may provide an input, such as pressing one or more buttons displayed on the attendee interface 500, to zoom into a portion of the e-book to watch the e-book be signed, or may cause the attendee interface 500 to change into a split-screen view to display the attendee 142, leader 143, and the video stream of leader 143 authenticating the artifact. Server 140 may also be configured to provide attendee 142 with video editing functionality for the attendee 142 to edit the digital recording of the interaction between the attendee 142 and leader 143. Attendee 142 may share the digital recording of the interaction between the attendee 142 and leader 143 on a social media platform associated with the attendee 142 after the attendee 142 has edited the digital recording.

System 10 may include e-commerce platform 156 configured to facilitate the navigating, discovering, browsing, reviewing, purchasing, making payment for, and confirming orders of digital tickets or tokens of sophisticated moderated online events as provided by system 10. For example, e-commerce platform 156 may be a website that may allow a customer to navigate or discover the available digital tickets or tokens, review the digital tickets or tokens, select the number of digital tickets or tokens of online events to purchase, and purchase the digital tickets or tokens. In some embodiments, a digital ticket or token to the online event may be acquired by purchasing an artifact intended to be signed by the leader 143 at the online event. For example, an e-book may be purchased from e-commerce platform 156, and may include a digital ticket or token to attend and/or participate at an online event where the author of the purchased e-book may perform a reading of the e-book and sign the purchased e-book. In some embodiments, e-commerce platform 156 may be configured to receive order information from the customer and process payment information, and may transmit confirmed order information to server 140 such that the artifact or artifacts in the order may be prepared for further processing, such as printing and/or shipment.

In some embodiments, e-commerce platform 156 may offer a customer an artifact that may be autographed and/or personalized. The customer of e-commerce platform 156 may receive an autographed and/or personalized artifact via server 140. Leader 143 may sign and/or dedicate an artifact by inputting their handwriting into server 140 via a computer device. The autograph and/or personal dedication may be applied to the artifact by server 140 and may be transmitted to the customer of e-commerce platform 156.

The traffic to e-commerce platform 156 may be increased due to the advanced moderated online event provided by system 10.

An attendee 142 may acquire a digital ticket or token at e-commerce platform 156 to attend the online event that was created and defined by the moderator.

In some embodiments, e-commerce platform 156 may be configured to facilitate the navigation or discovery of the digital tickets or tokens based on the interests of the customer or the ultimate recipient of the digital tickets or tokens.

E-commerce platform 156 may store navigation, discovery, browsing, reviewing, purchasing, payment, and confirmation information in external database 192. In some embodiments, there may be more than one external database 192.

Database 190 and external database 192 may include various types of non-transitory computer readable media, and may, in some embodiments, be a distributed networking implementation, such as a cloud computing implementation. The data storage may include various types of databases and/or storage media, such as SQL servers, flat files, Microsoft Excel™ files, etc. Information may be stored as records and may, in some embodiments, have one or more relationships defined between various records. In some embodiments, the data storage may preprocess and/or transform, extract or load the data for data mining and/or data warehousing purposes.

Network 170 may be any type of network, including, but not limited to, the internet, various intranets, wireless connections, wired connections, etc.

System 10 may be configured for a moderator 144 connected to server 140 via network 170 to create an online event and define the parameters of the online event through a moderator interface 4100. For example, the online event may be defined by moderator 144 to have one or more events that may involve an interaction with the leader 143, such as an interview with the leader 143 hosted by a host, mass communication from the leader 143 to all the attendees 142 like a live reading of a passage, or one on one sessions between one or more attendees 142 and the leader 143. The moderator 144 may configure the online event such that attendees 142 may have to satisfy certain eligibility criteria to attend the online event and/or participate in the events that may involve an interaction with the leader 143. The moderator 144 may moderate the online event during the course of the online event through the moderator interface. For example, a moderator 144 may create a meet-and-greet event between a celebrity and the celebrity's fans.

An advanced moderated online event may be moderated by one or moderators.

Each of the attendees 142, leader 143, and moderator 144 may access the advanced moderated online event of system 10 with a computer device. The computer device may have a display means such as a monitor, an input means such as a keyboard and a mouse, a camera, a microphone, and an audio speaker. In some embodiments, the computer device of the attendees 142, leader 143, and/or moderator 144 may have additional input means such as a digital writing device and a stylus. For example, this may facilitate the leader 143 to provide an authentic artifact to one or more attendees 142 by providing the artifact with an autograph and/or a personal dedication, or may allow attendees 142, leader 143, and/or moderator 144 to communicate to each other with handwritten communications.

In some embodiments, server 140 may include or be linked to one or more social media utilities that may provide a social medial platform that may allow one or more fans to connect with one another and/or interact with one another based on one or more social engagement processes. For example, the social media platform that may be incorporated in the system of the present invention or be linked to the system of the present invention may enable attendees 142 with similar interests to connect with one another. For example, the social media platform may be linked to an interface that in the context of one or more online events described in this disclosure, enable a first attendee to view information regarding a second attendee, as authorized by the second attendee, which then may enable the first attendee and second attendee to establish a social connection with one another, which they may then pursue outside of the online event enabled by the present system. In other words, attendees 142 may meet electronically through virtual events initiated by the platform of the present invention, just as individuals often meet at real life events such as book signing, concerts, or celebrity meet and greet sessions. One advantage of the interactions enabled by the present invention is that attendees 142 may be presented with information, depending on the preferences of each other attendee 142 represented for example by a thumbnail including a photo which may be clicked to access further information, regarding potentially all of the participants in the event. The social media platform of the present invention may allow a first attendee to display information regarding other participating attendees based on one or more filtering criteria, such as age, sex, home town, aspects based on how the other fan relates to the leader 143, such as number of books of the leader 143 read by the other attendees, or the favorite book by the leader 143 of the other attendees. This type of information may be stored on database 190, and may be used to assemble profile data for the attendees 142. Attendees 142 through their user setting may define what data is shared with others and conditions for sharing data.

The advanced moderated online event provided by the system of the present invention may allow one or more attendees 142 to make new connections with other attendees based on a shared interest in the leader 143 or subject matter of the online event. The online event provided by the system of the present invention may also maintain pre-existing social connections. For example, one or more icons associated with one or more attendees may be displayed on the computer device via attendee interface 500 of an attendee 142 attending the online event to represent the attendees that have signed into the online event. The icons associated with a particular attendee 142*a* may be associated with another icon to identify to the attendee 142 of a pre-existing social connection with the attendee 142*a*, for example, the particular attendee 142*a* and attendee 142 have a relationship on a social media platform like Facebook™, or may be a friend of a friend of the attendee 142.

The advanced moderated online event may raise the engagement level of each attendee 142 attending the online event by bringing together individuals with a shared interest of the leader. The commonality between the attendees 142 may provide a meaningful engagement for each attendee 142. For example, where the online event is a meet and greet session between a celebrity and the celebrity's fans, an attendee 142 may be having a meaningful experience and special significance when he or she knows that the other attendees are also fans of the celebrity. The profile of the leader 143 may also be raised based on the engagement level and memorable experience of the attendees 142. For example, the attendees 142 may interact with leader 143 on a social media platform after the conclusion of the online event.

System 10 of the present invention may be configured to provide attendee 142 with a search and filtering function to identify other attendees with a shared interest or shared level of interest. For example, an attendee 142 may input a search term via a computer device into a search window displayed onto the attendee interface 500 by user interface subsystem 146. Online chat manager 162 may review the profile data stored in database 190 and may cause user interface subsystem 146 to display results to the attendee 142. The display results may be filtered by online chat manager 162 based on parameters such as demographic information, geographical location, or the interest level of the displayed attendees. For example, online chat manager 162 may display the attendees that may express high engagement level and/or high interest level for the leader 143 or the online event. The icons representing these attendees that express high engagement level and/or high interest level may further be marked with another icon representative of their high engagement level and/or high interest level. For example, in a meet and greet session between a celebrity and their fans, an attendee 142 may input a search term, and the results may be filtered based on the age of the attendees, proximity to the attendee 142, or the number of concerts, books, or albums purchased by the attendees. As another example, online chat manager 162 may filter the search results to display other attendees that have a similar interest level to leader 143 based on the profile data of attendee 142. For example, online chat manager 162 may review the profile data of the attendee 142 and determine the engagement level and interest level of the attendee 142 and filter the results to display other attendees that have a similar engagement level and interest level. The search and filtering functionality may allow an attendee 142 to experience shared interest and commonality among the attendees for an engaging and memorable experience.

Example of Interactive Online Event with Direct Interaction with Leader

Figure 4:
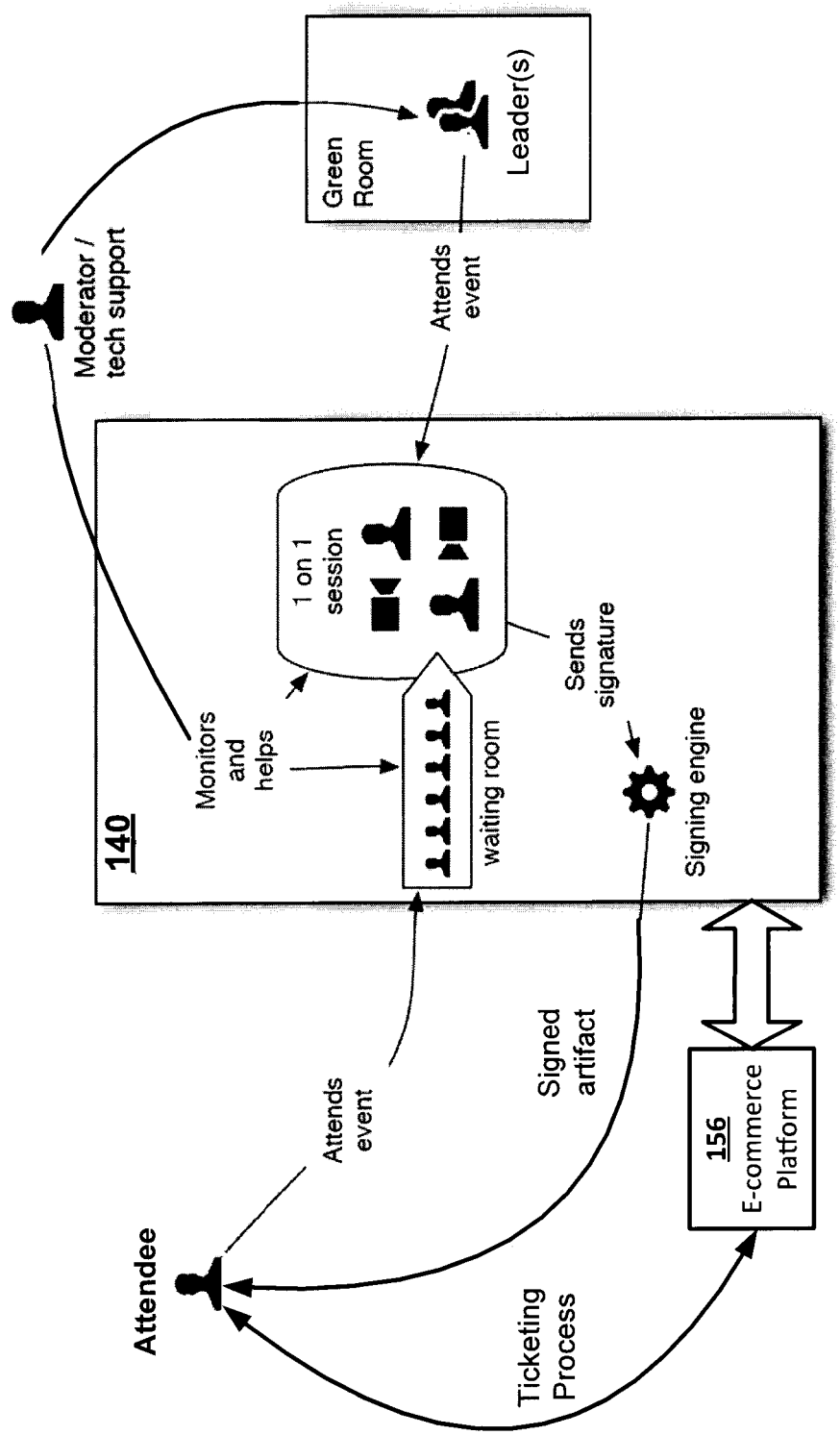
FIG. 4 to FIG. 5 illustrate a flow diagram of how an attendee may attend an online event and interact with a leader, according to some embodiments.
Figure 5:
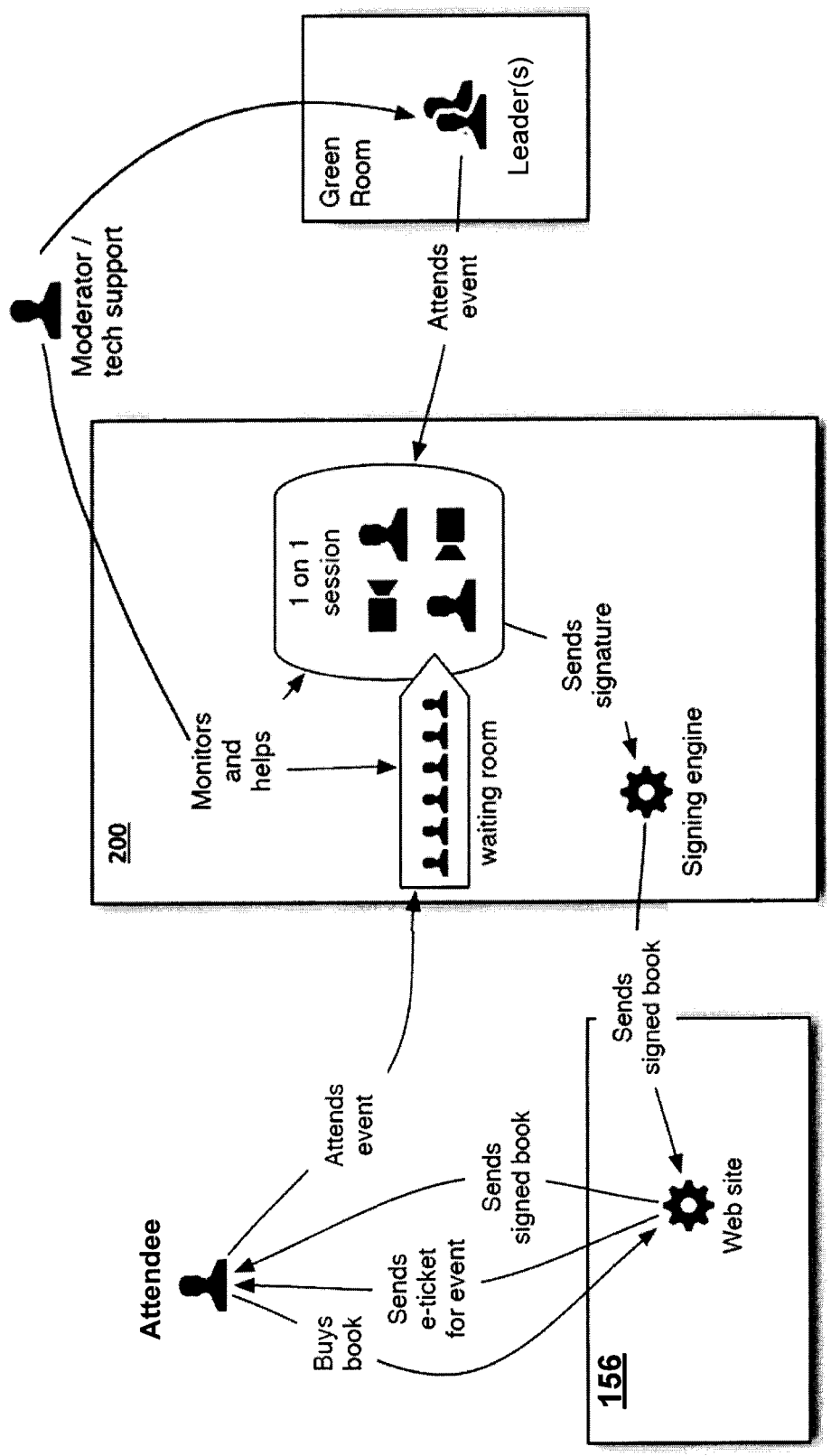

FIG. 4 and FIG. 5 illustrate an example of how an attendee 142 may attend an online event and may interact with leader 143. In one aspect of the present invention, moderator 144 may set up an online event using system 10. The moderator may set a schedule for the online event. The online event may have certain interactions between the leader 143 and attendees 142, such as live readings of a book or a one on one interaction between the leader 143 and an attendee 142. The moderator 144 may also configure eligibility criteria that may be met by attendees 142 to attend and/or participate in the online event. The online event may be related to leader 143 and may be associated with a vendor or a website, as shown in FIG. 5. For example, an attendee 142 may sign up to attend the online event by purchasing an e-book at e-commerce platform 156, as shown in FIG. 4. As part of purchasing the e-book, the attendees 142 may receive a digital ticket or token to attend and/or participate in the online event. As another example, the attendees 142 may attend the online event for free, where, for example, the leader 143 or a sponsor may have provided the fee to attend the online event. The attendees 142 may receive notifications or reminders leading up to the date of the online event. This may present the attendees 142 with an opportunity to ensure technical requirements for attending and/or participating in the online event are met. This may also present an opportunity for targeted marketing and promotion of the leader 143. In some embodiments, the attendee may have purchased a digital ticket or token for something other than attending and/or participating in an online event with leader 143. For example, the attendee 142 may have purchased only a request for an authenticated artifact or a dedication request from leader 143. In that case, the attendee 142 may receive notifications relevant to the purchased item. For example, the attendee 142 that purchased an authenticated artifact may receive notifications that the dedication request was sent, the request was viewed by the leader, and that the dedication and/or authenticated artifact was completed.

There may be more than one moderator 144 moderating the online event. For example, there may be one or more moderators, one or more administrators, or one or more designates of the one or more moderators who moderate the event.

There may be more than one leader attending the online event. One or more leaders or a guest of one or more leaders may be the focal point of the online event. For example, a first leader and a second leader may participate in an online event. The first leader may have a greater following and/or be more popular than the second leader. The online event may be intended as a targeted campaign for the first leader to grow the following and/or the popularity of the second leader, for example, but providing an engaging and memorable experience for the attendees 142, who may then engage with the second leader on a social media platform and grow the social media profile of the second leader.

Attendees 142, leader 143, and moderator 144 may access the online event by signing into the online event. The identities of the attendees 142, leader 143, and/or moderator 144 may be verified by authentication subsystem 158, which may use at least a portion of one or more video streams recorded by video stream subsystem 160, for example, by comparing the video stream with images of the attendees 142, leader 143, and/or moderator 144 stored in database 190. The identities of the attendees 142, leader 143, and/or moderator 144 may also be identified based on a unique identifier, such as a unique tag; an audio/visual transaction record, for example, one recorded by video stream subsystem 160, to identify the leader, attendee, biometric confirmation for authentic identification of participant(s); date and time stamps; and/or serial numbers and/or IP addresses of the hardware used for the purpose of the signing/dedication (e.g. IP address for the computer device associated with the leader 143, that was used for the authentication, and optionally the authentication subsystem 158).

The authentication file may also include: identification data for the leader 143 such as their username/password data, or the fact that a successful login using this data was processed; one or more audio or video streams related to the online event for authentication purposes (video images of the leader 143 or attendee 142, for example, may be compared to images on file to establish identity); or be linked to a digital signature verification system to which the leader 143 has been registered.

Online chat manager 162 may communicate with administrative interface subsystem 148 and user interface subsystem 146 to display moderator interface 4100, attendee interface 500, and leader interface 3000. For the attendees 142, the attendee interface 500 may display an interface representative of a waiting room. The attendees may view other attendees 142 and/or one or more moderators 144. The moderator 4100 may answer technical questions of the attendees 142 and may specify "rules of engagement" with the leader 143. The estimated wait time for the online event to begin may be displayed. The attendees 142 may interact with each other via text, audio, video, or a combination thereof. The attendee interface 500 may indicate that a certain attendee may have a relationship with another attendee. For example, an icon next to a graphic representing one attendee 142*a* may represent that another attendee 142*b* met attendee 142*a* on a particular social media platform. As another example, another icon next to a graphic representing one attendee 142*a* may represent that another attendee 142*b* had a conversation or met each other at a previous online event. Notifications may be provided to attendees 142 that the leader 143 has signed into the online event. For example, online chat manager 162 may provide an automatic notification or moderator 144 may provide the notification. The notification may also be a countdown leading to the leader's arrival. System 10 may be configured such that one or more attendees 142 may notify others to attend the online event. For example, attendees 142 may post a message on a social media platform associated with the attendees 142 to invite their friends to attend the online event. When the online event begins, there may be one or more interactions between the leader 143 and one or more attendees 142. For example, an optional host may introduce leader 143 to attendees 142 and lead a question and answer period. The host may use questions suggested by attendees 142. The leader 143 may participate in a one on one interaction with one attendee 142, or may have an interaction with a plurality of attendees 142. Attendees 142 not participating directly with leader 143 in an interaction may view a live video stream of the ongoing interaction between the one or more attendees and leader 143.

In some embodiments, user interface subsystem 146 may display revenue generation opportunities on the attendee interface 500. For example, certain attendees may have purchased a digital ticket or token only to attend the online event, but not to participate in direct interaction with leader 143. Online chat manager 162 may be configured to present an opportunity in real time for one or more attendees 142 to bid for or purchase a digital ticket or token to have a direct interaction with leader 143. For example, revenue generation opportunities that may be presented include selling items related to leader 143, or a lottery where a purchaser may randomly be selected to have a direct interaction with leader 143, or an online auction for one or more attendees 142 to purchase an opportunity to attend a limited attendance show by leader 143. As another example, online chat manager 162 may be configured to present an opportunity for one or more attendees to purchase a digital ticket or token in real time to a future online event or a future live event.

The advanced moderated online event provided by system 10 may present one or more revenue opportunities. For example, an autographed artifact such as an autographed book or e-book may be sold. The cost of a digital ticket or token may be configured to be reflective of a personal meeting with leader 143. The sale of authenticated artifacts may translate to electronic media sales. The attendee interface 500 may be configured to display advertisements for attendees 142 who purchase a particular type of digital ticket or token to attend the event, or the attendee interface 500 may be configured to not display advertisements for attendees 142 who purchase another type of digital ticket or token to attend the event, and the cost of the digital ticket or token where the attendee interface 500 displays no advertisements may be higher than the cost of the digital ticket or token where the attendee interface 500 does display advertisements. The advanced moderated online event may promote to one or more attendees 142 another online event or releases of new products. The online chat manager 162 may be configured to display on the attendee interface 500 one or more coupons to cause one or more attendees 142 to visit an online store or a physical store.

In some embodiments, the attendee interface 500, leader interface 3000, and/or moderator interface 4100 may include one or more advertisements, such as product placement. Moderator 144 may configure the advertisements to be displayed during the online event. Online chat manager 162 may review the profile data of one or more attendees 142 to determine the appropriate type of advertisements to be displayed on the attendee interface 500. For example, an attendee 142 may have particular interest in the industry associated to leader 143. Advertisements related to the industry associated with leader 143 may be displayed on the attendee 500 of the attendee 142. The product may be placed in the video stream of the leader 143 and/or attendee 142 to promote one or more products or associate one or more products with leader 143.

In some embodiments, server 140 may provide one or more advertisements or promotions to the attendee 142, leader 143, and/or moderator 144 based on the profile data of the attendee 142, leader 143, and/or moderator 144. Online chat manager 162 may review the profile data stored on database 190 to transmit one or more advertisements or promotions that may be targeted to the attendee 142, leader 143, and/or moderator 144. The targeted advertisements may promote, for example, a physical event and/or a digital event that may be of interest to the attendee 142, leader 143, and/or moderator 144 and/or may be proximate to the attendee 142, leader 143, and/or moderator 144. For example, online chat manager 162 may review the last recorded IP address or location data in the profile data of the attendee 142 to determine the approximate location of the attendee 142. The online chat manager 162 may cause an advertisement like a coupon to be sent to the attendee 142, such as through an email. The advertisement transmitted to the attendee 142 may relate to a store or service that is located near the attendee 142, based on location data derived from the profile data of the attendee 142. As another example, online chat manager 162 may review the profile data of an attendee 142 to determine the interests of the attendee 142 and the location of the attendee 142. The interest of the attendee 142 may be based on data associated with the attendee 142, such as data input by the attendee 142, the online events previously attended by the attendee 142, interactions between attendee 142 and a leader 143, interactions between attendee 142 and another attendee, and the comments, posts, messages, shared content, or interactions made by the attendee 142 on a social media platform. The online chat manager 162 may cause a promotional communication to be transmitted to the attendee 142 based on the interest of the attendee 142, for example, a promotion about an upcoming concert for a musician or a sporting event featuring an athlete that may be held near the attendee 142. As yet another example, the online chat manager 162 may cause a promotional communication to be transmitted to the attendee 142, such as a promotion for an upcoming online event featuring a leader 143 whom the attendee 142 is interested in based on the profile data of the attendee 142. In some embodiments, the advertisement or promotion may relate to both a live event and an online event, such as promoting an upcoming live concert and an online event related to the live concert, such as a simulcast of the concert. This may be of interest to an attendee 142 who may be unable to physically attend the live event but may be interested in attending the related online event. The advertisement or promotion provided by server 140 may be relevant and may be acted upon, since the advertisement or promotion is targeted towards the attendee 142, leader 143, and/or moderator 144 and based on the profile data of the attendee 142, leader 143, and/or moderator 144, such as their location and their interest.

One or more attendees 142 may have a one on one interaction with leader 143. The interaction may be via text, via audio, via video, or any combination thereof. The leader 143 may be able to view the video stream of the attendee 142, and/or the attendee 142 may be able to view the video stream of the leader 143. The availability of the leader's video stream or the attendee's video stream to be seen may be based on the type of digital ticket or token purchased by the attendee to participate in the online event. Where the leader 143 may not be able to see the attendee's video stream, online chat manager 162 may configure user interface subsystem 146 to provide text functionality between the attendee 142 and leader 143 so they may interact.

In some embodiments, during a one on one interaction with an attendee 142, the leader 143 may have certain capabilities, such as viewing the number of attendees 142 in queue to have a one on one interaction with leader 143, the ability to control the amount of time each attendee may have to interact directly with leader 143 during the one on one session, and the ability to immediately stop the interaction with the attendee 142, for example, due to the attendee's abusive or obscene behaviour. In some embodiments, system 10 may be configured such that one of or both of the leader 143 and moderator 144 may have the functionality of a delayed broadcast. For example, if an attendee 142 may demonstrate abusive or obscene behaviour, the leader 143 or moderator 144 or both may be able to trigger a delayed broadcast, where the other attendees may not observe the abusive or obscene behaviour. The time of delay may be configured by moderator 144 when the online event may be set up. The video streams viewed by the attendees 142 and leader 143 may be refreshed after the trigger of the delayed broadcast. The attendee demonstrating abusive or obscene behaviour may be blocked and removed from the one on one interaction.

In some embodiments, online chat manager 162 may evaluate the profile data of one or more attendees 142, such as the demographic of the attendee, the political affiliation of the attendee, the personality of the attendee, the engagement level of the attendee at the current online event, the interest level of the attendee relating to the leader 143, their social media interactions relating to the leader 143, interactions in previous online events, and their interactions with other attendees during an online event, and may assess whether the one or more attendees 142 may have an acceptable quality of interaction with leader 143 and/or a risk of inappropriate behaviour when engaging with the leader 143. Online chat manager 162 may compare the profile data of one or more attendees 142 and the profile data of the leader 143 to assess whether the one or more attendees 142 may have an acceptable quality of interaction with leader 143 and/or a risk of inappropriate behaviour when engaging with the leader 143. For example, the online chat manager 162 may associate the one or more attendees 142 with a "trust score". Online chat manager 162 may associate a general "trust score" to the attendee 142 which may reflect the general quality of interaction between the attendee 142 and any leader. Online chat manager 162 may associate a specific "trust score" to the attendee 142 which may reflect the quality of interaction between the attendee 142 and a specific leader. Based on the "trust score" of the attendee 142, online chat manager 162 may be configured to cause administrative interface subsystem 148 and user interface 146 to display on the moderator interface 4100 and leader interface 3000 a notification in advance of an interaction between the attendee 142 and leader 143 regarding the particular quality of interaction between the attendee 142 and/or the risk of inappropriate behaviour by the attendee 142. Based on the "trust score" of the attendee 142, system 10 may be configured to automatically delay the broadcast of the video streams of the attendee 142 and leader 143 during their interaction. In some examples, the leader 143 and/or moderator 144 may choose to delay the broadcast. The amount of time to delay the broadcast may be pre-determined by online chat manager 162 or may be defined by leader 143 and/or moderator 144. For example, if the attendee 142 has been assessed by online chat manager 162 to have a risk of demonstrating inappropriate behaviour, the video streams of the attendee 142 and leader 143 may be delayed by a pre-determined time, for example ten seconds, so leader 143 and/or moderator 144 may have time to terminate the video stream of attendee 142 before the other attendees view the inappropriate behaviour.

System 10 may be configured such as the delayed broadcast may not interfere with the experience of the attendees. For example, the attendee 142 and leader 143 may be interacting in real time and may be observed by moderator 144 in real time, but the other attendees may be viewing the delayed broadcast of both the attendee 142 and leader 143.

The leader 143 may provide to attendee 142 an authenticated artifact or a digital recording of the interaction between the leader 143 and an attendee 142. The leader 143 may provide their autograph and/or a personal dedication to attendee 142 to authenticate an artifact, for example an e-book, via a computer device that may have input means such as a digital writing device and a stylus. The authentication subsystem 158 may authenticate the digital handwriting of the leader 143 based on analysis of the characteristics of the digital pen path recorded for a particular instance of handwriting, such as the pressure, velocity, acceleration, and cadence of the digital pen bath. This digital pen path may be compared against previous digital pen paths for other instances of handwriting or signature stored to a memory associated with authentication subsystem 158, such as database 190, for verification of the authenticity of the leader's signature to be associated with the authenticated artifact. The authentication subsystem 158 may authenticate the digital recording of the interaction between the leader 143 and an attendee 142 based on at least a portion of the recorded video streams of the leader and/or the attendee 142, or other data recorded in the authentication file, such as the IP address of the computer devices of the leader 143 and the attendee 142. In some embodiments, the signed authenticated artifact may be transmitted to the attendee 142, for example, via electronic mail, as illustrated in FIG. 4. In some embodiments, the signed authenticated artifact may be transmitted to an e-commerce platform 156 before it is transmitted to the attendee 142, as illustrated in FIG. 5. For example, leader 143 may apply an electronic autograph to an e-book or draw a sketch requested by attendee 142, which may be sent to attendee 142 and attendee 142 may share the electronically autographed e-book and/or sketch drawn by leader 143 to one or more social media platforms. System 10 may also be configured for attendee 142 to share the authenticated artifact, for example a sketch drawn by leader 143, to a social media platform.

In some embodiments, system 10 may be configured to provide a wet ink autograph and/or personal dedication to an artifact. System 10 may be in connection with a plotting apparatus via network 170. The plotting apparatus may include a plotting instrument and a plotting surface. In some embodiments, the plotting apparatus may be a plotting apparatus that facilitates the plotting of a signature and/or personal dedication and operable to replicate or approximate the pressure, speed, acceleration, and cadence of the original handwriting in plotting the handwritten signature and/or personal dedication, for example, the LongPen™ plotting apparatus as disclosed in U.S. Pat. No. 8,867,062 B2, which is herein incorporated by reference in its entirety. The plotting instrument of the plotting apparatus may be configured to engrave or print a handwritten signature and/or personal message onto an artifact in ink, graphite, clay, crayon, or any other suitable material. For example, leader 143 may wish to apply an autograph and/or a personal dedication to a physical book for attendee 142. Leader 143 may provide the autograph and/or the personal dedication to server 140 via a computer device, for example a tablet and a stylus. Server 140 may receive the electronic signals representative of the pressure, speed, acceleration, and cadence of the handwritten autograph and/or personal dedication of leader 143 and may store the electronic signals in database 190. Authentication subsystem 158 may authenticate the electronic signals representative of the handwritten autograph and/or personal dedication of leader 143 by comparing the biometric characteristics of the handwritten message of leader 143 and the biometric characteristics associated with leader 143 stored in database 190. Server 140 may communicate the signals representative of the handwritten autograph and/or personal dedication of leader 143 to the plotting apparatus. The artifact may be placed on the plotting surface of the plotting apparatus, and the plotting instrument may plot the autograph and/or personal dedication on the artifact.

Online chat manager 162 may provide a digital recording of the interaction between the leader 143 and an attendee 142. Video stream subsystem 160 may record the entire interaction between the leader 143 and the attendee 142, which may include video streams from both the leader 143 and the attendee 142, which may be sent in its entirety to the attendee 142. In some embodiments, online chat manager 162 may control when video stream subsystem 160 may record the interaction between the leader 143 and the attendee 142. For example, video stream subsystem 160 may record the video stream of the active participant in the interaction between the leader 143 and the attendee 142, for example the participant that is talking or making a facial expression, such that the digital recording of the interaction between the leader 143 and the attendee 142 may contain only recordings that may be of interest to the attendee 142.

One or more attendees 142 and one or more leader 143 may prepare for a one on one interaction in a "green room" interface. The administrator interface subsystem 148 and user interface subsystem 146 may display a moderator interface 4100, attendee interface 500, and leader interface 3000 such that moderator 144 or a technical support staff may ensure that the leader 143 and attendees 142 may understand the online event protocol and the one on one functionality may be working as expected. The computer devices of the attendees 142 and leader 143 may be tested to ensure that the one on one interaction may be successful. While in the "green room" interface, leader 143 may view statistics of the online event, such as the number of attendees 142 in attendance, view questions or comments being posted by attendees 142, and may communicate with moderator 144, for example, to change the schedule of the event. Online chat manager 162 may communicate with user interface subsystem 146 to display one or more profile data of the attendee 142 created by profile manager 149 to the leader 143 to facilitate the one on one interaction. For example, the user interface subsystem 146 may display on the leader interface 3000 that an attendee 142 had attended a previous online event related to leader 143, which leader 143 may use as an "ice breaker" to provide a positive and memorable interaction for the attendee 142.

Online chat manager 162 may be configured to evaluate whether an attendee 142 may be an appropriate candidate for an interaction with leader 143. For example, online chat manager 162 may review the profile data of an attendee 142, the comments made by the attendee 142, or inputs provided by the attendee 142 during the online event, such as the attendee's frequency of participating. Based on the assessment, the online chat manager 162 may configure administrative interface subsystem 148 to display a notification to moderator 144 that a certain attendee 142 may be an appropriate candidate to have an interaction with leader 143.

System 10 of the present invention may facilitate the functions of the one or more moderators 144 or the individuals performing moderator functions. Online chat manager 162 may provide automation and decision making assistance to the one or more moderators 144 or the individuals performing moderator functions, so that the one or more moderators or the individuals performing moderator functions may not need to be skilled to moderate the online event. For example, an online event may be moderated by a moderator 144 and one or more designates of moderator 144. The online chat manager 162 may review the profile data of an attendee 142, the comments made by the attendee 142, or inputs provided by the attendee 142 during the online event, such as the attendee's frequency of participating. Based on the assessment, the online chat manager 162 may configure administrative interface subsystem 148 to display a notification to one or more designates of moderator 144. As another example, the online chat manager 162 may be configured to display profile data and/or interest level of one or more attendees 142 that may want to engage in a one on one interaction with leader 143 to the one or more designates of moderator 144. As yet another example, the online chat manager 162 may be configured to display commonly asked questions or specific questions to be answered by attendee 142 that may assist the one or more designates of moderator 144 to assess whether the attendee 142 may be an appropriate candidate to interact with leader 143. The automated and/or intelligent functions of server 140 may facilitate the one or more designates to assess the appropriateness for the attendee 142 to engage in a one on one interaction with leader 143. This may allow the designates of the moderator 144 to not be as skilled or as experienced in moderating an online event. The automated and/or intelligent functions of server 140 may require fewer moderators 144 or designates of moderator 144 to moderate the online event.

In some embodiments, online chat manager 162 may assess the performance of the designates of moderator 144. The designate of moderator 144 may evaluate an attendee 142 as appropriate for a one on one interaction with leader 143, as inappropriate for a one on one interaction with leader 143, or may allocate a degree of appropriateness for a one on one interaction with leader 143. Online chat manager 162 may compare the evaluation of an attendee 142 by the designate of moderator 144 with the actual behaviour or conduct of the attendee 142 during the one on one interaction with leader 143 to assess the performance of the designate of the moderator 144.

Example of Interactive Online Event with No Direct Interaction with Leader

In another aspect of an embodiment, one or more attendees 142 may attend an online event and may receive an authenticated artifact from leader 143, for example, an autographed and or personally dedicated e-book. There may be no direct interaction between the one or more attendees 142 and leader 143.

Moderator 144 may create an online event with one or more eligibility criteria as described herein. One or more attendees 142 may purchase a digital ticket or token to attend the online event. A profile associated with one or more attendees 142 may be stored in database 190 of server 140. Attendees may sign into the online event and may interact with the online event via attendee interface 500 displayed by user interface subsystem 146. The identity of the attendees 142, leader 143, and/or moderator 144 may be verified as described herein. Attendees 142 may interact with each other publicly or private via text, audio, video, or any combination thereof, as described herein. Moderator 144 may moderate the online event through moderator interface 4100 displayed by administrative interface subsystem 148. For example, moderator 144 may communicate via text, audio, video, or any combination thereof, with one or more attendees to assist with technical questions. Online chat manager 162 may review the profile data associated with one or more attendees 142 to ensure that the one or more attendees 142 may satisfy the eligibility criteria to attend the online event. One or more attendees 142 may input one or more dedication requests via attendee interface 500. Online chat manager 162 may communicate the dedication requests from one or more attendees 142 by causing user interface subsystem 146 to display the dedication requests on leader interface 3000.

Leader 143 may sign into the online event. Leader 143 may provide an authenticated artifact, such as an autographed and/or personally dedicated e-book, to one or more attendees 142. The identity of leader 143 may be verified as described herein. Leader interface 3000 may facilitate the leader 143 to provide the authenticated artifact to one or more attendees 142. In some embodiments, leader 143 may be provided with a summary of the online event, which may include a preview of the artifact that the leader 143 may sign and/or personalize. For example, leader 143 may view a portion of an e-book to be signed. Once the online event commences, leader 143 may view the one or more dedication requests, which may be organized by online chat manager 162 in a queue. Leader 143 may review the dedication requests including the text of the dedication request. The online chat manager 162 may display at least a portion of profile data of the attendee 142 associated with the dedication request, such as the name of the attendee 142. Online chat manager 162 may provide search functionality for leader 143 to select specific dedication requests for certain flagged artifacts, such as VIP artifacts, or other gifts and prizes such as digital tickets or tokens to future online events, tickets to live events, coupons, posters, and album art. Leader 143 may choose to sign and/or personalize the VIP artifacts then the remaining artifacts to satisfy the dedication requests in the queue. Certain information may be displayed on leader interface 3000 to facilitate the signing and/or dedication of artifacts, such as the name of the attendee requesting the dedication, and the message for the dedication. Leader interface 3000 may be configured to allow leader 143 to sign and/or dedicate one artifact after another. The authenticated artifact may be transmitted to attendee 142 and may be inventoried by inventory management subsystem 152. Leader interface 3000 may display a "next" button, which, when activated by leader 143, may cause online chat manager 162 to display the next artifact to be signed and/or dedicated. System 10 may be configured to allow leader 143 to stop and restart the signing and/or dedicating of artifacts.

In some embodiments, video stream subsystem 160 may be configured to record the leader 143 signing and/or dedicating the artifact. Authentication subsystem 158 may use the recording to verify that leader 143 signed and/or authenticated the artifact. Leader interface 3000 may display a preview window from a camera attached to a computer device used by leader 143 to sign into the online event. The recording of the signing and/or dedicating the artifact may itself be sent to attendee 142. In some embodiments, leader 143 may record an audio and/or video message to attendee 142. Server 140 may inventory and store the audio and/or video message and may transmit the audio and/or video message to attendee 142. Server 140 may upload the audio and/or video message to a website, such as Youtube™ for the message to be viewed publicly. In some embodiments, the online event may be configured by online chat manager 162 to provide leader 143 with one or more opportunities to practice the signing, dedication, and/or message. Leader 143 may preview the signing, dedication, and/or message before being transmitted to the attendee 142.

Figure 6:
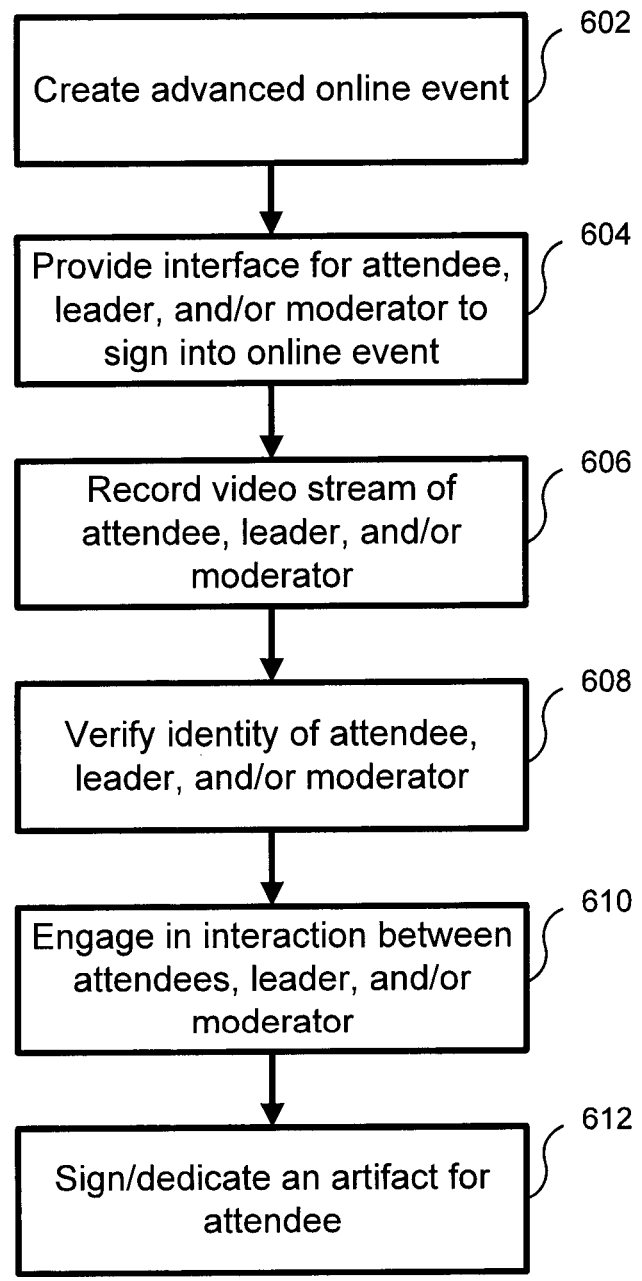
FIG. 6 is a flowchart diagram of a method for enabling an advanced moderated online event, according to some embodiments.

FIG. 6 is a flowchart diagram of an example method for enabling an advanced moderated online event, according to some embodiments.

At 602, an advanced moderated online event may be provided or created by system 10. A moderator may configure the eligibility criteria associated with being able to attend and/or participate in the advanced moderated online event.

At 604, online chat manager 162 may provide one or more attendees 142, leader 143, and/or moderator 144 with an attendee interface 500, leader interface 3000, and/or moderator interface 4100 when the one or more attendees 142, leader 143, and/or moderator 144 signs into the online event. The one or more attendees 142, leader 143, and/or moderator 144 may provide one or more inputs representative of commands to interact with the advanced moderated online event via attendee interface 500, leader interface 3000, and/or moderator interface 4100. The one or more attendees 142, leader 143, and/or moderator 144 may sign into the online event with a computer device connected to server 140 via network 170. The computer device may be configured to provide server 140 with video stream of the one or more attendees 142, leader 143, and/or moderator 144, for example, with a webcam connected to the computer device. The computer device of the attendees 142, leader 143, and/or moderator 144 may have additional input means such as a digital writing device and a stylus for server 140 to receive input from attendees 142, leader 143, and/or moderator 144 such as electronic signals representative of their handwriting.

At 606, video stream subsystem 160 may record the video stream of the one or more attendees 142, leader 143, and/or moderator 144.

At 608, the authentication subsystem 158 may verify the identity of the one or more attendees 142, leader 143, and/or moderator 144, using at least a portion of the video stream of the one or more attendees 142, leader 143, and/or moderator 144 recorded by video stream subsystem 160.

At 610, after authentication subsystem 158 has verified the one or more attendees 142, leader 143, and/or moderator 144 are eligible to attend and/or participate in the advanced moderated online event, the one or more attendees 142, leader 143, and/or moderator 144 may engage in interactions with each other. One or more attendees 142 may have a one on one interaction with leader 143.

At 612, the leader 143 may sign/dedicate an artifact to be received by one or more attendees 142. The artifact to be signed/dedicated by leader 143 may be a digital or physical artifact. The attendee 142 and leader 143 may be engaging in a one on one interaction. Attendee 142 may request a dedication from leader 143, for example, for an autograph and/or personal dedication on an artifact such as an e-book. The attendee 142 may view at least a portion of the video stream of leader 143 to watch leader 143 provide the autograph and/or personal dedication on the e-book.

The attendee 142 may share the artifact authenticated by leader 143 on system 10 and/or the digital recording of the interaction between the attendee 142 and leader 143 on a social media platform associated with the attendee 142. This may raise the social media profile of leader 143 and/or the attendee 142.

Embodiments of the attendee interface 500, leader interface 3000, and moderator interface 4100 will be described next. For the purpose of this description, the attendee interface 500, leader interface 3000, and moderator interface 4100 will be described for an online event with more than one attendee 142, one leader 143, and one moderator 144, although it may be possible to have more than one leader and more than one moderator attending an online event.

Figure 7:
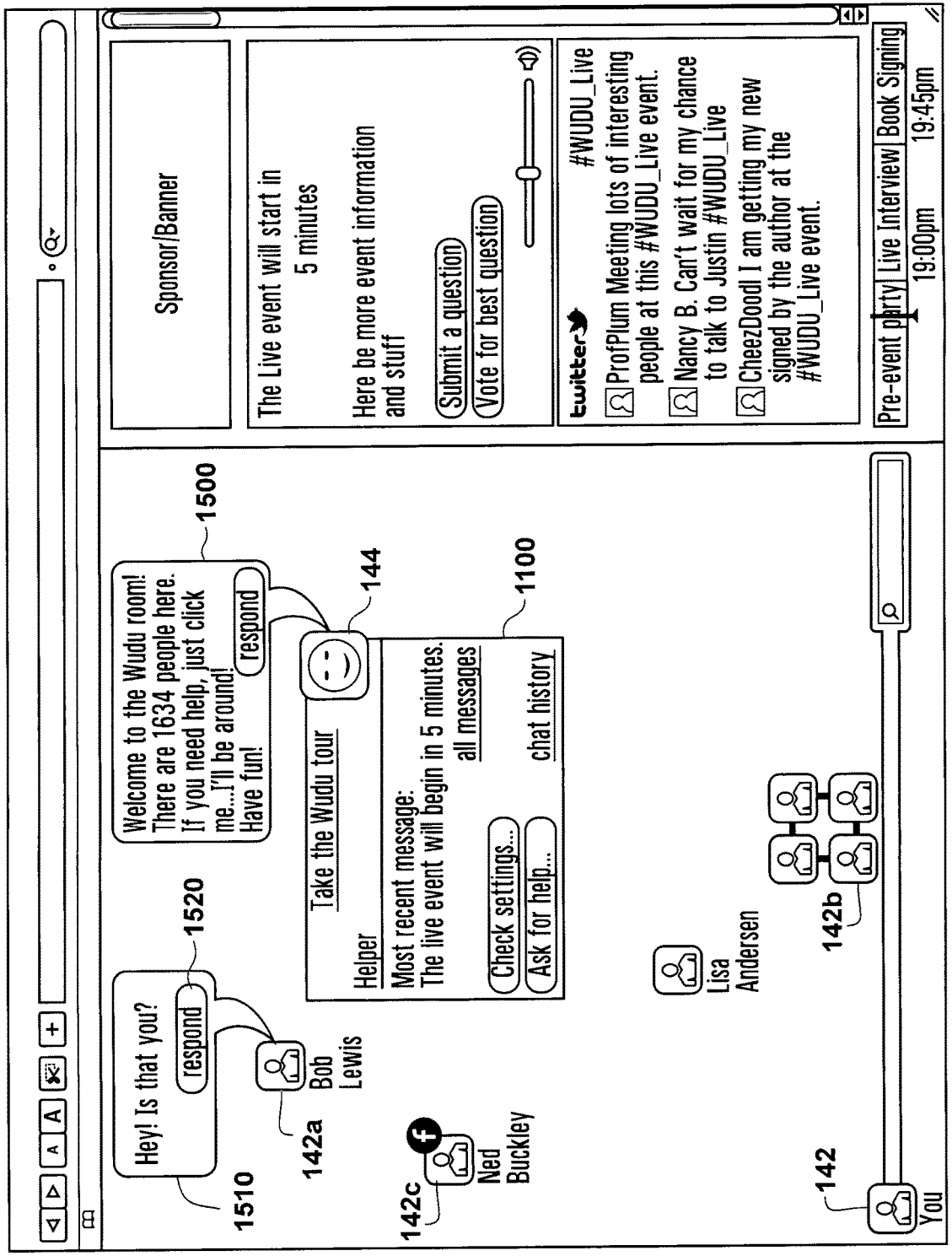
FIG. 7 illustrates an example screenshot of the attendee interface, according to some embodiments.

FIG. 7 illustrates an example screenshot of attendee interface 500. It should be appreciated that FIG. 7 is an example, and that some or all of the icons present in FIG. 7 may not be present in some embodiments. When an attendee 142 first signs on to the online event set up by moderator 144, attendee interface 500 may be configured by user interface subsystem 146 to display an interface representative of a waiting room. Attendee 142 may familiarize oneself with the features and functions of the online event, interact with one or more other attendees, interact with moderator 144, and/or interact with leader 143. The left hand side of the waiting room may be configured as an interaction panel 520 that may be used for interactions between one or more attendees 142 and one or more moderators 144. The right hand side of the waiting room may be configured as an information panel 530 that may be used to display event information, such as the amount of time remaining until the beginning of the online event, a social media messages related to the online event, or a timeline of the online event. Attendees and/or moderators may be represented by an icon with a colour chosen by the attendee, moderator and/or online chat manager 162, or may be represented by a picture of the attendee and/or moderator. The icon representative of attendee 142 may be distinguished from icons of other attendees. For example, as illustrated in FIG. 7, the icon representative of attendee 142 may be located at the bottom left of the attendee interface 500, and may be further distinguished by being stationary, while icons representative of other attendees may be dynamic.

Attendee interface 500 may also display an icon representative of a moderator 144 displayed in the interaction panel. This may indicate that a moderator 144 has signed onto the online event. As one or more attendees sign into the online event, one or more icons representative of the attendees 142 may be displayed on the attendee interface 500 by user interface subsystem 146. An attendee may be represented as an individual attendee, such as attendee 142a, or as a group, such as attendees 142b.

Additional icons may be applied to the icons representative of an attendee to convey additional messages to the attendee 142. For example, the icon of attendee 142c has an additional icon on the top right side. This may indicate that attendee 142 may know attendee 142c via a social network platform, such as Facebook™. Additional icons may be placed anywhere relative to the icons associated with an attendee.

Attendee 142 may interact with another attendee while in the waiting room. Attendee 142 may use a mouse on a computer device to place a cursor over the icon of another attendee to cause user interface subsystem 146 to display additional details about the attendee. For example, when cursor 1100 is placed on the icon representative of attendee 142c, additional details may be displayed in an additional details window 1110. The additional details relating to the other attendee displayed by user interface subsystem 146 may include biographical information of the attendee, information relating to the leader 143, and the interest of the other attendee to one or more other leaders. When the cursor 1100 is moved such that it is not placed on the icon representative of attendee 142c, the additional details window 1110 may not be displayed on attendee interface 500. Attendee 142 may choose to engage in additional interactions with another attendee. For example, attendee 142 may engage in a conversation with another attendee via text, audio, video, or any combination thereof. User interface subsystem 146 may be configured to display a conversation window to facilitate interaction between attendees.

Attendee 142 may interact with a moderator 144 while in the waiting room. Attendee 142 may use a mouse on a computer device to place a cursor over the icon representative of moderator 144 to cause user interface subsystem 146 to display additional details about the attendee. For example, as shown in FIG. 7, a cursor 1100 may be placed on the icon representative of moderator 144, which may cause additional information to be displayed in an additional details window 1110, for example, system information to be displayed on the attendee interface 500. Attendee 142 may also trigger a prompt to moderator 144 to ask for help, for example, with technical assistance to ensure the computer device is compatible with the system 10. When the cursor 1100 is moved such that it is not placed on the icon representative of moderator 144, the additional details window 1110 may not be displayed on attendee interface 500. Attendee 142 may choose to engage in additional interactions with moderator 144. For example, attendee 142 may engage in a conversation moderator 144 via text, audio, video, or any combination thereof. User interface subsystem 146 and administrative interface subsystem 148 may be configured to display a conversation window to facilitate interaction between one or more attendees 142 and moderator 144. As another example, attendee 142 may ask moderator 144 to have a one on one interaction with leader 143. Moderator 144 may review the profile data of attendee 142 to determine if the attendee 142 may be an appropriate candidate to have a one on one interaction with leader 143.

Online chat manager 162 may be configured to detect the level of engagement that an attendee 142 may have with the online event. For example, online chat manager 162 may review at least a portion of at least one video stream recorded by video stream subsystem 160 to determine if the attendee is proximate to a computer device. As another example, online chat manager 162 may review user interface subsystem 162 to determine the type and amount of inputs provided by the attendee 142, for example, key strokes representative of a conversation with another attendee, or interaction with a mouse to move a cursor displayed on the screen to interact with other attendees or the moderator 144. Online chat manager 162 may be configured to determine whether the attendee 142 is active or inactive. Online chat manager 162 may be configured to cause user interface subsystem 146 to display a notification on attendee interface 500 to engage the attendee. For example, a notification window 150 associated with moderator 144 may be displayed on attendee interface 500, and may contain a notification message to engage attendee 142.

An attendee 142 may receive interactions from another attendee, for example, attendee 142d. Attendee 142d may want to engage in an interaction with 142. Attendee 142 may choose to interact with 142, for example, by clicking on a button displayed on attendee interface 500 by user interface subsystem 146 to chat with attendee 142. Online chat manager 162 may receive the input from attendee 142d to chat with attendee 142, and may cause a notification window 1510 to be displayed on attendee interface 500 of attendee 142. As shown, a prompt from attendee 142d may be displayed in a notification window 1510 associated with attendee 142d.

An attendee 142 may choose to respond to the interactions from another attendee, for example, attendee 142d. Online chat manager 162 is configured to cause user interface subsystem 146 to display a means for attendee 142 to respond to a prompt from attendee 142d. Attendee 142 is choosing to respond to the prompt from attendee 142d by selecting button 1520.

Figure 8:
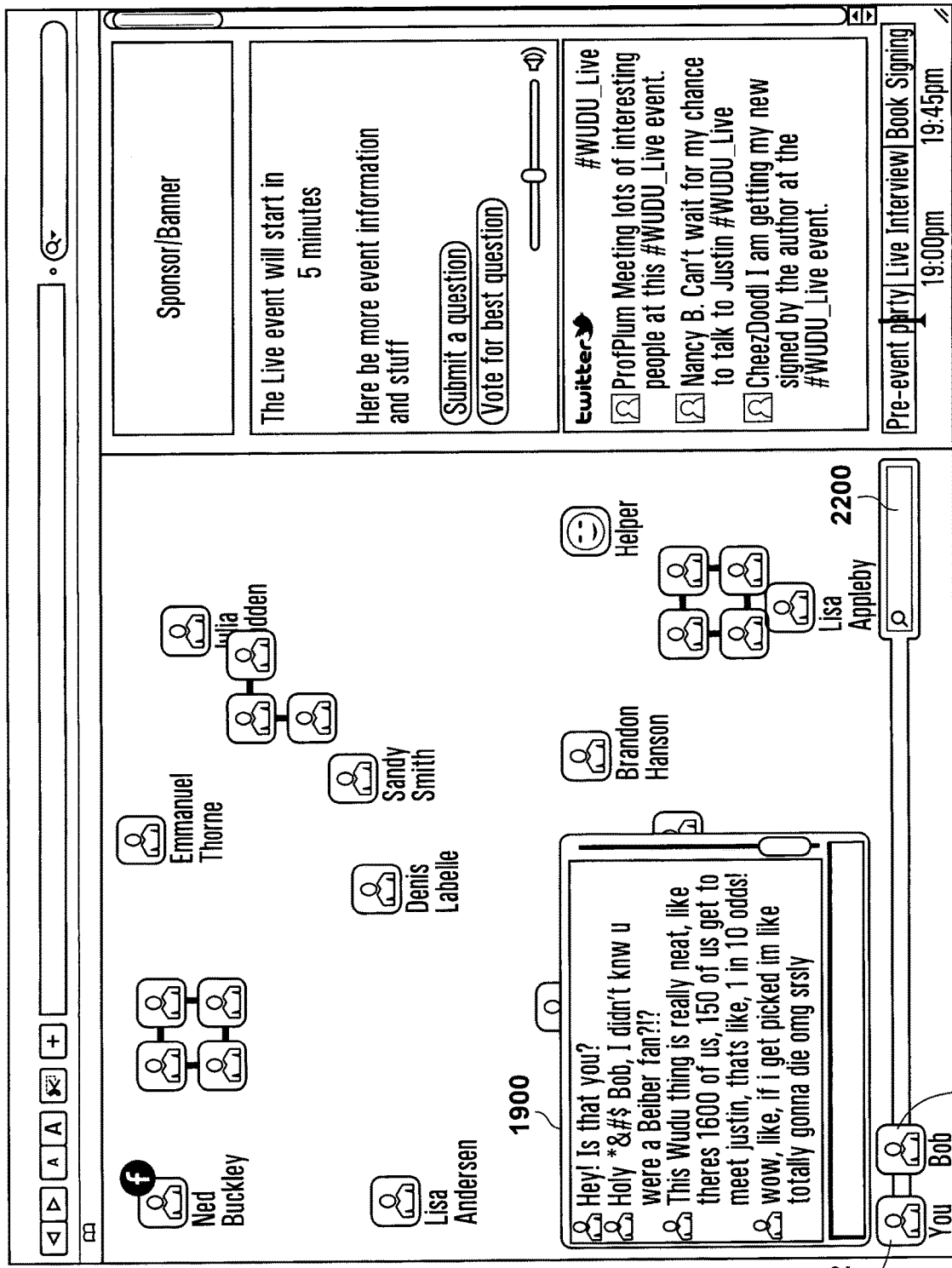
FIG. 8 is an illustration of an example screenshot of the attendee interface, according to some embodiments.

When attendee 142 accepts the prompt from attendee 142d to interact, online chat manager 162 may be configured to cause user interface subsystem 146 to display on attendee interface 500 an indication that attendee 142 and attendee 142d are engaged in an interaction. For example, as shown in FIG. 8, when attendee 142 accepts the prompt from attendee 142d to engage in an interaction, online chat manager 162 may be configured to cause user interface subsystem 146 to display on attendee interface 500 a graphical animation where the icon representative of attendee 142d may be associated with the icon representative of attendee 142. For example, the graphical animation may be a transition to be more proximate to attendee 142. In some embodiments, online chat manager 162 may be configured to cause user interface subsystem 146 to display on attendee interface 500 an attendee chat window 1900. In some embodiments, a chat history between one attendee and another attendee may be stored on database 190. Online chat manager 162 may be configured to cause user interface subsystem 146 to provide at least a portion of the chat history to facilitate interaction between attendees. In some embodiments, online chat manager 162 may be configured to cause user interface subsystem 146 to provide one or more profile data of an attendee to another, for example, in a notification window, while the attendees are engaged in an interaction. This may allow the interaction between attendees to be engaging and memorable.

Online chat manager 162 may be configured to cause user interface subsystem 146 to display a notification on attendee interface 500, for example, while an attendee is engaging in an interaction with another attendee. For example, a notification window 1500 associated with moderator 144 may be displayed on attendee interface 500, and may contain a notification message to alert attendee 142. In some embodiments, the alert may be to notify attendee 142 of the commencement of the online event. In some embodiments, an alert may be associated with any attendee attending the online event, such as an event sponsor. For example, online chat manager 162 may be configured to cause user interface subsystem 146 to display an icon associated with an attendee representative of a particular attendee, such as a sponsor. An event sponsor may be able to provide notifications to all attendees, such as provide offers to purchase items or to interact with attendees.

In some embodiments, one attendee may interact with another attendee via text, audio, video, or any combination thereof.

An attendee may choose to conclude an interaction with another attendee. Attendee 142 may conclude the interaction with attendee 142d. Online chat manager 162 may be configured to cause user interface subsystem 146 to display on attendee interface 500 a graphical animation where the icon representative of attendee 142d may not be associated with the icon representative of attendee 142. For example, the graphical animation may be a transition away from attendee 142. In some embodiments, online chat manager 162 may be configured to cause user interface subsystem 146 to display an icon associated with attendee 142d to identify to attendee 142 that there was a previous interaction with attendee 142d. Online chat manager 162 may be configured to cause user interface subsystem 146 to not display attendee chat window 1900 on attendee interface 500.

In some embodiments, system 10 may be configured to provide a search functionality. Online chat manager 162 may detect a search input from attendee 142 and may review the profile data generated by profile manager 149 stored on database 190. Based on the review of profile data, online chat manager 162 may be configured to cause user interface subsystem 146 to display on attendee interface 500 a search result screen that may display one or more icons representative of the search input provided by attendee 142. For example, user interface subsystem 146 may display on attendee interface 500 a search window 2200. Attendee 142 may input via a computer device a search input in search window 2200. Based on the search input, user interface subsystem 146 may display on attendee interface 500 a search results window, which may contain one or more icons representative of the search input, such as icons representative of attendees, icons representative of groups of attendees, or icons representative of a profile stored on database 190.

Figure 9:
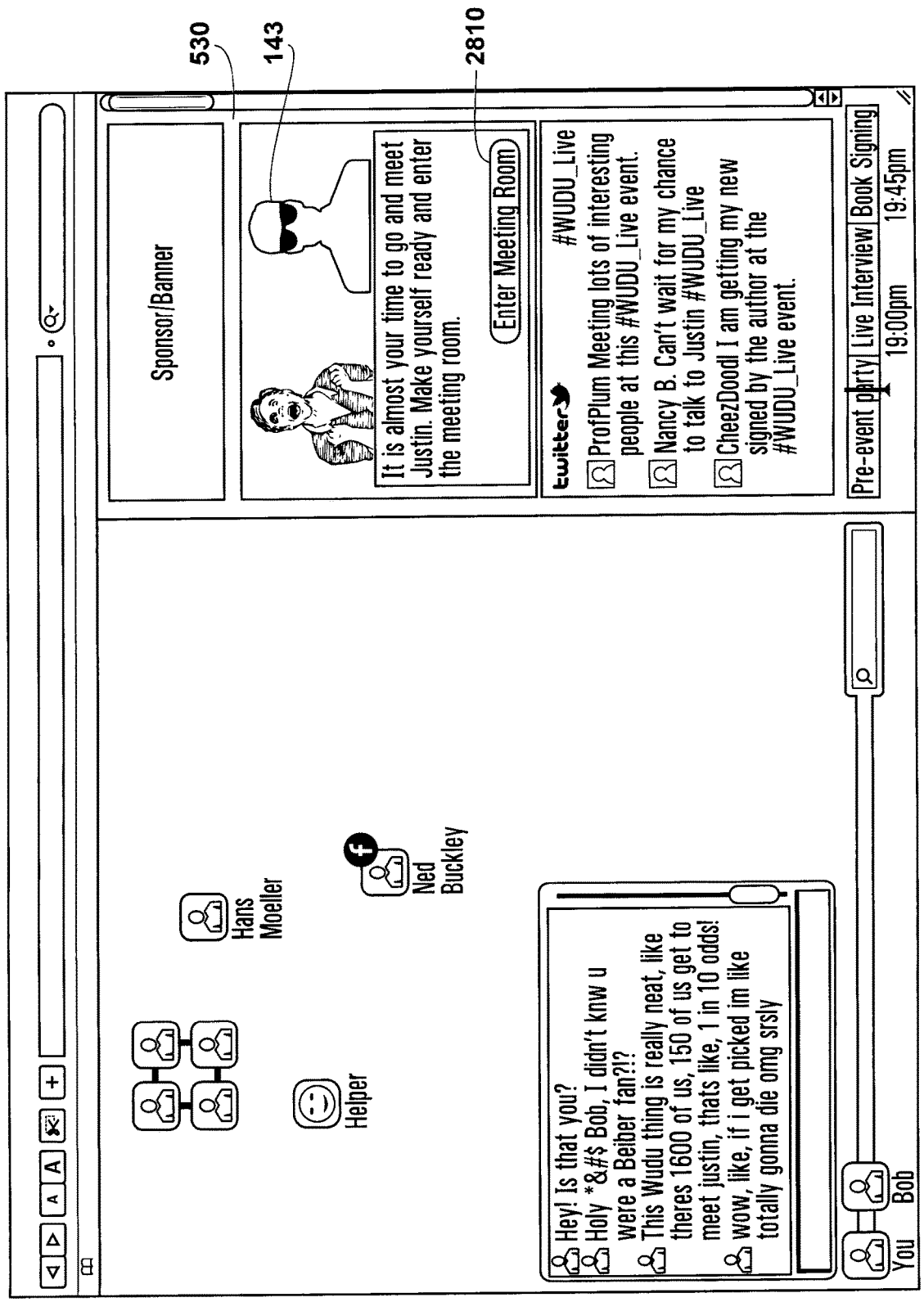
FIG. 9 is an example illustration of the information panel in the attendee interface, according to some embodiments.

Online chat manager 162 may be configured to cause user interface subsystem 146 to display on attendee interface 500 an indication that an online event has commenced. For example, information panel 530 may be changed to show the video stream of leader 143 and/or a host 145, as illustrated in FIG. 9. Attendee 142 may pay attention to the video stream of leader 143 displayed on the attendee interface 500, or may continue to interact with other attendees in the waiting room. In some embodiments, leader 143 may interact with one or more attendees during the online event, such as a question and answer session. For example, attendee 142 may input a question to be answered by leader 143. Leader 143 and/or moderator 144 may acknowledge the question from attendee 142. Online chat manager 162 may receive the inputs representative of the question from attendee 142 and may cause administrative interface subsystem 148 and/or user interface subsystem 146 to display the question on moderator interface 4100 or leader interface 3000. The moderator 144 and/or leader 143 may provide an input to system 10 representative of an approval or disapproval of the question. If the question is approved by moderator 144 and/or leader 143, leader 143 may answer the question. For example, the leader 143 may answer the question via text, audio, video, or any combination thereof. The question may be displayed on information panel 530 for other attendees to see. A host 145 may ask prepared questions or may ask questions provided by one or more attendees.

An attendee may adjust the attendee interface 500, for example, to focus more on leader 143. Attendee 142 may adjust the size of interaction panel 520 and/or information panel 530. Attendee 142 may input a command representative of adjusting the size of interaction panel 520 and/or information panel 530 via a computer device connected to server 140, for example, dragging one or more sides of the interaction panel 520 and/or information panel 530. Online chat manager 162 may receive the command and may case user interface subsystem 146 to display a different size of interaction panel 520 and/or information panel 530.

In some embodiments, one or more attendees and leader 143 may engage in a one on one interaction. An attendee may be able to participate in a one on one session with leader 143 based on, for example, satisfying certain eligibility criteria which may be configured by moderator 144. For example, an attendee 142 may have purchased a digital ticket or token that may allow the attendee to have a one on one interaction with leader 143. As another example, an attendee 142 may have prompted an interested to participate in a one on one interaction with leader 143. Moderator 144 may review the profile data of attendee 142, may determine that the attendee is an appropriate candidate for a one on one session, and may select the attendee to have a one on one interaction with leader 143. An attendee 142 may observe the one on one interaction between another attendee and leader 143. For example, the video streams and/or audio streams of the other attendee and leader 143 during the one on one session may be provided on the attendee interface 500 of attendee 142. Online chat manager 162 may determine the amount of time remaining until the one on one interaction between an attendee 142 and leader 143 may begin. Said amount of remaining time may be displayed on attendee interface 500. Prior to engaging in the one on one interaction with leader 143, attendee 142 may be able to test the computer device connected to server 140 to ensure that the one on one interaction will be successful.

Online chat manager 162 may be configured to notify attendee 142 that the one on one interaction with leader 143 may begin. Online chat manager 162 may cause user interface subsystem 146 to display a warning, and may also display a button that may allow attendee 142 to enter the one on one interaction as illustrated in FIG. 9. While waiting to enter the one on one interaction, attendee 142 may choose to not leave their computer device.

Figure 10:
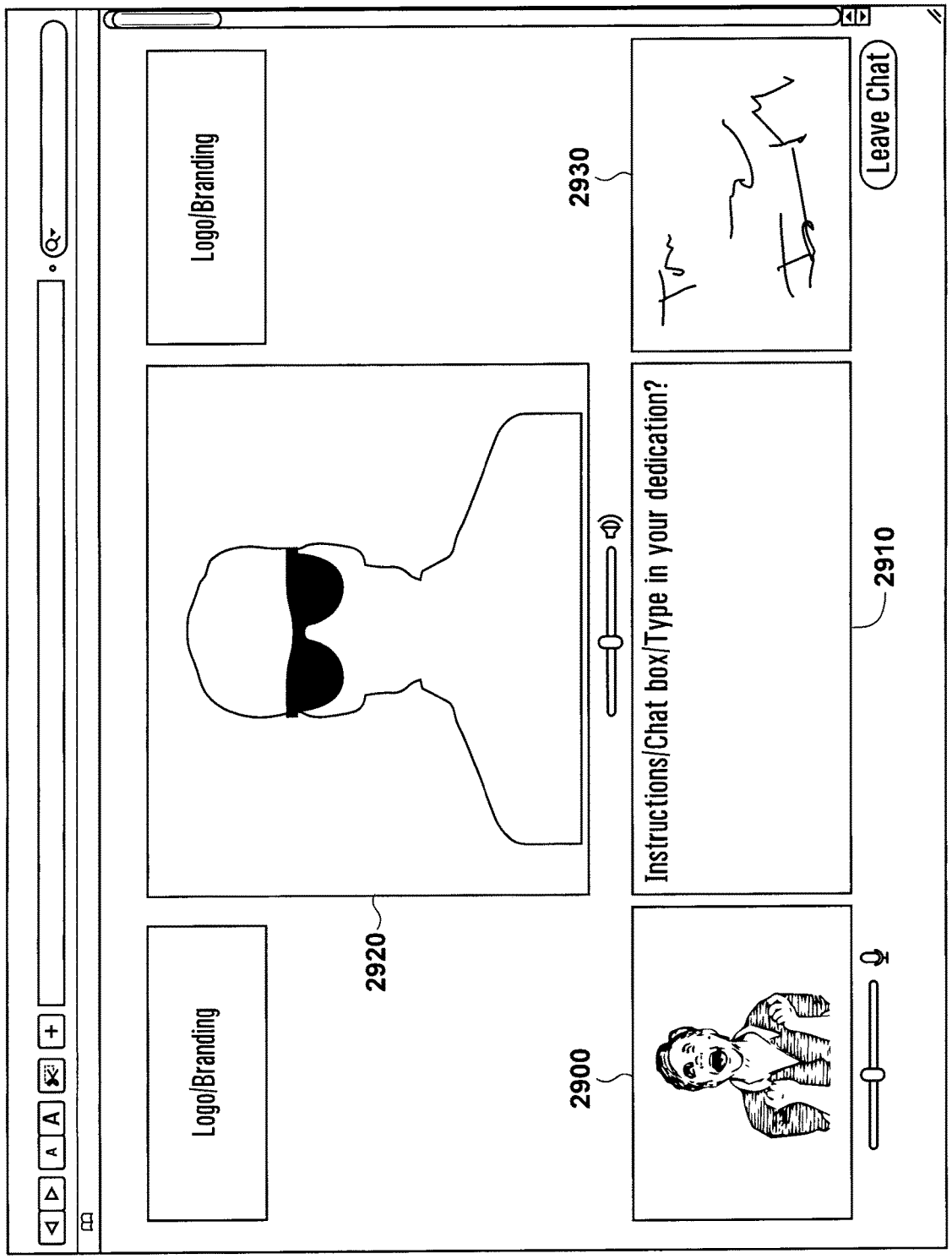
FIG. 10 is an example illustration of the attendee interface during an interaction, according to some embodiments.

In some embodiments, attendee interface 500 may be changed by online chat manager 162 before or when an attendee 142 engages in a one on one interaction with leader 143. For example, attendee interface 500 may display a "green room", as illustrated in FIG. 10. In some embodiments, one or more attendees may be waiting in the "green room" to have a one on one interaction with leader 143. Moderator 144 may assist one or more attendees 142 with technical problems. Online chat manager 162 may cause user interface subsystem 146 to generate a notification outlining the expected conduct and behaviour of attendee 142 and leader 143 during the one on one interaction.

System 10 may assess whether an attendee may be an appropriate candidate to have a one on one interaction with leader 143. Online chat manager 162 may generate a recommendation regarding the degree of appropriateness of an attendee 142 to have a one on one interaction with leader 143 based on profile data of attendee 142. For example, online chat manager 162 may review the profile data of an attendee 142. Online chat manager 162 may review the interest level that the attendee 142 may have for leader 143, such as an analysis of the conversations that attendee 142 may have with other attendees, the number of previous online events relating to leader 143 attended by attendee 142, and/or if the attendee 142 has been blocked by leader 143 and/or moderator 144 due to inappropriate conduct during a previous one on one interaction. Based on the review of the profile data of attendee 142, online chat manager 162 may generate a notification to moderator 144 representative of whether the attendee may be an appropriate candidate to have the one on one interaction with leader 143. System 10 may allow an interested attendee 142 to have an engaging and memorable experience with leader 143, and may prevent previous attendees 142 who demonstrated inappropriate behaviour conduct to participate in a one on one interaction with leader 143. In some embodiments, moderator 144 may review the profile data of one or more attendees 142 to determine if the attendee 142 may be an appropriate candidate to have the one on one interaction with leader 143.

As shown in FIG. 10, online chat manager 162 may be configured to cause user interface subsystem 146 to display the video stream of leader 143 in a leader video window 2920. The waiting room may not be displayed so attendee 142 may not be distracted during the one on one interaction. Attendee 142 may view the attendee video stream in attendee video window 2900, for example, to ensure the video stream is operational and to review the appearance of attendee 142. Attendee 142 and leader 143 may interact via text, audio, video, or any combination thereof. Attendee 142 and leader 143 may interact by text via text window 2910. Leader 143 may provide an authenticated artifact, such as a signed and/or personalized book or digitally signed and/or personalized e-book, to attendee 142. Attendee 142 may view a video stream of the leader 143 providing the authenticated artifact in authenticated artifact window 2930. For example, if attendee 142 purchased an e-book to be signed by leader 143, at least a portion of the e-book may be visible in authenticated artifact window 2930 and attendee 142 may watch leader 143 apply a signature on the e-book.

In some embodiments, one or more attendees 142 may re-watch the online event. Online chat manager 162 may be configured for one or more attendees 142 to review one or more recorded video streams of the online event recorded by video stream subsystem 160. The online chat manager 162 may be configured to allow only certain recorded video streams to be re-watched by the one or more attendees. For example, online chat manager 162 may review the video streams recorded by video stream subsystem 160, and may flag one or more video streams as appropriate to be re-watched, such as one or more one on one interactions between an attendee 142 and the leader 143. Online chat manager 162 may allow one or more video streams flagged as appropriate to be re-watched to be displayed on the attendee interface 500 for one or more attendees 142 to view.

In some embodiments, system 10 may authenticate the identity of one or more attendees 142, leader 143, and/or moderator 144 based at least on a portion of a video stream that may be recorded by system 10, for example, by video stream subsystem 160. In some embodiments, an image of one or more attendees 142, leader 143, and/or moderator 144 may be provided to system 10 to be stored on database 190 or may already be stored on database 190, for example, from a previous online event. The image of one or more attendees 142, leader 143, and/or moderator 144 may be associated with the profile of one or more attendees 142, leader 143, and/or moderator 144. The video stream of one or more attendees 142, leader 143, and/or moderator 144 may be recorded by video stream subsystem 160 and may be compared by authentication subsystem 158 to images on file of one or more attendees 142, leader 143, and/or moderator 144 to verify their identity.

The identity of leader 143 may be verified by system 10 to ensure that the actual leader 143 is attending the online event. Authentication subsystem 158 may control when the video stream subsystem 160 records the video stream of leader 143. For example, when leader 143 first signs into the online event, authentication subsystem 158 may control video stream subsystem 160 to record the video stream of leader 143 to perform verification of the identity of leader 143. Upon verification of the identity of leader 143, authentication subsystem 158 may record that the identity of leader 143 is verified and may store the verification in the profile associated with leader 143, which may be stored in database 190.

The identity of one or more attendees 142 and/or moderator 144 may be verified to ensure that the one or more attendees 142 and/or moderator 144 may attend and/or participate at the online meeting, for example in a one on one interaction with leader 143. Authentication subsystem 158 may control when the video stream subsystem 160 records the video stream of one or more attendees 142 and/or moderator 144. For example, when one or more attendees 142 first signs into the online event, authentication subsystem 158 may control video stream subsystem 160 to record the video stream of one or more attendees 142 to perform verification of the identity of one or more attendees 142 and/or moderator 144. As another example, the identity of one or more attendees 142 may be verified before engaging in a one on one interaction with leader 143, such as while the one or more attendees 142 is waiting in the "green room". The identity of one or more attendees 142 may be verified by system 10 to check that the one or more attendees 142 may be an appropriate candidate for a one on one interaction with leader 143. For example, system 10 may verify the identity of one or more attendees 142 and may confirm the identity based on an image associated with a profile stored in database 190. Online chat manager 162 may review the profile associated with the one or more attendees 142, for example, to look for previous instances of interest displayed by the one or more attendees 142 and/or inappropriate conduct during a previous one on one session. Online chat manager 162 may generate a positive or negative recommendation for the one or more attendees 142 to engage in a one on one session with leader 143 based on the verified identity of the one or more attendees 142. Upon verification of the identity of one or more attendees 142 and/or moderator 144, authentication subsystem 158 may record that the identity of one or more attendees 142 and/or moderator 144 is verified and may store the verification in the profile associated with the one or more attendees 142 and/or moderator 144, which may be stored in database 190.

The authenticated artifact and/or digital recording of the interaction between attendee 142 and leader 143 may be verified by at least a portion of a video stream, which may be recorded by video stream subsystem 160. Authentication subsystem 158 may control when the video stream subsystem 160 records the video stream of the artifact being authenticated and/or digital recording of the interaction between attendee 142 and leader 143. For example, authentication subsystem 158 may control video stream subsystem 160 to record the video stream of the leader 143 signing the artifact, or an interaction between attendee 142 and leader 143. Upon verification of the authenticated artifact and/or digital recording of the interaction between attendee 142 and leader 143, authentication subsystem 158 may record that the authenticated artifact and/or digital recording of the interaction between attendee 142 and leader 143 is verified and inventory management subsystem 152 may store the verification in database 190.

In some embodiments, the authentication subsystem 158 may verify the identity of a leader 143, attendees 142 and/or moderator 144 using means other than at least a portion of at least one recorded video stream of the leader 143, attendee 142, and/or moderator 144, and may verify the authenticity of an artifact or digital recording of an interaction between the leader 143 and an attendee 142. The authentication subsystem 158 may create an authentication file stored on database 190 to authenticate and provide audit capabilities. The authentication file may contain references encrypted with "hash" codes and other encryption that may refer to a unique identifier for a leader 143, attendee 142, or an artifact or digital recording, such as a unique tag; an audio/visual transaction record, for example, one recorded by video stream subsystem 160, to identify the leader, attendee, or the event of authenticating the authenticated artifact or the digital recording of the interaction between the leader 143 and attendee 142; biometric confirmation for authentic identification of participant(s); date and time stamps; and/or serial numbers and/or IP addresses of the hardware used for the purpose of the signing/dedication (e.g. IP address for the computer device associated with the leader 143, one or more attendees 142, and/or moderator 144, that was used for the authentication, and optionally the authentication subsystem 158).

The authentication file may also include: identification data for the leader 143, attendee 142, and/or moderator 144 such as their username/password data, or the fact that a successful login using this data was processed; one or more audio or video streams related to the online event for authentication purposes (video images of the leader 143, attendee 142, and/or moderator 144, for example, may be compared to images on file to establish identity); or be linked to a digital signature verification system to which the leader 143, one or more attendees 142, and/or moderator 144 has been registered. In one particular implementation of the present invention, the authentication file may be a coded file that when opened will retrieve files associated with the authentication file and optionally will execute a program to extract the information that serves to authenticate the transaction. In one particular aspect of the present invention, the authentication file may verify the identity of the leader 143, the one or more attendees 142, and/or moderator 144 or verify that the leader 143 provided the authenticated artifact or digital recording of the interaction between the leader and the attendee. The authentication file may be stored in database 190 and used to validate the identity of the leader 143, the one or more attendees 142, moderator 144, or the authenticity of the artifact or digital recording of the interaction between the leader 143 and attendee 142 if there is a request for validation.

For example, when leader 143 may sign into an online event where there may be no video component. Authentication subsystem 158 may review the IP address for the computer device associated with the leader 143 and the fact that the leader 143 successfully logged into the online event to authenticate that the leader 143 has signed into the online event. As another example, authentication subsystem 158 may prompt leader 143 to input a signature via their computer device, for example on a tablet. The electronic signals representative of the leader's handwritten signature may be communicated to server 140, where authentication subsystem 158 may compare the characteristics of the leader's handwritten signature to the biometric features of the leader's handwritten signature associated with the leader's profile stored in database 190, such as the pressure, velocity, acceleration, and pressure associated with the leader's handwritten signature. The identity of one or more attendees 142 and/or moderator 144 may be verified in an analogous manner. Authentication subsystem 158 may verify the identity of the leader 143, one or more attendees 142, and/or moderator 144 has signed into the online event based on means other than at least a portion of a recorded video stream.

Figure 11:
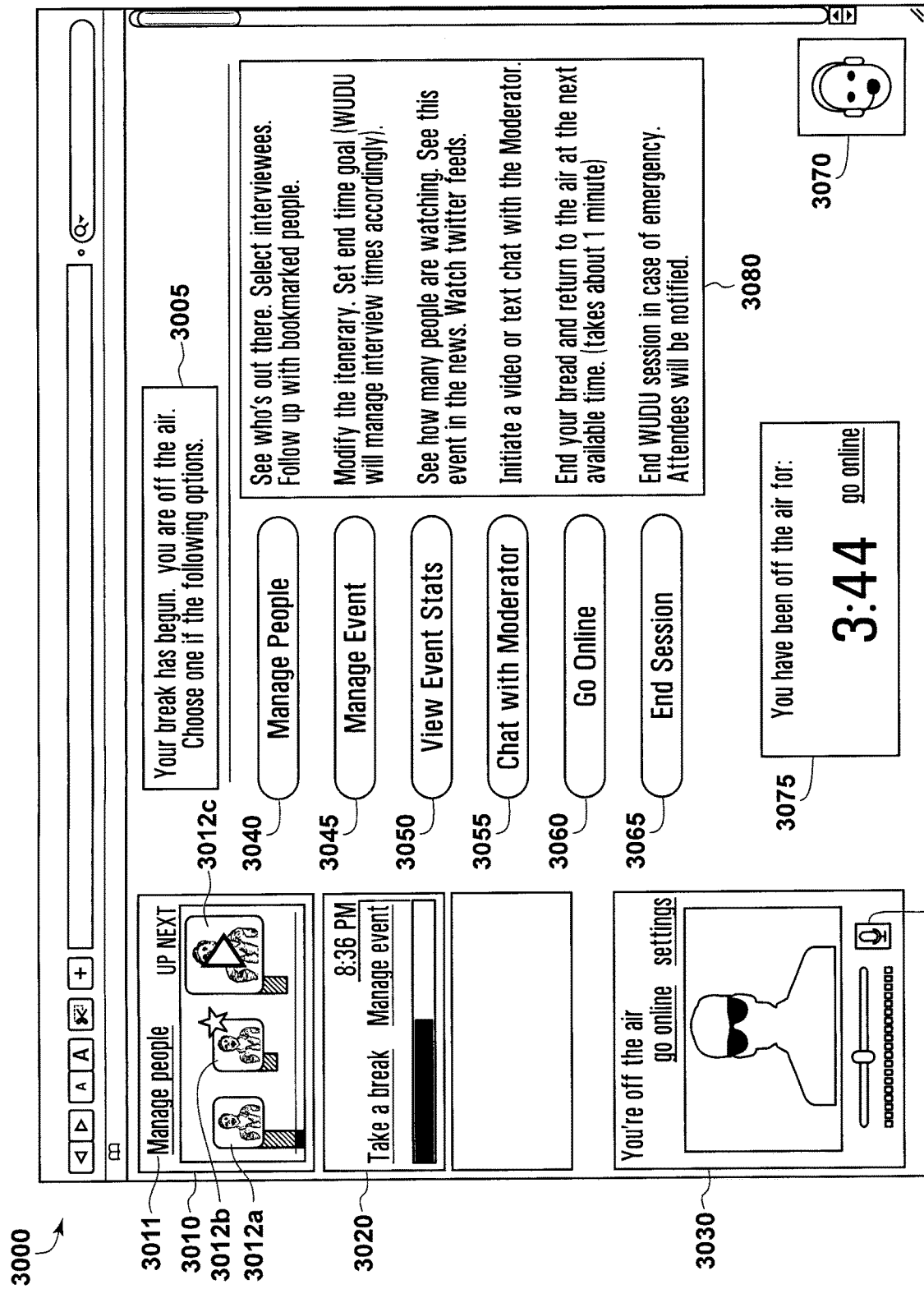
FIG. 11 is an example illustration of the leader interface, according to some embodiments.

FIG. 11 illustrates an example of leader interface 3000 displayed by user interface subsystem 146. The leader interface 3000 as shown in FIG. 11 may be displaying a break screen according to an embodiment of the invention, as indicated by leader interface title 3005. In some embodiments, the leader interface 3000 may be displaying a welcome screen. Leader 143 may view the leader interface 3000 as illustrated in FIG. 11 when not interacting with one or more attendees 142 and/or moderator 144. Leader 143 may interact with system 10 through leader interface 3000 to control and/or participate in an online event, such as setting the itinerary of the online event, reviewing information, and/or communicating with the moderator 144 and/or one or more attendees 142 via text, audio, video, or any combination thereof.

In some embodiments, leader interface 3000 may be configured to provide leader 143 with control over the online event. The leader interface 3000 may be configured to be functional without being overwhelming for leader 143. Online chat manager 162 may be configured to cause user interface subsystem 146 to provide feedback, such as with visual indicators, to guide the behaviour of leader 143. For example, For example, online chat manager 162 may be configured to detect the end of a one of one interaction between an attendee 142 and leader 143. Upon the end of the one on one interaction, user interface subsystem 146 may cause an icon to display on leader interface 3000 to prompt leader 143 to trigger the next one on one interaction with another attendee. In some embodiments, moderator 144 may communicate with leader 143 or provide one or more prompts to leader 143 to guide the behaviour of leader 143. A leader 143 may control online events without any prior technical skill. A leader 143 may control the online event without assistance from a moderator 144.

Figure 12:
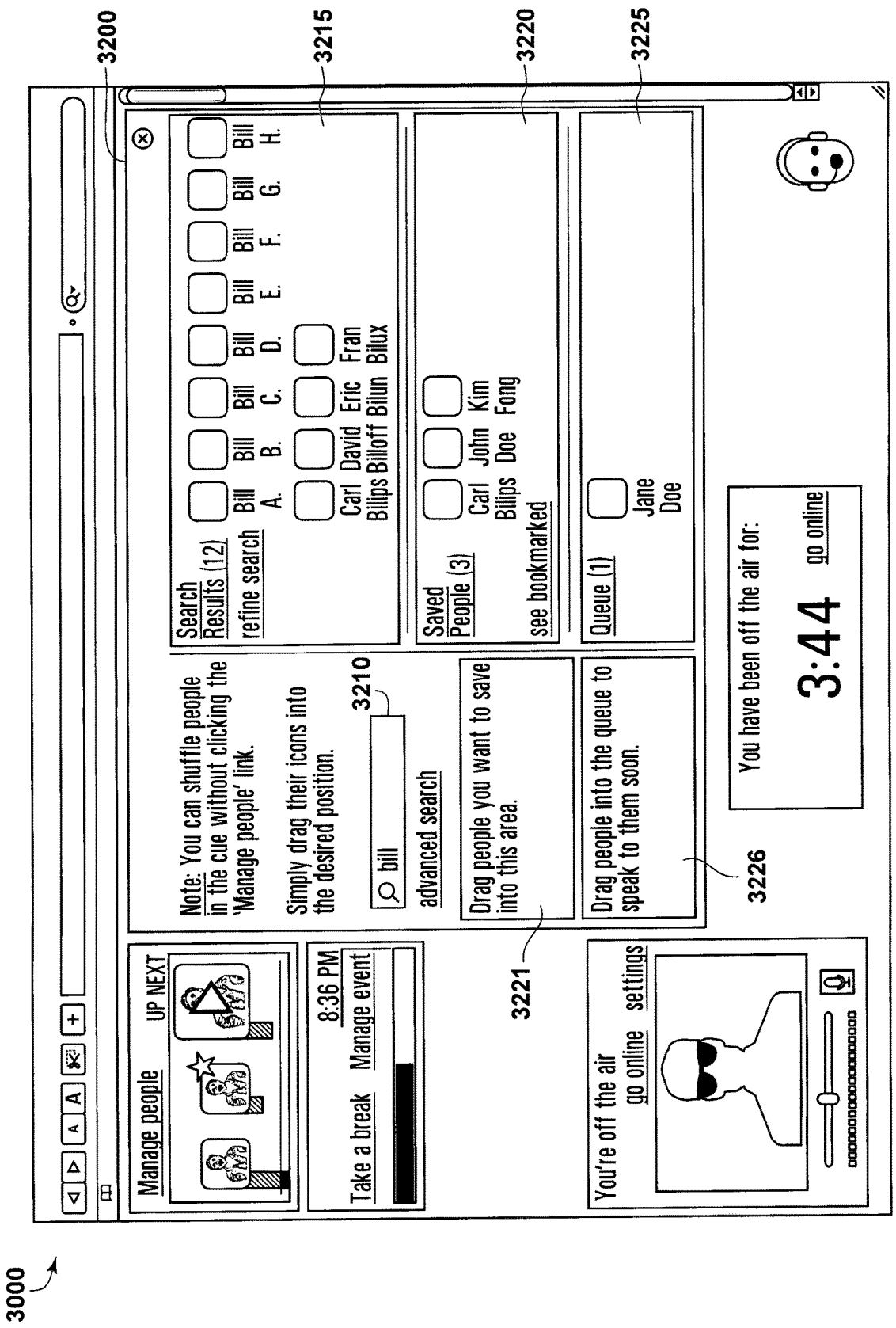
FIG. 12 is an example illustration of the leader interface, according to some embodiments.

In some embodiments, the online event may be configured for leader 143 to manage the one or more attendees 142. Online chat manager 162 may cause user interface subsystem 146 to display on the leader interface 3000 an attendee management applet 3010. In some embodiments, the attendee management applet 3010 may contain a manage people link 3011 that may be activated by the leader 143. As a non-limiting example, the leader 143 may click or tap the link. Once activated, the manage people link 3011 may activate the attendee management module 3200 as illustrated in FIG. 12.

In some embodiments, the attendee management applet 3010 may display to the leader 143 a sequence of upcoming events. The attendee management applet 3010 may, as a non-limiting example, display a row of icons 3012A, 3012B, 3012C representing one or more attendees queued to interact with the leader 143. In some embodiments, the leader may activate icons 3012A, 3012B, 3012C in the attendee management applet 3010 to immediately trigger the next event in sequence, for example, the leader 143 may tap or click icons.

In some embodiments, online chat manager 162 may cause user interface subsystem 146 to display on the leader interface 3000 a time management applet 3020 that may display to the leader 143 such information as the time of day and/or the time remaining in the online event and/or the time remaining in a portion of the online event. In some embodiments, the time management applet 3020 may contain links that, when activated, may cause the system to activate a leader break view and/or the attendee management module 3200.

In some embodiments the leader interface 3000 may include a broadcast management module 3030 that may provide the leader 143 with information about the quality of their own video stream. Information displayed by the broadcast management module 3030 may include, but is not limited to, a display of the leader's video stream, a graphical representation of the leader's audio signal quality, and/or audio and/or video controls 3035 that may allow the leader 143 to activate and/or deactivate the audio and/or video stream.

In some embodiments, the leader interface 3000 may display one or more buttons for leader 143 to interact with server 140.

For example, the leader interface 3000 may include a manage people button 3040. When activated, online chat manager 162 may allow the leader 143 to view a people management view interface, which may contain the attendee management module 3200. The attendee management module 3200 may be used by leader 143 to view the attendees 142 that may have attended the online event, select potential attendees 142 as interviewees, and/or to follow up with bookmarked attendees 142.

Figure 13:
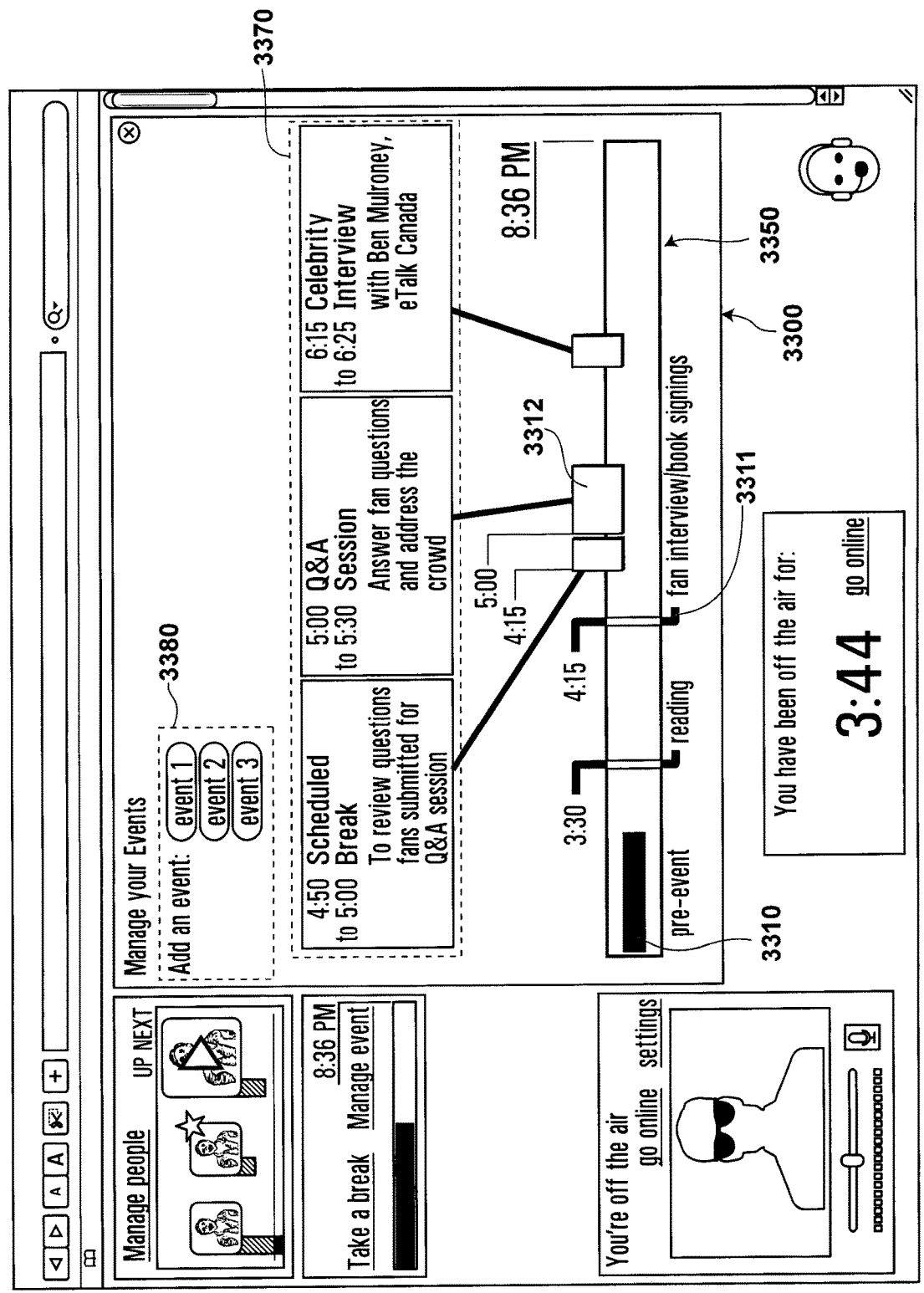
FIG. 13 is an example illustration of an event management interface, according to some embodiments.

For example, the leader interface 3000 may include a manage event button 3045. When activated, online chat manager 162 may allow the leader 143 to view the event management interface 3300 as illustrated in FIG. 13. Leader 143 may manage the aspects of the online event, such as modifying the itinerary and setting the end time of the online event.

For example, the leader interface 3000 may include a view event statistics 3050 button. In some embodiments, when the view event statistics 3050 button is activated, online chat manager 162 may cause information generated by analytics subsystem 154 about the online event to be displayed on leader interface 3000 to the leader 143. This information may include, but is not limited to, the number of attendees or attendees in the online event, news articles relating to the online event, and/or statistical analysis of data collected about the online event, non-limiting examples being the number of mentions the online event has received on one or more social media platforms, and/or the number of times the online event has been searched in one or more search engines.

For example, the leader interface 3000 may include a contact moderator button 3055. When activated, online chat manager 162 may allow the leader 143 to communicate with moderator 144. In some embodiments, online chat manager 162 may allow the leader 143 and moderator 144 to communicate via text, voice, video, or any combination thereof.

For example, the leader interface 3000 may include an activate broadcast mode button 3060. When activated, online chat manager 162 may allow the leader 143 to interact with one or more attendees 142.

For example, the leader interface 3000 may include an end session button 3065. When activated, online chat manager 162 may allow the leader 143 to end the online event immediately. One or more attendees 142 may be notified of the end of the online event.

For example, the leader interface 3000 may include a leader moderator communication button 3070. When activated, online chat manager 162 may allow the leader 143 to contact moderator 144. In some embodiments, online chat manager 162 may allow the leader 143 and moderator 144 to communicate via text, voice, video, or any combination thereof.

For example, the leader interface 3000 may include an offline time notification 3075. Offline time notification 3075 may be displayed by user interface subsystem 146 on leader interface 3000 when the leader is not interacting with one or more attendees, such as when the leader 143 is on a break. Offline time notification 3075 may notify leader 143 the amount of time that the leader 143 has been offline. Offline time notification 3075 may not be displayed on leader interface 3000 when leader 143 first signs into the online event. Online chat manager 162 may review the engagement and/or activity of one or more attendees 142 and may notify leader 143 to interact with one or more attendees to maintain the engagement level or interest level of one or more attendees 142.

In some embodiments the leader interface 3000 may include an instruction panel 3080, which may be associated with one or more buttons displayed on leader interface 3000. The instruction panel 3080 may provide an explanation as to the function of one or more buttons displayed on leader interface 3000.

In some embodiments, online chat manager 162 may determine the one or more buttons that may be displayed on the leader interface 3000 and the functionalities associated with the one or more buttons. For example, brand interface subsystem 150 may apply one or more brand characteristics to moderator interface 4100, attendee interface 500, and/or leader interface 3000. The brand associated with the online event or the purpose of the online event may be considered by online chat manager 162 to provide one or more buttons with one or more functionalities.

In some embodiments, the leader interface 3000 may be configured to display passive status indicators, which may include, but are not limited to, the attendee management applet 3010, the time management applet 3020, the broadcast management module 3030, and the audio and/or video controls 3035. The leader interface 3000 may be configured to display and the leader moderator communication button 3070.

FIG. 12 illustrates an example of an attendee management module 3200. Online chat manager 162 may cause user interface subsystem 146 to display on the leader interface 3000 to display attendee management module 3200 when, for example, through attendee management applet 3010 and/or when leader 143 activates manage people button 3040. The attendee management module 3200 may be configured to present one or more modules and/or buttons configured to facilitate the leader 143 to perform various user related functions. For example, leader 143, via the attendee management module 3200, may search for one or more attendees 142. Leader 143 may bookmark or save the icon representative of the attendee 142, and may queue one or more attendees 142 to interact with the one or more attendees 142. The queue of one or more attendees 142 may allow leader 143 and/or moderator 144 to facilitate interaction between the one or more attendees 142 and leader 143. In some embodiments, online chat manager 162 may automatically cause leader 143 and an attendee 142 queued by leader 143 to engage in a one on one interaction upon completion of a prescribed condition, such as a timer, action, or payment by the queued attendee 142.

The attendee management module 3200 may include a search box 3210 allowing the leader 143 to enter a query. Online chat manager 162 may review database 190 to generate search results based on the query of the leader.

The attendee management module 3200 may provide a search results interface 3215 that may be configured by user interface subsystem 146 to display to the leader 143 the results of one or more queries entered into the search box 3210.

In some embodiments, the search results interface 3215 may allow the leader 143 to interact with the icons representative of the search results (e.g., by clicking or tapping icons representing the corresponding attendee 142) and cause the server 140 to perform certain functions. This may include causing the online chat manager 162 to alter or flag records stored in database 190. For example, the leader 143 may click and drag one or more icons representing an attendee 142 to the save user drop zone 3221 which may cause online chat manager 162 to add a flag to the profile corresponding to the attendee 142 and/or cause that icon to be displayed in the saved contacts interface 3220.

The saved contacts interface 3220 may display to the leader 143 a list of previously saved contacts from the current online event or one or more previous online events. These contacts may be represented by various means, including, but not limited to, icons, avatars, or lines of text. The saved contacts interface 3220 may also allow the leader 143 to save contacts to database 190, for example by dragging and dropping results from the search results interface 3215 onto the save user drop zone 3221. Online chat manager 162 may create a saved contacts file associated with the profile of leader 143, and may populate the saved contacts file with profile data associated with the attendee 142 that leader 143 has saved. The saved contacts file may be stored in database 190.

Saved contacts interface 3220 may allow the leader 143 to manipulate the display of the saved contacts, for example, by clicking, dragging, or tapping icons representing the attendee 142 in order to re-order them. Saved contacts interface 3220 may allow the leader 143 to automatically arrange saved contacts, for example in alphabetical order.

Broadcast queue interface 3225 may display to the leader 143 a sequence of items to be broadcast in order. Such items may include, but are not limited to, video and/or audio clips, photographs, digital images, text, and/or live video and audio feeds.

The broadcast queue interface 3225 may allow the leader to add to the sequence of items, for example by dragging and dropping saved contacts from the saved contacts interface 3220 onto the broadcast queue drop zone 3226. The broadcast queue interface 3225 may allow the leader 143 to re-order the sequence, for example by clicking, dragging, and dropping items within the broadcast queue interface 3225 to the left or right of one another.

FIG. 13 illustrates an example of event management interface 3300 of the leader interface 3000 according to an embodiment of the invention. The event management interface 3300 of the leader interface 3000 may display information and/or provide controls that may enable the leader 143 to control and/or organize the online event. In some embodiments, the leader 143 and/or moderator 144 may control and/or organize the online event.

The event management interface 3300 may contain a time elapsed indicator 3310 and an event indicator 3311 that may display information to the leader 143 and/or moderator 144, including, but not limited to, the amount of time that has elapsed since the online event began, the amount of time remaining until the online event's scheduled end, and/or the point in an online event when specific activities may be scheduled, a non-limiting example being an interview with an attendee. The estimated completion time of an event may be displayed by the event management interface 3300. The estimated completion time may be changed by leader 143 and/or moderator 144. This may cause the event management interface 3300 to update and render new information to the leader 143 and/or moderator 144. For example, the leader 143 may extend the amount of time allotted for one on one interactions with attendees. Online chat manager 162 may cause user interface subsystem 146 to display the amount of time for each remaining one on one interaction, which may be determined by dividing the available time by the number of remaining one on one interactions.

The event management interface 3300 may make use of contextual menus. An example of such a contextual menu is the event indicator contextual menu 3312. The event indicator contextual menu 3312 may, upon certain pre-programmed conditions, provide the leader 143 with additional information, a non-limiting example being presenting the leader 143 with an image or avatar of an attendee 142 when the leader 143 causes a mouse cursor to hover above a specific point on the time elapsed indicator 3310 corresponding to a time when attendee 142 is scheduled to interact with the leader 143.

The event management interface 3300 may employ a timeline 3350. The timeline 3350 may display to the leader information pertaining to the online event and events scheduled to occur during the online event. For example, the timeline 3350 may encompass one or more time elapsed indicators 3310, event indicators 3311, event indicator contextual menus 3312, and/or timelines 3350, which may provide the leader 143 with access to online event information and/or controls.

The scheduled events pane 3370 may function to display information about one or more events scheduled to occur during an online event. Non-limiting examples may include scheduled break-times or scheduled times for a question/ answer session. The scheduled events pane 3370 may be configured by user interface subsystem 146 to display information related to the event scheduled to occur.

The event management interface 3300 may include an add event button 3380 that may, when activated, allow the leader 143 and/or moderator 144 to create one or more new events during an online event. As a non-limiting example, the add event button 3380, when activated with a mouse cursor, may cause the leader 143 to be presented with a form that, when submitted, may create an event at a time specified by leader 143 during the online event.

The leader interface 3000 may also provide a break view 3400, according to an embodiment of the invention The break view of the leader interface 3000 may enable leader 143 to gain information about the online event, manage online event timing, and review the audio and/or video stream of the online event. The break view may display the content provided by leader 143, for example a video stream of the leader 143. The break view may also contain a break time applet, which may, for example by a numerical timer, display the amount of time until the online event is scheduled to resume. The break time applet may also provide a means for the leader 143 to extend the duration of a break, and, thus, the amount of time during which the online event may be inactive. In an embodiment, the break time applet may employ a mouse-clickable button that, once activated, may present the leader with a menu providing various pre-determined time intervals at which to the break may be extended. In an embodiment, the break time applet may employ a mouse-clickable button that, once activated, may allow the leader 143 to enter a specific, numerical amount of time by which to extend the break. In an embodiment, where the leader 143, by use of the break time applet, causes the break to be extended, the break time applet may cause a timer contained within the break time applet to display a new value representing the amount of time remaining until the online event is scheduled to resume. The break view may display a time elapsed information panel, which may indicate to leader 143 the amount of time that the leader 143 has not been interacting with one or more attendees 142. Online chat manager 162 may review the amount of interaction and engagement by one or more attendees 142 and may notify leader 143 in break view that interest level of one or more attendees 142 for the online event may be lowering, and may prompt leader 143 to resume interaction with the one or more attendees.

Figure 14:
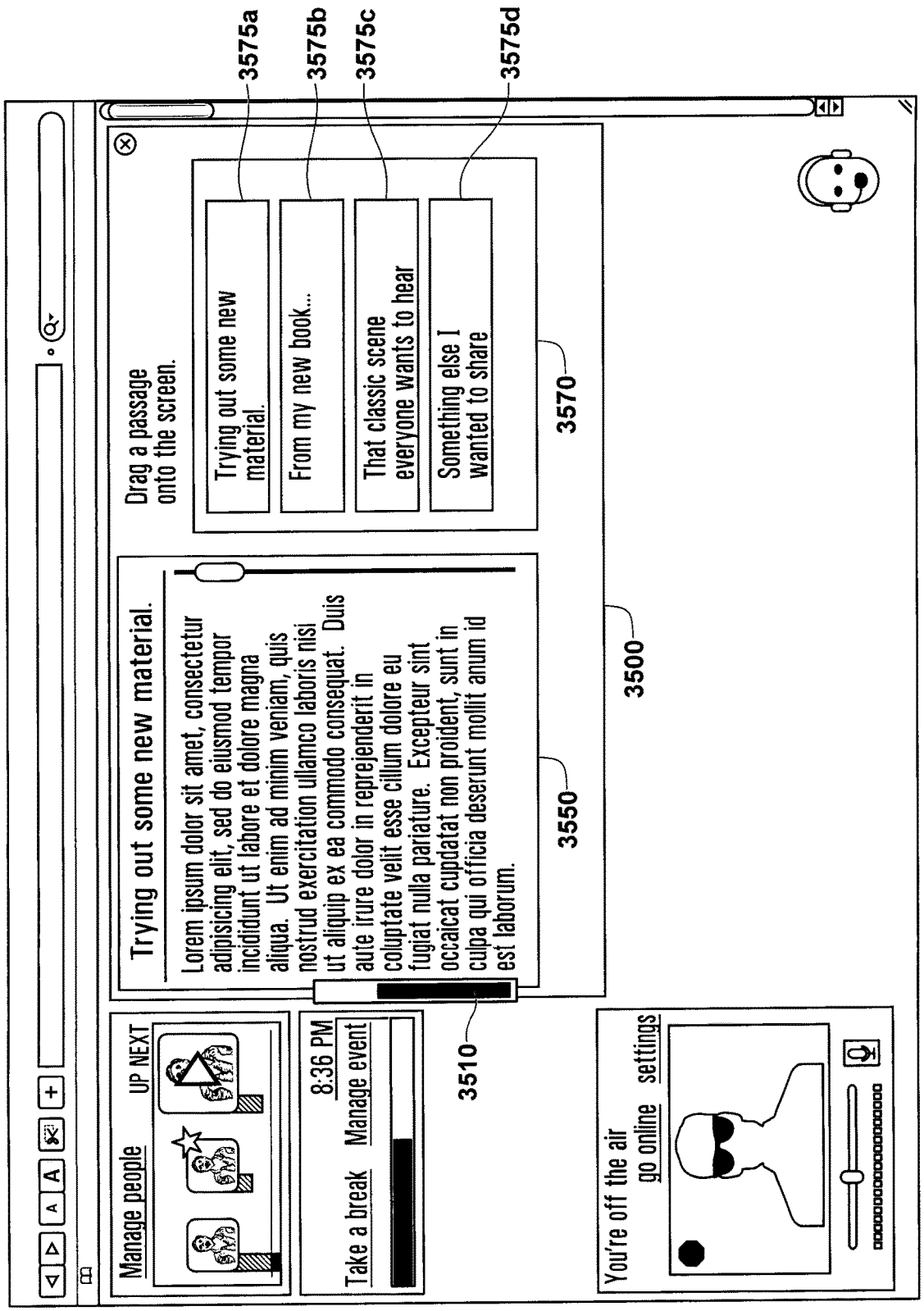
FIG. 14 is an example illustration of a presenter view of the leader interface, according to some embodiments.

FIG. 14 is an illustration of the presenter view 3500 of the leader interface 3000 according to an embodiment of the invention.

The presenter view 3500 of the leader interface 3000 may contain elements that may facilitate and enhance the leader's ability to present content to the one or more attendees 142 in an engaging fashion. The presenter view 3500 may contain a leader content applet 3570, which may contain one or more content modules, such as content modules 3575A-D designed to allow the leader 143 to easily incorporate and access various types of media which the leader 143 wishes to present or convey to the one or more attendees 143. In an embodiment, the leader may click and drag media files, a non-limiting example being a text document, to the leader content applet 3570. The leader content applet 3570 may then create a content module 3575A-D corresponding to the media file. The content module 3575A-D may contain a link to the location of the media file, and each content module 3575A-D may be represented to leader 143 by a corresponding user interface element, a non-limiting example being a clickable button within the leader content applet 3570. In some embodiments, when the leader 143 interacts with the user interface element representing the content module 3575A-D corresponding to a particular media file, for example, with a mouse click, the leader content applet 3570 may cause the contents of that media file to be displayed in the presenter view 3500. In some embodiments, the presenter view 3500 may be configured to resemble a teleprompter to facilitate the leader to address the one or more attendees 142, such as a reading of a passage to the one or more attendees 142. In some embodiments, leader 143 may address the one or more attendees 142 without a presenter view 3500 representative of a teleprompter. Leader 143 and/or moderator 144 may adjust the presenter view 3500 to assist leader 143, such as adjusting the font size used on the presenter view 3500.

The presenter view 3500 may be programmed to display content received from the leader content applet 3570 in specific pre-defined modes based on the specific contents of media files linked to content modules 3575A-D. For example, where a content module 3575A representing a media file containing textual data is activated, the presenter view 3500 may display that textual data to the leader 143 in a readable format and may automatically scroll through text at a pre-determined rate to facilitate reading by leader 143. In some embodiments, online chat manager 162 may detect an input from leader 143, for example an audio input from the leader through a microphone such as when the leader 143 reads text aloud, and may automatically scroll through the text displayed on presenter view 3500 at a rate corresponding to the leader's reading.

User interface subsystem 146 may display buttons representative of controls for leader 143 to control the presenter view 3500. For example, leader 143 may control the speed that the "teleprompter" presents the material to be read by leader 143.

Figure 15:
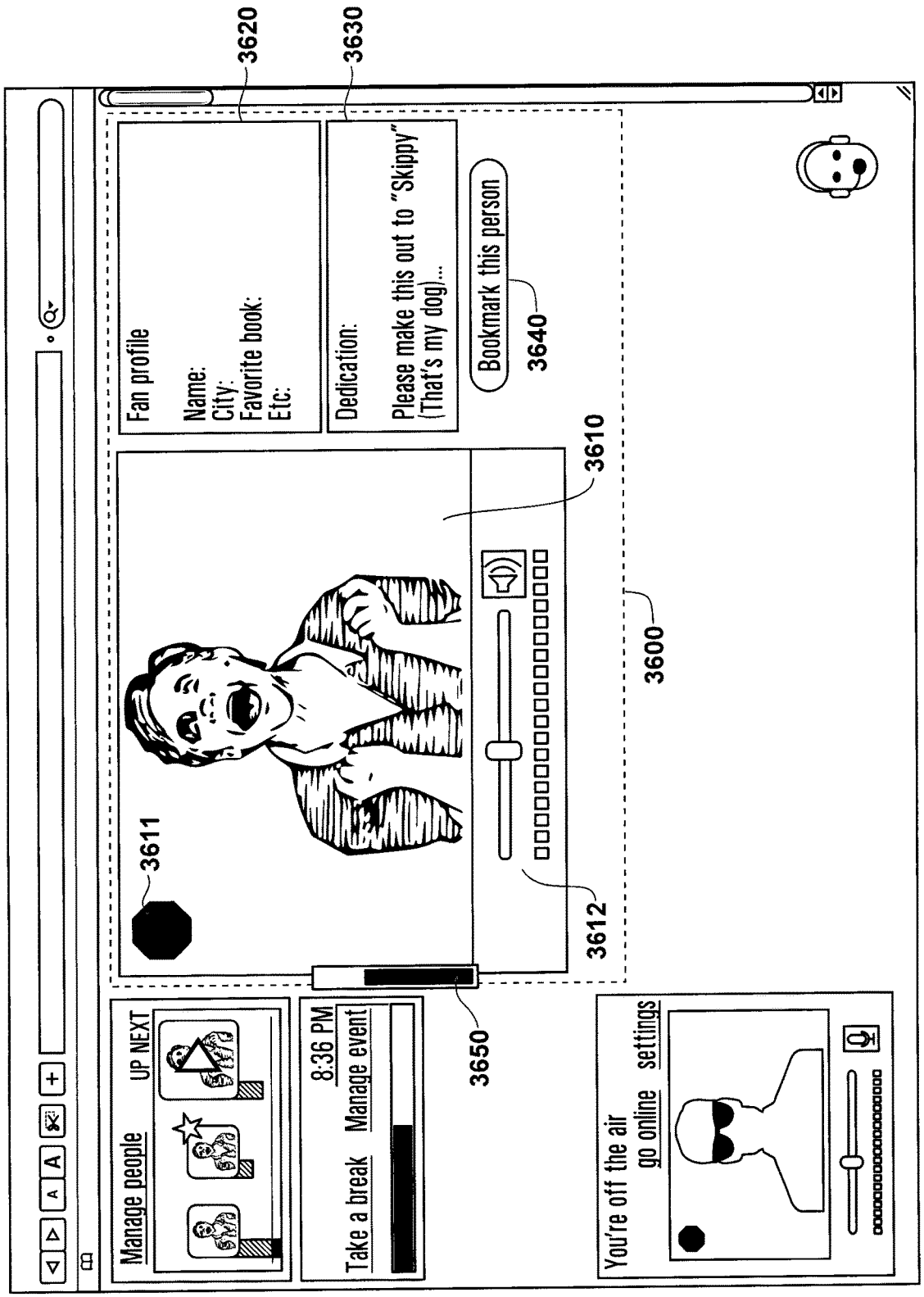
FIG. 15 is an example illustration of an attendee interaction view of the leader interface, according to some embodiments.

FIG. 15 is an illustration of the attendee interaction view 3600 of the leader interface 3000 according to an embodiment of the invention. In some embodiments, leader 143 may view this attendee interaction view 3600 when engaging with an attendee during a one on one interaction.

The attendee interaction view 3600 of the leader interface 3000 may enable leader 143 to interact with one or more attendees 142 and to manage such interactions.

In some embodiments, the attendee interaction view 3600 may contain an attendee media display pane 3610 which may display content from one or more attendees 142 to the leader 143, for example, the video stream of one or more attendees 142. The attendee interaction view 3600 may also contain an attendee media control interface 3612 which may contain one or more media control, for example, a volume control slider and/or a mute button, which may allow the leader 143 to control the display of the content of one or more attendees 142, such as a video stream. In some embodiments, the attendee interaction view 3600 may contain a trap-door button 3611. When activated, for example by a mouse-click or finger tap, the trap-door button 3611 may block the display and/or broadcast of content from one or more attendees 142. In some embodiments, when the trap-door button 3611 is activated by leader 143 and/or moderator 144, the content from the one or more attendees 142 may no longer be broadcasted to the other attendees of the online event. An instance of an activation of trap-door button 3611 may be recorded on the profile of one or more attendees 142. Online chat manager 162 may review the profile data of one or more attendees 142 to determine if the one or more attendees 142 are appropriate to attend and/or participate in the online event. Online chat manager 162 may review the number of instances a trap-door button 3611 was activated for one or more attendees, which may contribute to the evaluation of online chat manager 162 as to the appropriateness of an attendee to attend and/or participate in the online event.

In some embodiments, the attendee interaction view 3600 may contain an attendee info-pane 3620. The attendee info-pane may be configured by online chat manager 162 to display profile data from the profile of one or more attendees 142. The profile data displayed by the attendee info-pane 3620 may be input manually by the attendee 142, leader 143, and/or moderator 144. In some embodiments, the profile data may be recalled from database 190 pre-configured to store such data.

In some embodiments, the attendee interaction view 3600 may contain an attendee request pane 3630. The attendee request pane 3630 may display text representing messages and/or requests entered by one or more attendees 142 engaging in a one on one interaction with leader 143, or other attendees of the online event. The attendee interaction view 3600 may also contain an attendee bookmark button 3640. When activated, online chat manager 162 may create an entry in database 190 corresponding with one or more attendees 142. In some embodiments, bookmarking one or more attendees 142 in this fashion may also record any profile data entered by the one or more attendees 142 to the profile of the one or more attendees 142. In some embodiments, bookmarking an attendee 142 in this fashion may create an entry in the profile of the attendee 142 that may allow a leader 143 or moderator 144 to identify that attendee 142 in a future online event, for example, by adding an entry corresponding to an attendee 142 to the saved contacts interface 3220.

In some embodiments, the attendee interaction view 3600 may include an attendee gas tank indicator 3650, which may be configured to display the amount of time remaining until the one on one interaction with the attendee 142 may be concluded.

In some embodiments, leader 143 and/or moderator 144 may interact with icons representative of one or more attendees 142 in queue to have a one on one interaction with leader 143. This may cause the current one on one interaction to end and may commence the next one on one interaction.

The attendee interaction view 3600 may display elements after the trap-door button 3611 is activated. In some embodiments, after the trap-door button 3611 is activated, the attendee media display pane 3610 may display a blocked attendee message to the leader 143 and/or moderator 144 and/or one or more attendees 142 in the online event.

In some embodiments, after the trap-door button 3611 is activated, the attendee media display pane 3610 may temporarily cease displaying and/or broadcasting content from the blocked attendee 142. For example, the video stream of the blocked attendee 142 may not be displayed to the other attendees or to leader 143.

In some embodiments, after the trap-door button 3611 is activated, the attendee 142 may be unblocked. The attendee media display pane 3610 may present the leader 143 with an unblock attendee button. Leader 143 and/or moderator 144 may choose to activate the unblock attendee button, for example, if the trap-door button 3611 was activated in error and/or the behaviour of the attendee 142 improves. When activated, for example by a mouse-click, online chat manager 162 may deactivate the trap-door button 3611 and may return the attendee media display pane 3610 to its default or previous view.

In some embodiments, after the trap-door button 3611 is activated, the attendee media display pane 3610 may display a terminate attendee button which may, when activated, for example by a mouse-click, cause online chat manager 162 to terminate any broadcast of content from the blocked attendee 142. The unlock attendee button may be offset from the terminate attendee button to prevent error in terminating the one on one interaction with attendee 142.

In some embodiments, the attendee media display pane 3610 may contain elements pre-configured to only become active and/or visible when an attendee 142 is queued to begin participating in the one on one session with leader 143. For example, in some embodiments, where an attendee 142 is queued to interact with the leader 143 in a one on one interaction within ten seconds, a queue notification message window may appear which contains text that may count down the number of seconds remaining until the interaction between leader 143 and attendee 142 is scheduled to begin.

In some embodiments, the attendee media display pane 3610 may be configured by user interface subsystem 146 to display a next-up message window which may indicate information about the next attendee 142 queued to participate in an interaction with the leader 143. The information displayed by the next-up message window may include profile data about a queued attendee that has been retrieved from the profile of the attendee 142 stored on database 190 or input by the queued attendee 142. In some embodiments the attendee interaction view 3600 may be programmed to begin displaying the next-up message window at a pre-determined span of time before the queued attendee is scheduled to participate in an interaction with leader 143, and to cease displaying the next-up message window after a pre-determined span of time. In some embodiments the leader 143 may call or recall the next-up message window, for example, by clicking a button.

In some embodiments, leader 143 and/or moderator 144 may interact with icons representative of one or more attendees 142 in queue to have a one on one interaction with leader 143. This may cause the current one on one interaction to end and may commence the next one on one interaction. As another example, leader 143 may read at least a portion of the profile data of the next attendee to engage in a one on one interaction with leader 143.

In some embodiments, system 10 may be configured such that one of or both of the leader 143 and moderator 144 may have the functionality of delaying the online event. For example, if an attendee 142 may demonstrate abusive or obscene behaviour, the leader 143 or moderator 144 or both may be able to trigger a delayed broadcast, where the other attendees may not observe the abusive or obscene behaviour. The time of delay may be configured by moderator 144 when the online event may be set up. The video streams viewed by the attendees 142 and leader 143 may be refreshed after the trigger of the delayed broadcast. The attendee demonstrating abusive or obscene behaviour may be blocked and removed from the one on one interaction.

Figure 16:
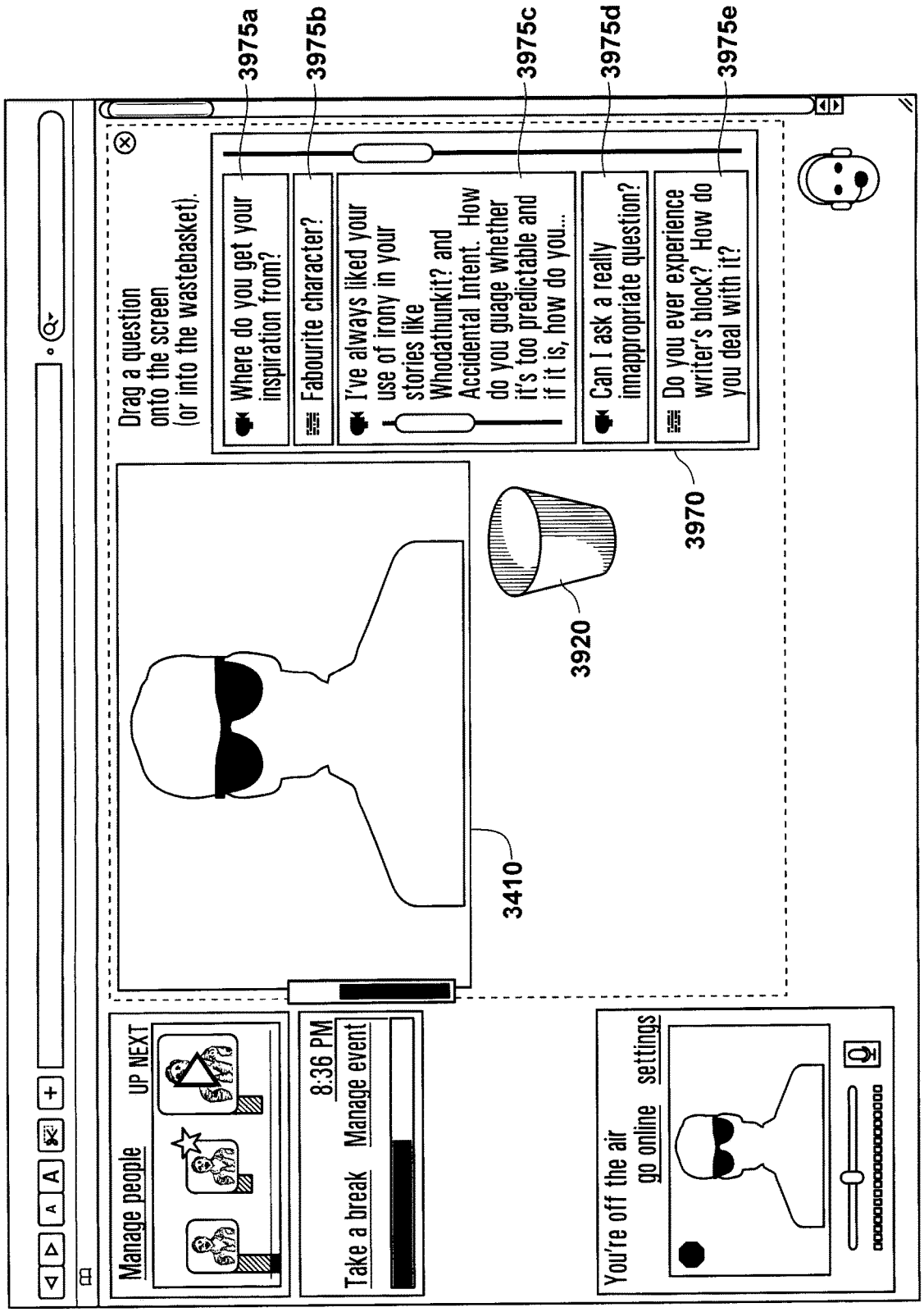
FIG. 16 is an example illustration of a question and answer view of the leader interface, according to some embodiments.

FIG. 16 illustrates an example of the leader interface 3000 configured to facilitate a question and answer session between the leader 143 and one or more attendees 142, in a question and answer view 3900, according to an embodiment of the invention.

The question and answer view 3900 of the leader interface 3000 may contain elements that may facilitate the leader in broadcasting, and responding to, questions from one or more attendees 142.

In some embodiments, the question and answer view 3900 may contain an attendee interaction applet 3970, which may employ various attendee content modules 3975A-E. Attendee interaction applet 3970, which may contain various attendee content modules 3975A-E, may be configured to allow the leader 143 to incorporate and access various types of media submitted by one or more attendees 142 that the leader 143 wishes to present or convey to the attendees 142. In an embodiment, the leader 143 may click and drag media files, for example a text document, to the attendee interaction applet 3970. The attendee interaction applet 3970 may then create an attendee content module 3975A-E corresponding to the media file. The attendee content module 3975A-E may contain a link to the location of the media file, and each attendee content module 3975A-E may be represented by a corresponding user interface element, such as a clickable button within the attendee interaction applet 3970. In some embodiments, when the leader 143 interacts with the user interface element representing an attendee content module 3975A-E corresponding to a particular media file, for example by clicking and dragging an icon representing an attendee content module 3975A-E to the media display pane 3410, the attendee interaction applet 3970 may cause the contents of that media file to be broadcast and/or displayed in the media display pane 3410, as illustrated in FIG. 40. When the media file is broadcast and/or displayed on the media display pane 3410, one or more attendees 142 may view the media file. For example, leader 143 may broadcast a question asked by one or more attendees 142 in the media display pane 3410. Other attendees may be able to view the question before leader 143 answers the question.

In some embodiments, the attendee interaction applet 3970 may provide the leader 143 with a preview of content submitted by one or more attendees 142. As a non-limiting example, the attendee interaction applet 3970 may cause a portion of the contents of a text file submitted by an attendee 142 to be displayed on an icon representing the attendee content module 3975B linked to that text file. As another non-limiting example, the attendee interaction applet 3970 may cause the icon representing the attendee content module 3975A to reflect the type of media linked to that attendee content module 3975A.

In some embodiments, the attendee interaction applet 3970 may allow a leader 143 and/or a moderator 144 to remove content submitted by one or more attendees 142 from the attendee interaction applet 3970, for example by clicking and dragging an icon representing the attendee content module 3975A-E corresponding to a media file to the Trash Can 3920.

One or more attendees 142 may choose to ask a question to leader 143 via a video message. The video stream of one or more attendees 142 may be displayed on the attendee media display pane 3610 for attendee 142 to ask leader 143 one or more questions. The video stream of the leader 143 may be displayed after the attendee 142 has asked the question in order for leader 143 to answer the question. When the leader 143 answers the question, leader interface 3000 may return to the question and answer view as illustrated in FIG. 16.

Figure 17:
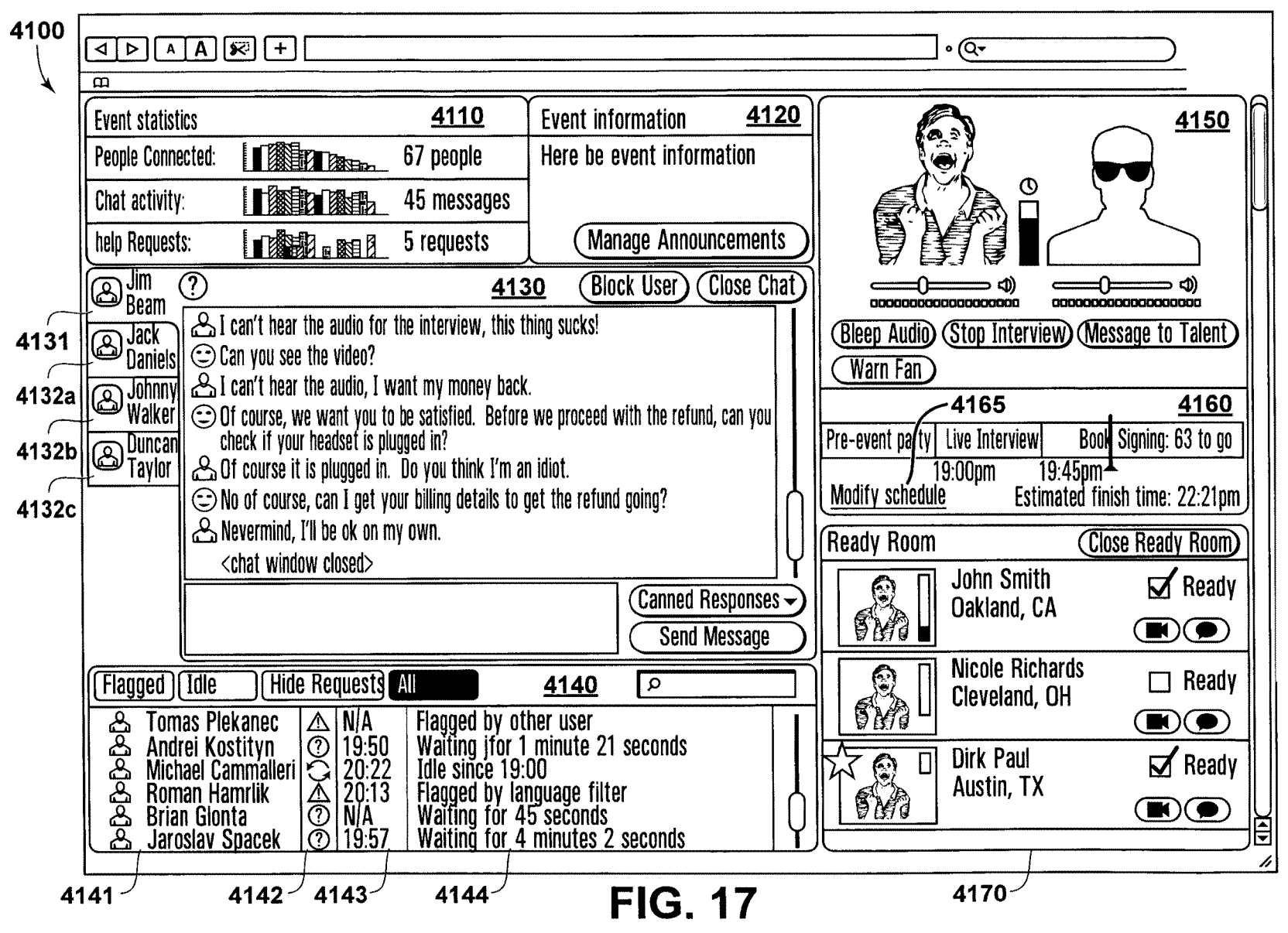
Figure 18:
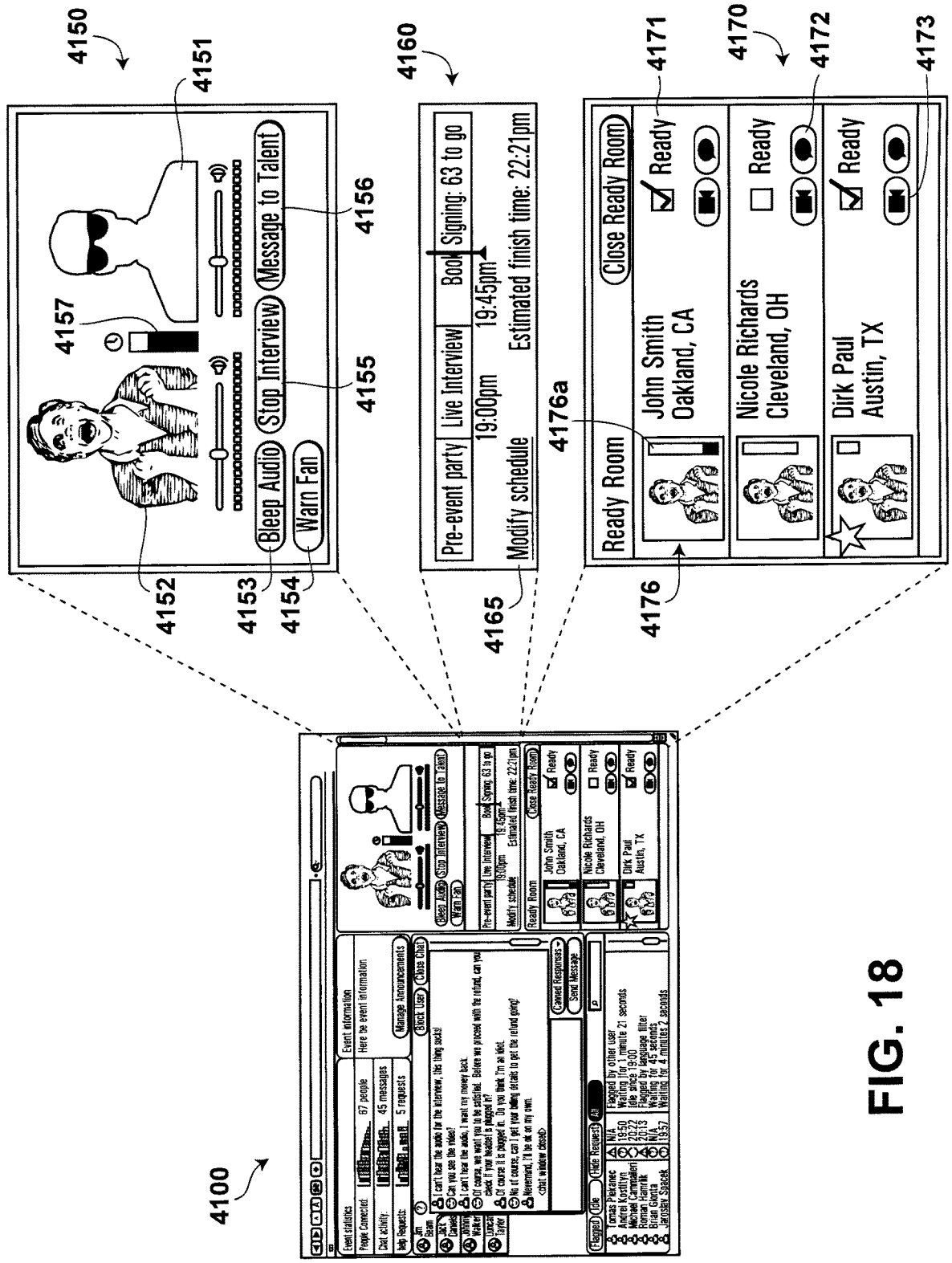
FIG. 18 is an exploded view of an example of the moderator interface, according to some embodiments.
Figure 19:
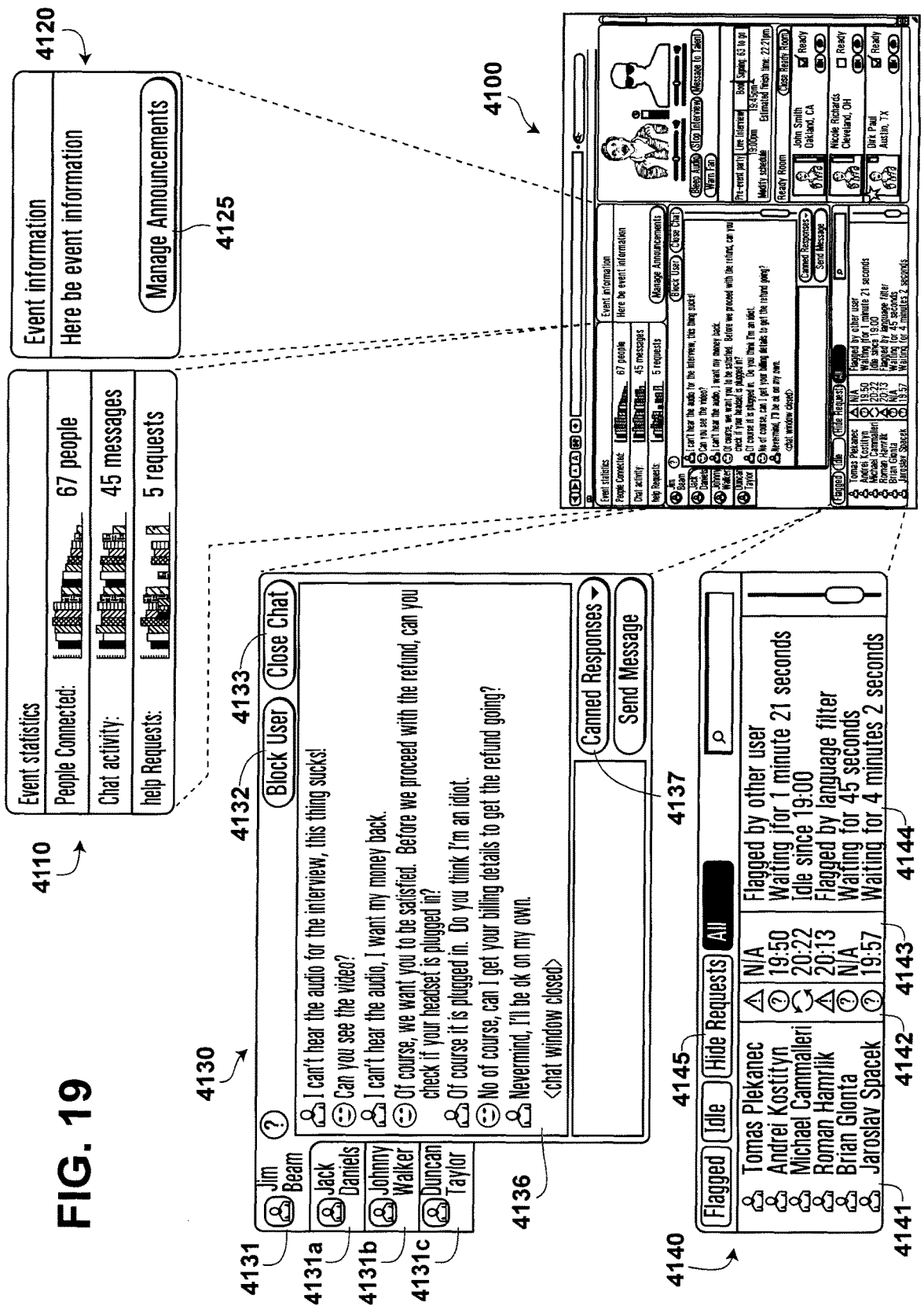
FIG. 19 is another exploded view of an example of the moderator interface, according to some embodiments.

FIG. 17 illustrates an example of moderator interface 4100 according to an embodiment of the invention. FIG. 18 is an exploded view of an example of the moderator interface 4100 according to an embodiment of the invention. FIG. 19 is another exploded view of an example of the moderator interface 4100 according to an embodiment of the invention.

In some embodiments, moderator 144 may moderate the online event via moderator interface 4100, as illustrated in FIG. 17 or FIG. 19. Moderator 144 may monitor the interactions between one or more attendees 142 and another attendee or with the leader 143. Moderator 144 may assist one or more attendees with questions, such as technical support, and may review the profile data of one or more attendees to ensure that the one or more attendees may attend and/or participate in the online meeting with leader 143. For example, moderator 144 may review the profile data of one or more attendees to ensure that the one or more attendees to evaluate the one or more attendees as an appropriate candidate to have a one on one interaction with leader 143. As another example, moderator 144 may assist leader 143 via moderator interface 4100 to perform one or more functions, such as terminating the current one on one interaction and commencing the next one on one interaction, to move the online event forward.

In some embodiments, the moderator interface 4100 may contain an event statistics pane 4110, which may present the moderator 144 with information and/or graphical representations of information that may pertain to the attendees of the online event. For example, the event statistics pane 4110 may display information about the number of attendees 142 that are currently attending the online event.

In some embodiments the moderator interface 4100 may contain an event information pane 4120. The event information pane 4120 may allow the moderator 144 to access functions that may enable the moderator 144 to communicate event information to one or more attendees 142. For example, the event information pane 4120 may present a manage announcements button 4125 as shown in FIG. 19 that may allow the moderator 144 to send an announcement to one or more attendees viewing the online event. The announcement may be a text, audio, or video announcement, or any combination thereof.

In some embodiments the moderator interface 4100 may contain a moderator chat applet 4130. The moderator chat applet 4130 may allow the moderator 144 to send and/or receive messages from one or more attendees 142 and may enable the moderator 144 to resolve customer problems.

In some embodiments, the moderator chat applet 4130 may utilize active chat windows 4131 and Inactive Chat Windows 4132A-C, which may allow the moderator 144 to receive and/or send one or more messages to and/or from one or more attendees 142. In some embodiments, the moderator chat applet 4130 may include interface design elements that, when activated by the moderator 144, for example, by clicking, facilitate the moderator 144 to switch between the active chat window 4131 and inactive chat windows 4132A-C, a non-limiting example being nested tabs. In some embodiments, online chat manager 162 may cause administrative interface subsystem 148 to display one or more pre-configured messages that may be used for common questions or problems. In some embodiments, moderator 144 may configure one or more messages that may be used for common questions or problems.

In some embodiments, online chat manager 162 may be configured to allow moderator 144 may block or mute one or more attendees 142. The one or more blocked or muted attendees 142 may only be able to talk with moderator 144 to be unblocked or unmuted.

In some embodiments, the moderator interface 4100 may contain a user status console window 4140. The user status console window 4140 may contain various user status icons 4141 that may represent one or more attendees 142. The one or more attendees 142 may be associated with one or more user status flags 4142. In some embodiments the user status flags 4142 may represent one or more attendees 142 who have made specific requests for moderator help and/or who may have been designated by one or more attendees 142 as requiring moderator attention. In some embodiments, user status flags 4142 may be represented by various icons representing degrees of urgency and/or specific issues that one or more attendees 142 requiring moderator action may have.

In some embodiments, the user status console window 4140 may contain user status timestamps 4143 that may display text representing the time of day, the amount of time that has elapsed since, and/or the point in time during the online event when an attendee 142 represented by a user status icon 4141 first received a user status flag 4142. Online chat manager 162 may review the user status flag 4142 and/or user status timestamps 4143 to determine a priority for each attendee. Online chat manager 162 may display the user status icon 4141 corresponding to the attendee in a manner representative of the priority for each attendee. This may allow moderator 144 to address one or more questions in an order that may provide an engaging experience for attendee 142.

In some embodiments, the user status console window 4140 may contain a user status description field 4144 that may employ various pre-programmed phrases in order to provide a short description of the current status of the attendee 142 represented by a user status icon 4141 at the time corresponding to the user status timestamp 4143.

In some embodiments the user status console window 4140 may contain a sort by user status menu 4145, as shown in FIG. 19, which, when activated for example by a mouse-click, may allow the moderator 144 to sort user status icons 4141, and/or user status flags 4142, and/or user status description fields 4144 so that they may be grouped and/or ordered by various characteristics, a non-limiting example being by the least to the most time since contact with the moderator 144.

In some embodiments the moderator interface 4100 may contain a broadcast media control applet 4150 that may employ various controls to enable the moderator 144 to manage various qualities, non-limiting examples being volume, and/or video and/or audio bitrate.

In some embodiments, as illustrated in FIG. 18, the broadcast media control applet 4150 may contain an attendee media preview pane 4151 that may display any media one or more attendees 142 may be attempting to broadcast. For example, moderator 144 may view the video stream of one or more attendees, such as the attendee engaging in a one on one interaction with leader 143. Moderator 144 may, for example, oversee the one on one interaction between one or more attendees 142 and leader 143. Moderator 144 may view the amount of time remaining for a one on one interaction.

In some embodiments the broadcast media control applet 4150 may contain one or more features to affect the media of one or more attendees. For example, broadcast media control applet 4150 may contain a bleep audio button 4153 that may allow the moderator 144 to temporarily disable the audio being broadcast from one or more attendees 142, such as by clicking the bleep audio button 4153.

In some embodiments, the content from one or more attendees 142 and/or leader 143 may be configured to buffer for a certain amount of time, a non-limiting example being ten seconds, so that content may only be broadcast to one or more attendees 142 after the content has been reviewed by moderator 144. This may allow the moderator to censor inappropriate behaviour by one or more attendees and/or the leader 143. For example, moderator 144 may use the bleep audio button 4153 to prevent certain inappropriate content from being broadcast to the other attendees.

In some embodiments, the broadcast media control applet 4150 may contain a warn fan button 4154. The warn fan button 4154 may, when activated, cause a message to be sent by online chat manager 162 to one or more attendees 142 in the online event, which may be a warning about the conduct and/or behaviour of the attendee.

In some embodiments, the broadcast media control applet 4150 may contain a stop interview button 4155. When activated, online chat manager 162 may cause the interaction with the leader 143 to end.

In some embodiments the broadcast media control applet 4150 may contain a message leader button 4156. The message leader button 4156, when activated, may allow the moderator 144 to communicate with the leader 143 during the online event. For example, a text chat between the moderator 144 and the leader 143 may be opened.

In some embodiments the moderator interface 4100 may contain a broadcast schedule applet 4160. The broadcast schedule applet 4160 may provide the moderator 144 a graphical representation of the timeline 3350, the time elapsed indicator 3310, and/or the event indicators 3311. In some embodiments the broadcast schedule applet 4160 may provide a modify schedule button 4165 that, when activated, may present the moderator 144 with an interface for re-scheduling, removing, adding, and/or otherwise modifying events scheduled to occur during the online event.

As illustrated in FIG. 18, in some embodiments, the moderator interface 4100 may contain a ready room applet 4170. The ready room applet 4170 may contain ready room user icons 4176 which may provide the moderator 144 with one or more graphical user interface elements (for example icons) that may represent one or more attendees 142 who may be scheduled to participate in a one on one interaction with leader 143 and may enable the moderator 144 to verify that the one or more attendees may be able to participate in the one on one interaction. For example, moderator 144 may review the functionality of one or more components of the computer device of one or more attendees 142 to ensure that the one or more attendees 142 may be able to communicate with leader 143. As another example, moderator 144 may review the profile data of one or more candidates 142 to ensure that the one or more candidates may satisfy the eligibility criteria to have a one on one interaction with leader 143.

In some embodiments, the ready room user icons 4176 may contain ready to present toggles 4171 which may allow the moderator 144 to designate one or more attendees 142 as ready (for example by clicking the toggle) to interact with leader 143, which may be a requirement before one or more attendees 142 may be queued to interact with the leader 143.

In some embodiments, the ready room user icons 4176 may contain ready room chat button 4172 and ready room video preview button 4173. Online chat manager 162 may allow moderator 144 to communicate via text, video, audio, or any combination thereof to one or more attendees 142 represented by one or more ready room user icons 4176 by activating ready room chat button 4172 and/or ready room video preview button 4173.

In some embodiments, the ready room user icons 4176 may contain Ready Room Queue Timers 4176A which may provide the moderator 144 with a graphical user interface element (for example a text countdown or a progress bar) representing the amount of time remaining until one or more attendees 142 represented by a particular ready room user icon 4176 may be scheduled to interact with the leader 143 or participate in the online event.

Leader 143 may provide one or more authenticated artifacts, such as an authenticated autographed and dedicated e-book, to one or more attendees 142 who attended the online event. In some embodiments, the authenticated artifact may be sent by server 140 to attendee 142 in a format acceptable to attendee 142. The format of the authenticated artifact may be selected based on file formats common to the industry.

In some embodiments, server 140 may provide to attendee 142 one or more media associated with the authenticated artifact. For example, server 140 may provide to attendee 142 an authenticated autographed and dedicated e-book, and may embed a video into the authenticated autographed and dedicated e-book.

In some embodiments, server 140 may be configured to accept one or more means of payment from e-commerce platform 156 to operate server 140. Server 140 may be configured to adapt to the transaction process used by e-commerce platform 156 and/or be configured to receive payment from industry standard means.

In some embodiments, system 10 may be configured to be used by one or more computer devices operating one or more operating systems.

In some embodiments, system 10 may be operable to be hosted or embedded on a website.

In some embodiments, system 10 may be used to provide advanced moderated online events for fans to meet athletes and/or athletes. An athlete and/or artist may meet their fans, fan may interact with other fans, fans view the interaction between the athlete and/or artist with one or more fans, and all fans may leave the online event with an authenticated memento of the online event, which may include a signed photograph, digital trading card, e-book, video recordings of the interaction with the athlete and/or celebrity, signed and personalized album covers, iTunes™ singles, digital concert posters, set-lists, tour and behind-the-scenes photos. System 10 may be configured for one or more attendees to share their experience on a social media platform. System 10 may be configured to provide an online event representative of a backstage glimpse, experienced live by one or more attendees of the online In some embodiments, system 10 may be used for authors to conduct readings, meet fans, sell e-books, personalize and sign "inside" the e-book, which may restore the local book tour and may take a book tour to a global audience without the cost.

In some embodiments, system 10 may be used for fans to meet celebrities. A fan may be able to engage in a one on one interaction with a celebrity to conduct their own interview and "walk away" with a signed and personalized poster, publicity photograph, original screenplays, soundtrack albums and behind-the-scenes video.

In some embodiments, system 10 may be used with emerging entertainers. Self-promoted online events may be organized by "up and coming" artists in all industries, such as garage bands, self-published authors, and Olympic athletes. In some embodiments, the emerging entertaining or artist may create an online event spontaneously, may build their fan base, promote new work, and build their brand.

The present system and method may be practiced in various embodiments. A suitably configured computer device, and associated communications networks, devices, software and firmware may provide a platform for enabling one or more embodiments as described above.

Figure 20:
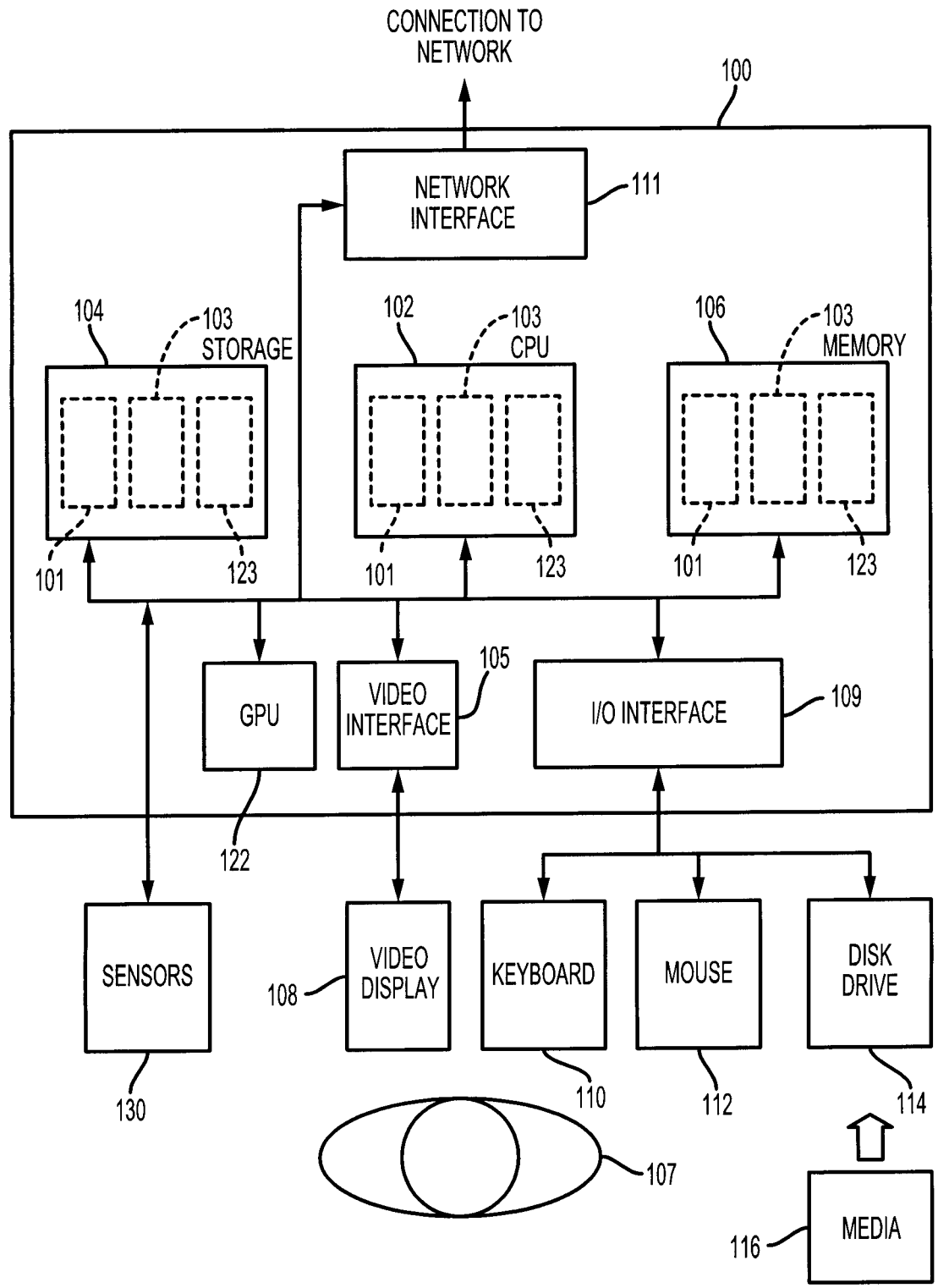
FIG. 20 is an illustrative diagram providing computer hardware and software for implementation of certain aspects, as detailed in the description.

By way of example, FIG. 20 shows a computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit ("GPU") 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 110, mouse 112, and disk drive or solid state drive 114 connected by an I/O interface 109. In known manner, the mouse 112 may be configured to control movement of a cursor in the video display 108, and to operate various graphical user interface ("GUI") controls appearing in the video display 108 with a mouse button. The disk drive or solid state drive 114 may be configured to accept computer readable media 116. The computer device 100 may form part of a network via a network interface 111, allowing the computer device 100 to communicate with other suitably configured data processing systems (not shown). One or more different types of sensors 130 may be used to receive input from various sources.

Computing device 100 is operable to register and authenticate users (using a login, unique identifier, and password for example) prior to providing access to applications, a local network, network resources, other networks and network security devices. Computing devices 100 may serve one user or multiple users.

The present system and method may be practiced on computer devices including a desktop computer, laptop computer, tablet computer or wireless handheld having the ability to connect with the Internet and/or various social networking platforms and/or promotional offer inventory systems. In some embodiments, the systems and methods may be performed on distributed networking devices, such as devices arranged in a "cloud computing" implementation.

The computing device components may be connected in various ways including directly coupled, indirectly coupled via a network, and distributed over a wide geographic area and connected via a network (which may be referred to as "cloud computing").

For example, and without limitation, a computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods and processes described herein.

As will be further understood by those skilled in the relevant arts, significant advantage may be realized through the full or partial automation of any of the processes described above, or portions thereof. Such automation may be provided in any suitable manner, including for example the use of automatic data processors executing suitably-configured, coded, machine-readable instructions using a wide variety of devices, some of which are known and others of which will doubtless be developed hereafter. Processor(s) suitable for use in such implementations can comprise any one or more data processor(s), computer(s), and/or other system(s) or device(s), and necessary or desirable input/output, communications, control, operating system, and other devices or components, including software, that are suitable for accomplishing the purposes described herein. For example, a suitably-programmed general-purpose data processor provided on one or more circuit boards will suffice.

The present system and method may also be implemented as a computer-readable/useable medium that includes computer program code to enable one or more computer devices to implement each of the various process steps in a method in accordance with the present disclosure. In case of more than computer devices performing the entire operation, the computer devices are networked to distribute the various steps of the operation.

It is understood that the terms computer-readable medium or computer useable medium comprises one or more of any type of physical embodiment of the program code. In particular, the computer-readable/useable medium can comprise program code embodied on one or more portable storage articles of manufacture (e.g., an optical disc, a magnetic disk, a tape, etc.), on one or more data storage portioned of a computing device, such as memory associated with a computer and/or a storage system.

The mobile application of the present disclosure may be implemented as a web service, where the mobile device includes a link for accessing the web service, rather than a native application.

The functionality described may be implemented to various mobile platforms, including the iOS™ platform, ANDROID™, WINDOWS™ or BLACKBERRY™.

It will be appreciated by those skilled in the art that other variations of the embodiments described herein may also be practiced without departing from the scope of the disclosure. Other modifications are therefore possible.

In further aspects, the disclosure provides systems, devices, methods, and computer programming products, including non-transient machine-readable instruction sets, for use in implementing such methods and enabling the functionality described previously.

The embodiments of the devices, systems, methods, processes described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout this disclosure, numerous references are made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

This disclosure provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or step.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the disclosure, the scope of which is defined by the claims.

What is claimed is:

1. A computer network implemented system for providing an interactive online event, the system comprising:
    a processor;
    a memory in communication with the processor, the memory storing instructions that, when executed by the processors, cause the processor to:
    provide an attendee interface for an attendee device operated by an attendee to participate in the interactive online event, and a user interface for a user device operated by a user to participate in the interactive online event;
    receive a portion of a video stream of the attendee from the attendee interface, the video stream generated by one or more cameras connected to the attendee interface and positioned to capture the attendee;
    receive a portion of a video stream of the user from the user interface, the video stream of the user generated by one or more cameras connected to the user interface and positioned to capture the user;
    authenticate an identity of the attendee based at least in part on a comparison of the portion of the video stream of the attendee and an image associated with a profile of the attendee;
    authenticate an identity of the user based at least in part on a comparison of the portion of the video stream of the user and an image associated with a profile of the user;
    upon authentication of the identity of the attendee and the identity of the user, enable real time communications between the attendee interface and the user interface for the attendee and the user to participate in a one-on-one interaction;
    receive electronic signals representative of handwriting of the user used to sign or dedicate a digital object to the attendee; and
    authenticate the digital object based at least in part on a comparison of the electronic signals and biometric features associated with the profile of the user, an IP address of hardware used for the signing or dedicating, and an IP address associated with the user.

2. The computer network implemented system of claim 1, wherein the memory further stores instructions that, when executed by the processor, cause the processor to authenticate the digital object based at least in part on the portion of the video stream of the user capturing an event of authenticating the digital object.

3. The computer network implemented system of claim 1, wherein the memory further stores instructions that, when executed by the processor, cause the processor to authenticate the digital object based at least in part on date and time stamps.

4. The computer network implemented system of claim 1, wherein the electronic signals representative of handwriting of the user comprise one or more of pressure, velocity, acceleration and cadence of a digital pen path performed by the user.

5. The computer network implemented system of claim 1, wherein the biometric features associated with the user comprise one or more of pressure, velocity, acceleration and cadence associated with handwriting of the user.

6. A computer-network implemented method for providing an interactive online event, the computer-network implemented method comprising:
    configuring an attendee interface for an attendee device operated by an attendee to participate in the interactive online event, and a user interface for a user device operated by a user to participate in the interactive online event;
    receiving a portion of a video stream of the attendee received from the attendee interface, the video stream generated by a camera connected to the attendee interface and positioned to capture the attendee;
    receiving a portion of a video stream of the user received from the user interface, the video stream of the user generated by one or more cameras connected to the user interface and positioned to capture the user;
    authenticating an identity of the attendee based at least in part on a comparison of the portion of the video stream of the attendee and an image associated with a profile of the attendee;
    authenticating an identity of the user based at least in part on a comparison of the portion of the video stream of the user and an image associated with a profile of the user;
    upon authentication of the identity of the attendee and the identity of the user, enabling real time communications between the attendee interface and the user interface for the attendee and the user to participate in a one-on-one interaction;
    receiving electronic signals representative of handwriting of the user used to sign or dedicate a digital object to the attendee; and
    authenticating the digital object based at least in part on a comparison of the electronic signals and biometric features associated with the profile of the user, an IP address of hardware used for the signing or dedicating and an IP address associated with the user.

7. The computer-network implemented method of claim 6, further comprising authenticating the digital object based at least in part on the portion of the video stream of the user capturing an event of authenticating the digital object.

8. The computer-network implemented method of claim 6, further comprising authenticating the digital object based at least in part on date and time stamps.

9. The computer-network implemented method of claim 6, wherein the electronic signals representative of handwriting of the user comprise one or more of pressure, velocity, acceleration and cadence of a digital pen path performed by the user.

10. The computer-network implemented method of claim 6, wherein the biometric features associated with the user comprise one or more of pressure, velocity, acceleration and cadence associated with handwriting of the user.

* * * * *